(12) United States Patent
Shiro et al.

(10) Patent No.: US 10,327,121 B2
(45) Date of Patent: Jun. 18, 2019

(54) INSTRUMENT AND SYSTEM

(71) Applicants: Hideki Shiro, Kanagawa (JP); Takeshi Homma, Kanagawa (JP); Takashi Hasegawa, Kanagawa (JP)

(72) Inventors: Hideki Shiro, Kanagawa (JP); Takeshi Homma, Kanagawa (JP); Takashi Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 259 days.

(21) Appl. No.: 15/380,751

(22) Filed: Dec. 15, 2016

(65) Prior Publication Data

US 2017/0180912 A1    Jun. 22, 2017

(30) Foreign Application Priority Data

Dec. 22, 2015  (JP) ................. 2015-249705
Apr. 27, 2016  (JP) ................. 2016-089925

(51) Int. Cl.
| | | |
|---|---|---|
| H04W 4/00 | (2018.01) | |
| H04W 4/70 | (2018.01) | |
| H04W 4/80 | (2018.01) | |
| H04L 12/58 | (2006.01) | |
| H04L 29/08 | (2006.01) | |
| H04L 12/18 | (2006.01) | |
| H04L 29/06 | (2006.01) | |
| H04W 88/02 | (2009.01) | |

(52) U.S. Cl.
CPC ........... H04W 4/70 (2018.02); H04L 12/1818 (2013.01); H04L 51/32 (2013.01); H04L 67/10 (2013.01); H04L 67/26 (2013.01); H04L 67/306 (2013.01); H04W 4/80 (2018.02); H04L 67/42 (2013.01); H04W 88/02 (2013.01)

(58) Field of Classification Search
CPC ..... G06Q 50/01; H04L 51/32; H04L 12/1818; H04L 67/10
See application file for complete search history.

(56) References Cited

U.S. PATENT DOCUMENTS

2007/0019616 A1   1/2007  Rantapuska et al.
2012/0311038 A1   12/2012 Trinh et al.
(Continued)

FOREIGN PATENT DOCUMENTS

EP    2 533 493 A1   12/2012
JP    2014-075074    4/2014

OTHER PUBLICATIONS

Extended European Search Report dated May 15, 2017 in Patent Application No. 16204585.0.
U.S. Appl. No. 15/187,240, filed Jun. 20, 2016.

*Primary Examiner* — Chirag R Patel
(74) *Attorney, Agent, or Firm* — Oblon, McClelland, Maier & Neustadt, L.L.P.

(57) ABSTRACT

An instrument includes: an invitation notification receiving unit configured to receive, from a server device configured to transmit a message to a user belonging to a group, an invitation notification to the group; an approval information transmitting unit configured to transmit, to the server device, approval information approving participation in the group when the received invitation notification is valid; and a session starting unit configured to start, upon the participation in the group, a session that is processing communications of for information with another instrument participating in the group.

12 Claims, 65 Drawing Sheets

(56) References Cited

U.S. PATENT DOCUMENTS

| | | |
|---|---|---|
| 2014/0033274 A1* | 1/2014 | Okuyama .............. H04L 63/10 |
| | | 726/3 |
| 2014/0073300 A1 | 3/2014 | Leeder et al. |
| 2014/0101727 A1 | 4/2014 | Okuyama et al. |
| 2015/0244874 A1* | 8/2015 | Tornkvist ............. H04M 15/41 |
| | | 370/242 |
| 2016/0094594 A1 | 3/2016 | Imai et al. |
| 2016/0094595 A1 | 3/2016 | Shiro et al. |
| 2016/0112675 A1 | 4/2016 | Morita et al. |
| 2016/0150183 A1 | 5/2016 | Nagamine et al. |
| 2016/0248819 A1 | 8/2016 | Nagamine et al. |
| 2016/0261654 A1 | 9/2016 | Trinh et al. |
| 2016/0262206 A1 | 9/2016 | Shiro et al. |
| 2016/0277462 A1 | 9/2016 | Morita et al. |
| 2016/0295163 A1 | 10/2016 | Shiro et al. |

* cited by examiner

FIG.19

| ID | TYPE | NAME | STATE INFORMATION |
|---|---|---|---|
| 0130 | USER | SUZUKI | |
| 4020 | USER | TANAKA | |
| 0334 | UCS | CONFERENCE TERMINAL DEVICE AT TOKYO OFFICE | [CONFERENCE ID, PASSWORD] |
| 0054 | UCS | CONFERENCE TERMINAL DEVICE AT OSAKA OFFICE | |

FIG.36

| ID | TYPE | NAME | STATE INFORMATION |
|---|---|---|---|
| 0130 | USER | SUZUKI | |
| 4020 | USER | TANAKA | |
| 0335 | IWB | ELECTRONIC BLACKBOARD AT TOKYO OFFICE | [IP ADDRESS, PASSWORD] |
| 0055 | IWB | ELECTRONIC BLACKBOARD AT OSAKA OFFICE | |

FIG.55

| PARTICIPATING INSTRUMENT LIST |
|---|
| 🖥 ELECTRONIC BLACKBOARD (OSAKA) |
| TAG DEVICE AT TOKYO OFFICE<br>🖥🖥 ☐ ELECTRONIC BLACKBOARD A<br>☐ ELECTRONIC BLACKBOARD B<br>☐ CONFERENCE TERMINAL DEVICE |
| |

FIG.57

| PARTICIPATING INSTRUMENT LIST |
| ELECTRONIC BLACKBOARD (OSAKA) |
| TAG DEVICE AT TOKYO OFFICE<br>☑ ELECTRONIC BLACKBOARD A<br>☐ ELECTRONIC BLACKBOARD B<br>☑ CONFERENCE TERMINAL DEVICE |

INSTRUMENT AND SYSTEM

CROSS-REFERENCE TO RELATED APPLICATIONS

The present application claims priority under 35 U.S.C. § 119 to Japanese Patent Application No. 2015-249705 filed Dec. 22, 2015 and Japanese Patent Application No. 2016-089925 filed Apr. 27, 2016. The contents of which are incorporated herein by reference in their entirety.

BACKGROUND OF THE INVENTION

1. Field of the Invention

The present invention relates to an instrument and a system.

2. Description of the Related Art

A conference system that performs a remote conference through, for example, the Internet has been widely used. In this conference system, a conference terminal device at one conference room acquires the image and sound of a user, and transmits data including the acquired image and sound to a conference terminal device at another conference room. Then, in this conference system, the conference terminal device at the other conference room receives the data, and outputs the image and sound included in the received data. Such a conference system enables communication between users at different places.

A known electronic blackboard (interactive whiteboard) receives handwriting input of line drawing on a board to display the received line drawing on the board, and simultaneously generates drawing information representing the line drawing to store therein the information. In a known sharing system, two electronic blackboards connected through a network cooperate with each other. In the sharing system, drawing information received by one of the electronic blackboards is transmitted to the other electronic blackboard to display identical information at the two electronic blackboards. Such a sharing system allows a plurality of users at different places to draw line drawing as if sharing one electronic blackboard.

In a known messaging system, a message is transmitted to a plurality of users belonging to a group. For example, a user selects a group and inputs a message at a client device (a smartphone, a tablet terminal, or a notebook computer, for example) held by the user. The client device transmits the selected group and the input message to a server device. The server device stores the message received from the client device in association with the selected group, and provides a log of the message to client devices of all users belonging to the selected group. Such a messaging system allows transmission of a message to a plurality of users belonging to a group at once.

Japanese Unexamined Patent Application Publication No. 2014-075074 discloses the technology of reading in, for example, personal settings and a personal address book to a shared instrument and allowing use of the shared instrument through a personal account.

Before a conference, a user of the conference system needs to input the address, password, and the like of a conference terminal device at the end of the line to start a session between conference terminal devices. Before electronic blackboard sharing, a user of the sharing system needs to input the address, password, and the like of an electronic blackboard at the end of the line to start a session between electronic blackboards.

However, the procedure of such session start processing involves specification of a device at the end of the line, and in addition, acquisition of the address, password, and the like of the specified device by any means, which is cumbersome.

In view of the above-described problem in the conventional art, there is a need to provide an instrument and a system that can easily start a session that is processing for communicating information with another instrument.

SUMMARY OF THE INVENTION

According to exemplary embodiments of the present invention, there is provided an instrument comprising: an invitation notification receiving unit configured to receive, from a server device configured to transmit a message to a user belonging to a group, an invitation notification to the group; an approval information transmitting unit configured to transmit, to the server device, approval information approving participation in the group when the received invitation notification is valid; and a session starting unit configured to start, upon the participation in the group, a session that is processing communications of for information with another instrument participating in the group.

Exemplary embodiments of the present invention also provide a system comprising: an instrument capable of communicating information with another instrument; a client device that is an information processing device operated by a user belonging to a group; and a server device configured to transmit a message to the client device, the instrument comprising: an invitation notification receiving unit configured to receive an invitation notification to the group from the server device configured to transmit a message to a user belonging to the group; an approval information transmitting unit configured to transmit, when the received invitation notification is valid, approval information approving participation in the group to the server device; and a session starting unit configured to start, upon the participation in the group, a session that is processing for communications of information with another instrument participating in the group.

BRIEF DESCRIPTION OF THE DRAWINGS

FIG. 19 is a diagram illustrating a member list obtained by adding a conference ID and a password to state information of a first instrument;

FIG. 36 is a diagram illustrating a member list obtained by adding an IP address and a password to the state information of the first instrument;

FIG. 55 is a diagram illustrating an exemplary participation instrument list screen upon participation of the tag device in a group;

FIG. 57 is a diagram illustrating an exemplary participation instrument list screen upon participation of the instrument associated with the tag device in a group;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
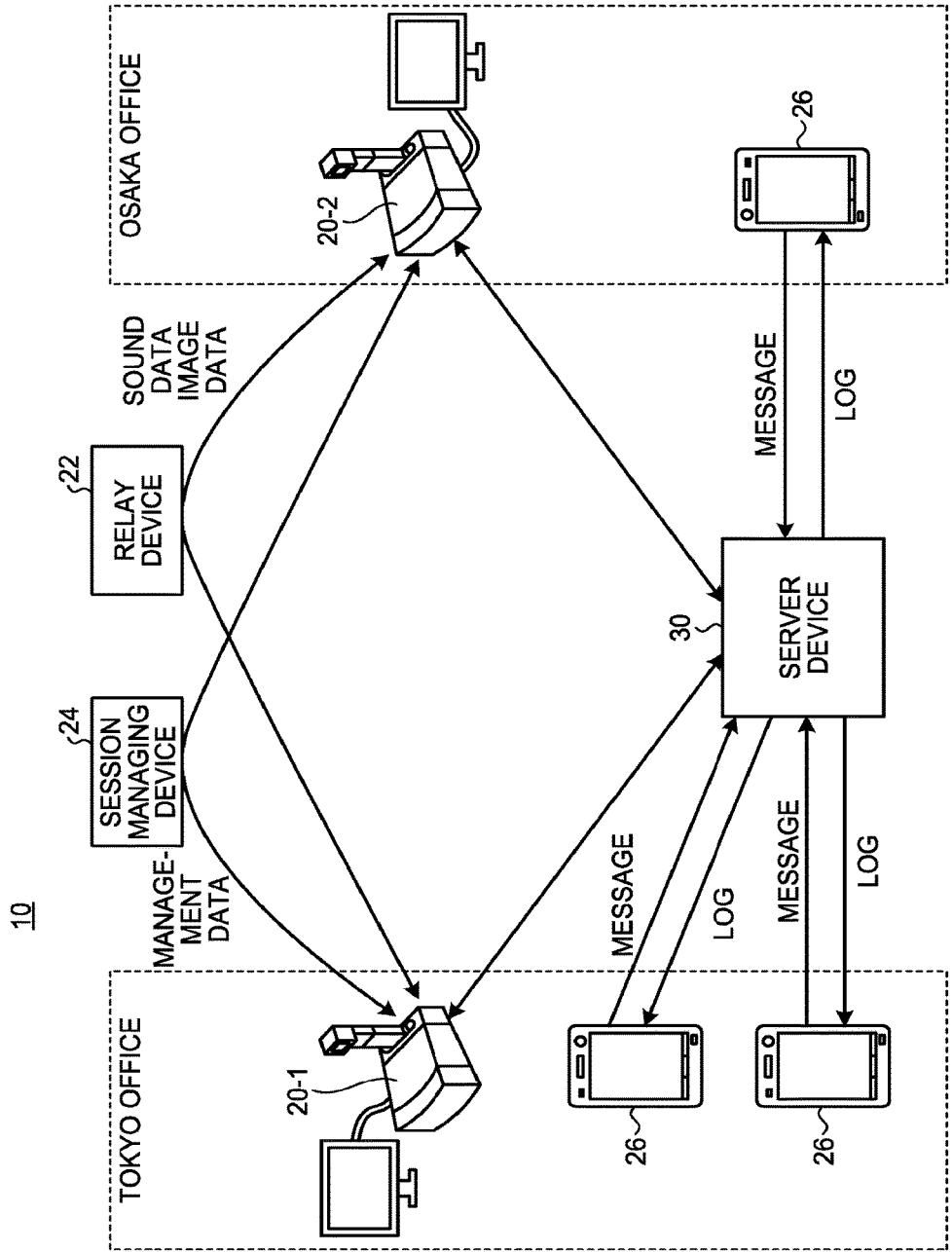
FIG. 1 is a diagram illustrating a conference system according to a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention will be described in detail below with reference to the drawings.

First Embodiment

FIG. 1 is a diagram illustrating a conference system 10 according to a first embodiment of the present invention. The conference system 10 enables a television conference between a user at a first place (a Tokyo office, for example) and a user at a second place (an Osaka office, for example). Specifically, the conference system 10 provides the user at the second place with sound and images of the user at the first place. The conference system 10 also provides the user at the first place with sound and images of the user at the second place. With this configuration, the conference system 10 enables communication between the users at the different places.

The present embodiment describes an example in which the conference system 10 provides a television conference between the users at the first and the second places, but the conference system 10 may provide a television conference among users at three or more places. The conference system 10 may provide sound and images of the first place to the user at the first place (single-person conference).

The conference system 10 includes a first instrument 20-1, a second instrument 20-2, a relay device 22, a session managing device 24, a plurality of client devices 26, and a server device 30. These devices are connected with one another through a network. The network may be a local area network (LAN), a wide area network (WAN), a WAN including a public line, or any other network.

The first instrument 20-1 is a conference terminal device installed at the first place. The first instrument 20-1 generates sound data by collecting sound of the user at the first place and image data by capturing an image of the user at the first place. The first instrument 20-1 transmits the generated sound data and image data to the relay device 22 through the network. The first instrument 20-1 receives, from the relay device 22, sound data and image data generated by the second instrument 20-2. The first instrument 20-1 outputs the received sound data, and displays the received image data.

The second instrument 20-2 is a conference terminal device installed at the second place. The second instrument 20-2 generates sound data by collecting sound of the user at the second place and image data by capturing an image of the user at the second place. The second instrument 20-2 transmits the generated sound data and image data to the relay device 22 through the network. The second instrument 20-2 receives the sound data and the image data generated by the first instrument 20-1 from the relay device 22. The second instrument 20-2 outputs the received sound data, and displays the received image data on a display device.

The first instrument 20-1 and the second instrument 20-2 have identical functions and configurations. The first instrument 20-1 and the second instrument 20-2 are also collectively referred to as an instrument 20.

The relay device 22 transmits the sound data and the image data received from the first instrument 20-1 to the second instrument 20-2. The relay device 22 transmits the sound data and the image data received from the second instrument 20-2 to the first instrument 20-1.

The session managing device 24 manages a session that is processing for communicating information among a plurality of the instruments 20. In the present embodiment, the session is executed by relaying communications of information among the instruments 20 through the relay device 22. The session managing device 24 receives participation of each instrument 20 in the session. Then, the session managing device 24 sets, to the relay device 22, information (an IP address, a password, and the like) for access to the instrument 20 participating in the session. Accordingly, the relay device 22 can communicate information with the instrument 20 participating in the session.

Communication can be enabled among users at different places through the instrument 20, the relay device 22, and the session managing device 24.

The client devices 26 are information processing devices held by respective users. Each client device 26 is, for example, a smartphone, a tablet terminal, or a notebook computer. The client device 26 executes an application program for transmitting a message to a plurality of users belonging to a group at once.

The server device 30 is an information processing device for providing service on the network. The server device 30 is achieved by, for example, a typical computer. The server device 30 executes a computer program for providing service of transmitting a message to a plurality of users belonging to a group at once.

The client devices 26 and the server device 30 as described above can provide a messaging system configured to transmit a message to a user belonging to the group.

A unique user ID is allocated to each user to receive the provision of the messaging system. The server device 30 manages each user ID. The user is allowed to use the messaging system by inputting the user ID to the client device 26.

The server device 30 manages a user belonging to each group. The user can belong to a plurality of groups at one time. A unique group ID is allocated to each group. The user selects a group to which the user belongs and transmits a message to the server device 30. The server device 30 stores therein the message from the user in association with the selected group. The user can also receive, from the server device 30, a log of any message transmitted by a user in the group to which the user belongs. In this manner, the user can transmit a message to all users belonging to the selected group.

The conference system 10 can allow participation of each instrument 20 in a session by using the messaging system achieved by the client devices 26 and the server device 30.

A unique instrument ID is allocated to each instrument 20 to receive the provision of the messaging system. The server device 30 manages each instrument ID. The instrument 20 can perform communication with the server device 30 by using the instrument ID.

In response to reception of an invitation request from the client device 26, the server device 30 transmits, to the instrument 20, invitation notification that invites participation in a group. When the invitation notification received from the server device 30 is valid, the instrument 20 approves participation in the group. When the invitation to the group is approved by the instrument 20, the server device 30 allows participation of the instrument 20 in the group.

Upon participation in the group, the instrument 20 starts a session. Accordingly, the instrument 20 can perform communication of information with any other instrument 20 belonging to the group, thereby achieving a television conference.

Figure 2:
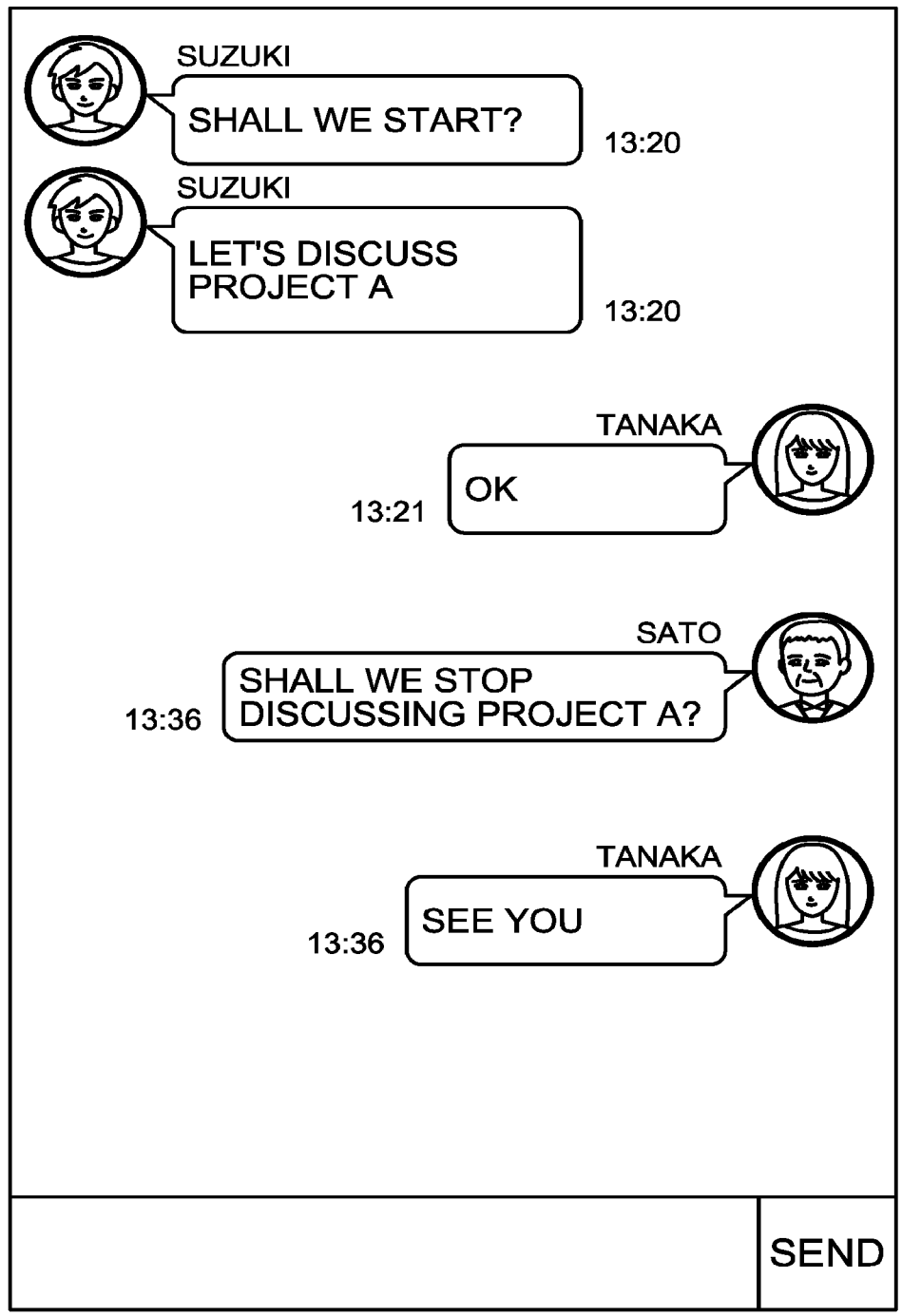
FIG. 2 is a diagram illustrating an exemplary message screen on which a message is displayed.

FIG. 2 is a diagram illustrating an exemplary message screen on which a message is displayed. Upon selection of a group by the user, the client device 26 displays, for example, a message screen as illustrated in FIG. 2.

Dialogue balloons are displayed on the message screen in a temporal order. Each dialogue balloon includes a message transmitted by a user belonging to the group. An icon for identifying the user who has transmitted the message, and text are displayed beside the dialogue balloon. The dialogue balloon protrudes from the icon for identifying the user.

The icon for identifying the user is displayed on the left side of the screen when the message is transmitted by the user itself, or is displayed on the right side of the screen when the message is transmitted by a user other than the user. The transmission time of the message is displayed beside the dialogue balloon.

For example, a box for inputting a new message and a sound input button are displayed below the message screen. When text is input to this box or the sound input button is pressed to output sound, the client device 26 generates a message and transmits the message to the server device 30.

In this manner, through the message screen as illustrated in FIG. 2, the client device 26 can display a message transmitted by a user belonging to a selected group. Through the message screen as illustrated in FIG. 2, the client device 26 can generate a message to be transmitted to a plurality of users belonging to the selected group and transmit the message to the server device 30. FIG. 2 illustrates an example, and the client device 26 may display a message screen in another format.

Figure 3:
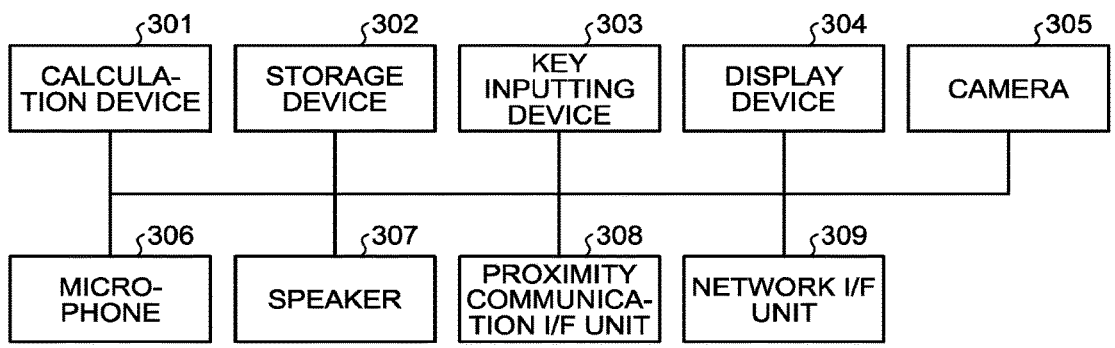
FIG. 3 is a diagram illustrating an exemplary hardware configuration of an instrument that is a conference terminal device.

FIG. 3 is a diagram illustrating an exemplary hardware configuration of the instrument 20 that is a conference terminal device. The instrument 20 that is a conference terminal device includes a calculation device 301, a storage device 302, a key inputting device 303, a display device 304, a camera 305, a microphone 306, a speaker 307, a proximity communication I/F unit 308, and a network I/F unit 309.

The calculation device 301 includes a central processing unit (CPU), a read only memory (ROM), and a random access memory (RAM), and controls the entire instrument 20 by executing a computer program. The storage device 302 is, for example, a flash memory or a hard disk, and stores therein a computer program and various kinds of data. The key inputting device 303 is, for example, various kinds of buttons, and acquires information of an operation on the instrument 20 on by the user.

The display device 304 displays thereon image data. The camera 305 generates image data by capturing an image of an object. The microphone 306 generates sound data by collecting surrounding sound. The speaker 307 externally outputs sound in accordance with sound data.

The proximity communication I/F unit 308 performs communications of information with an external device by, for example, a non-contact proximity communication (NFC) scheme. The network I/F unit 309 communicates information with another device through the network in accordance with a communication protocol such as the Internet protocol.

Figure 4:
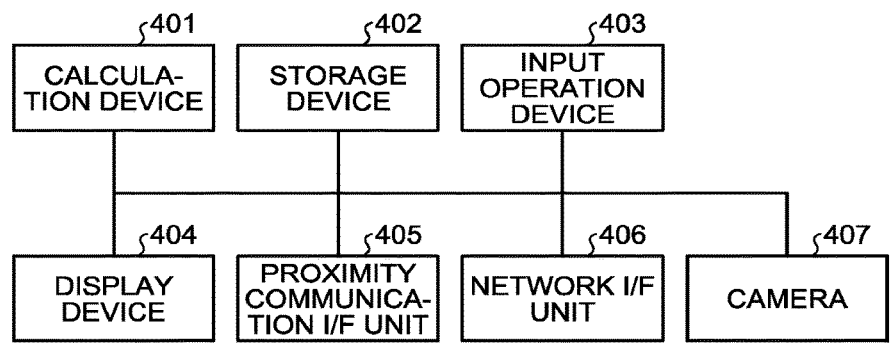
FIG. 4 is a diagram illustrating an exemplary hardware configuration of a client device.

FIG. 4 is a diagram illustrating an exemplary hardware configuration of the client device 26. The client device 26 includes a calculation device 401, a storage device 402, an input operation device 403, a display device 404, a proximity communication I/F unit 405, a network I/F unit 406, and a camera 407.

The calculation device 401 includes a CPU, a ROM, and a RAM, and controls information processing and the entire client device 26 by executing a computer program. The storage device 402 is, for example, a flash memory or a hard disk, and stores therein a computer program and various kinds of data. The input operation device 403 is, for example, a touch panel, and acquires information input by the user. The display device 404 displays thereon various kinds of information.

The proximity communication I/F unit 405 performs communication of information with an external device by, for example, the non-contact proximity communication (NFC) scheme. The network I/F unit 406 communicates information with another device through the network in accordance with a communication protocol such as the Internet protocol. The camera 407 generates image data by capturing an object.

As described above, the client device 26 is an information processing device having a configuration same as that of a typical computer. The server device 30 has a configuration same as that of the client device 26 except that the server device 30 does not include the proximity communication I/F unit 405 and the camera 407, and thus description thereof will be omitted.

Figure 5:
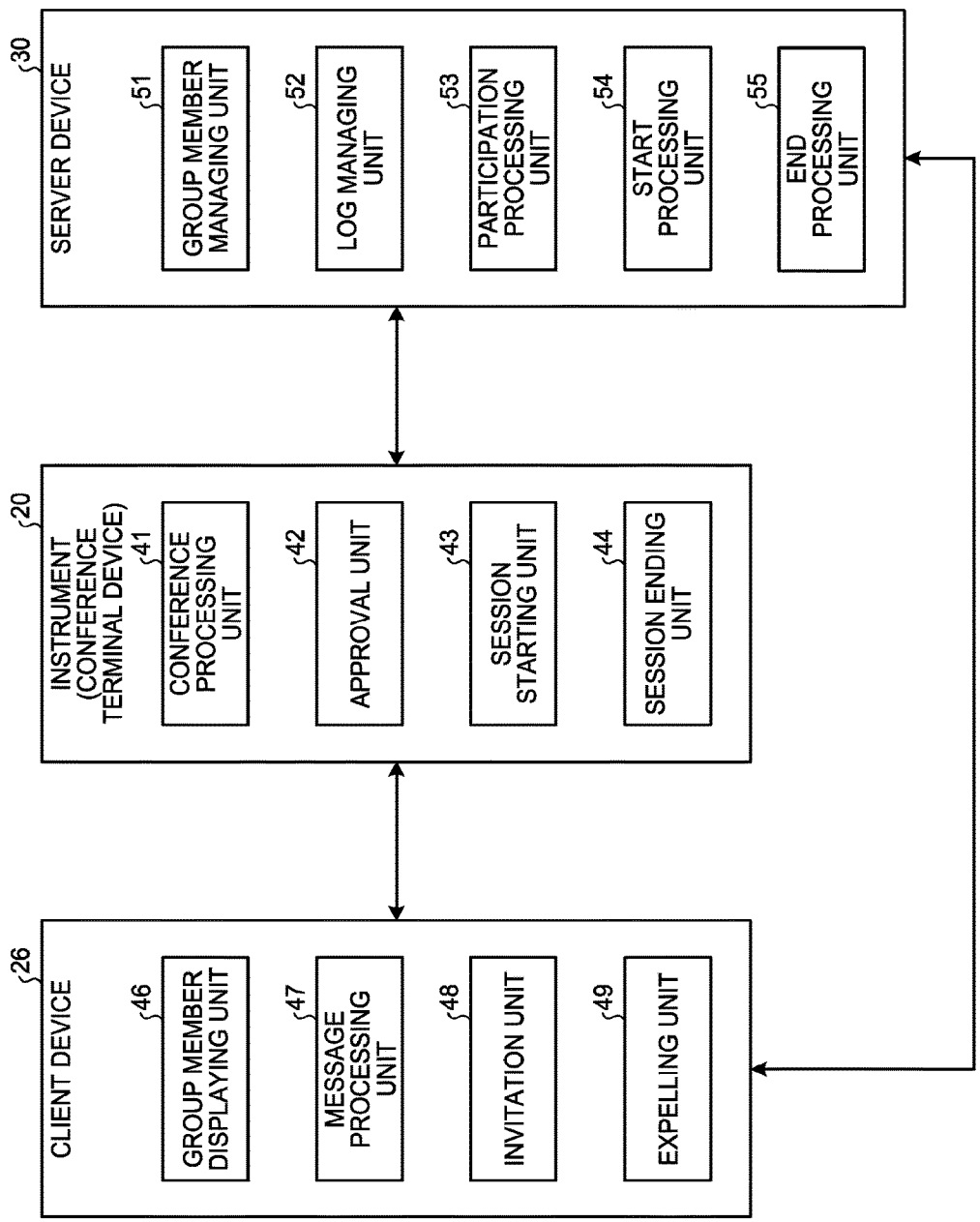
FIG. 5 is a diagram illustrating functional configurations of an instrument, a client device, and a server device according to the first embodiment.

FIG. 5 is a diagram illustrating functional configurations of the instrument 20, the client device 26, and the server device 30 according to the first embodiment. The instrument 20 that is a conference terminal device includes a conference processing unit 41, an approval unit 42, a session starting unit 43, and a session ending unit 44. These functions are each achieved through cooperation of a computer program executed by the calculation device 301 illustrated in FIG. 3 and the hardware illustrated in FIG. 3.

The conference processing unit 41 executes processing for achieving a television conference. More detailed description of the function of the conference processing unit 41 will be further given later with reference to FIG. 6.

The approval unit 42 executes processing for allowing participation of the instrument 20 in a group. More detailed description of the function of the approval unit 42 will be further given later with reference to FIG. 8.

The session starting unit 43 executes processing that starts a session that is processing for communicating information with another instrument, and processing that allows participation of the instrument 20 in a session. More detailed description of the function of the session starting unit 43 will be further given later with reference to FIG. 9.

The session ending unit 44 executes processing that causes the instrument 20 to exit a session and processing that ends the session. More detailed description of the function of the session ending unit 44 will be further given later with reference to FIG. 10.

The client device 26 includes a group member displaying unit 46, a message processing unit 47, an invitation unit 48, and an expelling unit 49. These functions are each achieved through cooperation of a computer program executed by the calculation device 401 illustrated in FIG. 4 and the hardware configuration illustrated in FIG. 4.

The group member displaying unit 46 displays, to the user, a group and any member belonging to the group. More detailed description of the function of the group member displaying unit 46 will be further given later with reference to FIG. 7.

The message processing unit 47 generates a message and displays the message. More detailed description of the function of the message processing unit 47 will be further given later with reference to FIG. 7.

The invitation unit 48 executes processing for allowing participation of the instrument 20 in a group. More detailed description of the function of the invitation unit 48 will be further given later with reference to FIG. 8.

The expelling unit 49 executes processing that causes the instrument 20 to exit a session. More detailed description of the function of the expelling unit 49 will be further given later with reference to FIG. 10.

The server device 30 includes a group member managing unit 51, a log managing unit 52, a participation processing unit 53, a start processing unit 54, and an end processing unit 55. These functions are each achieved through cooperation of a computer program executed by the calculation device 401 illustrated in FIG. 4 and the hardware configuration illustrated in FIG. 4.

The group member managing unit 51 manages a group and any member belonging to the group. More detailed description of the function of the group member managing unit 51 will be further given later with reference to FIG. 7.

The log managing unit 52 manages a message log. More detailed description of the function of the log managing unit 52 will be further given later with reference to FIG. 7.

The participation processing unit 53 executes processing for allowing participation of the instrument 20 in a group. More detailed description of the function of the participation processing unit 53 will be further given later with reference to FIG. 8.

The start processing unit 54 executes processing that starts a session and processing that allows participation of the instrument 20 in a session. More detailed description of the function of the start processing unit 54 will be further given later with reference to FIG. 9.

The end processing unit 55 executes processing that causes the instrument 20 to exit a session and processing that ends the session. More detailed description of the function of the end processing unit 55 will be further given later with reference to FIG. 10.

Figure 6:
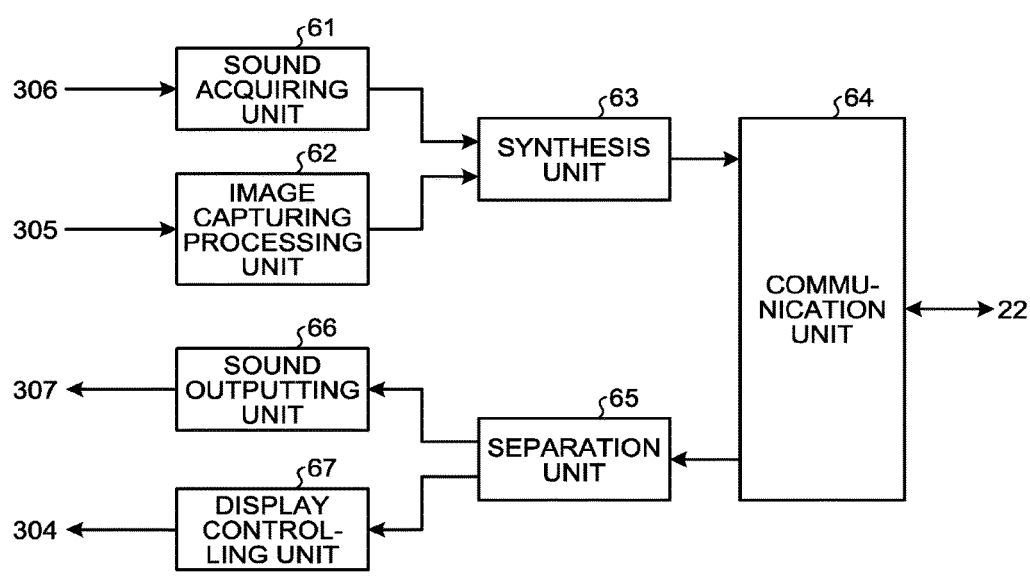
FIG. 6 is a diagram illustrating a functional configuration of a conference processing unit.

FIG. 6 is a diagram illustrating a functional configuration of the conference processing unit 41. The conference processing unit 41 includes a sound acquiring unit 61, an image capturing processing unit 62, a synthesis unit 63, a communication unit 64, a separation unit 65, a sound outputting unit 66, and a display controlling unit 67.

The sound acquiring unit 61 generates sound data from a sound signal acquired by the microphone 306. The image capturing processing unit 62 generates image data based on image capturing data captured by the camera 305. The synthesis unit 63 converts the sound data and the image data into transmission data through synthesis thereof.

The communication unit 64 transmits the transmission data generated by the synthesis unit 63 to the relay device 22. The communication unit 64 receives, from the relay device 22, transmission data generated by another instrument 20.

The separation unit 65 extracts sound data and image data from the transmission data generated by the other instrument 20. The sound outputting unit 66 converts the sound data extracted by the separation unit 65 into a sound signal and feeds the sound signal to the speaker 307 to output sound from the speaker 307. The display controlling unit 67 causes the display device 304 to display an image by controlling the display device 304 in accordance with the image data extracted by the separation unit 65. The conference processing unit 41 as described above can allow the user to achieve a television conference.

Figure 7:
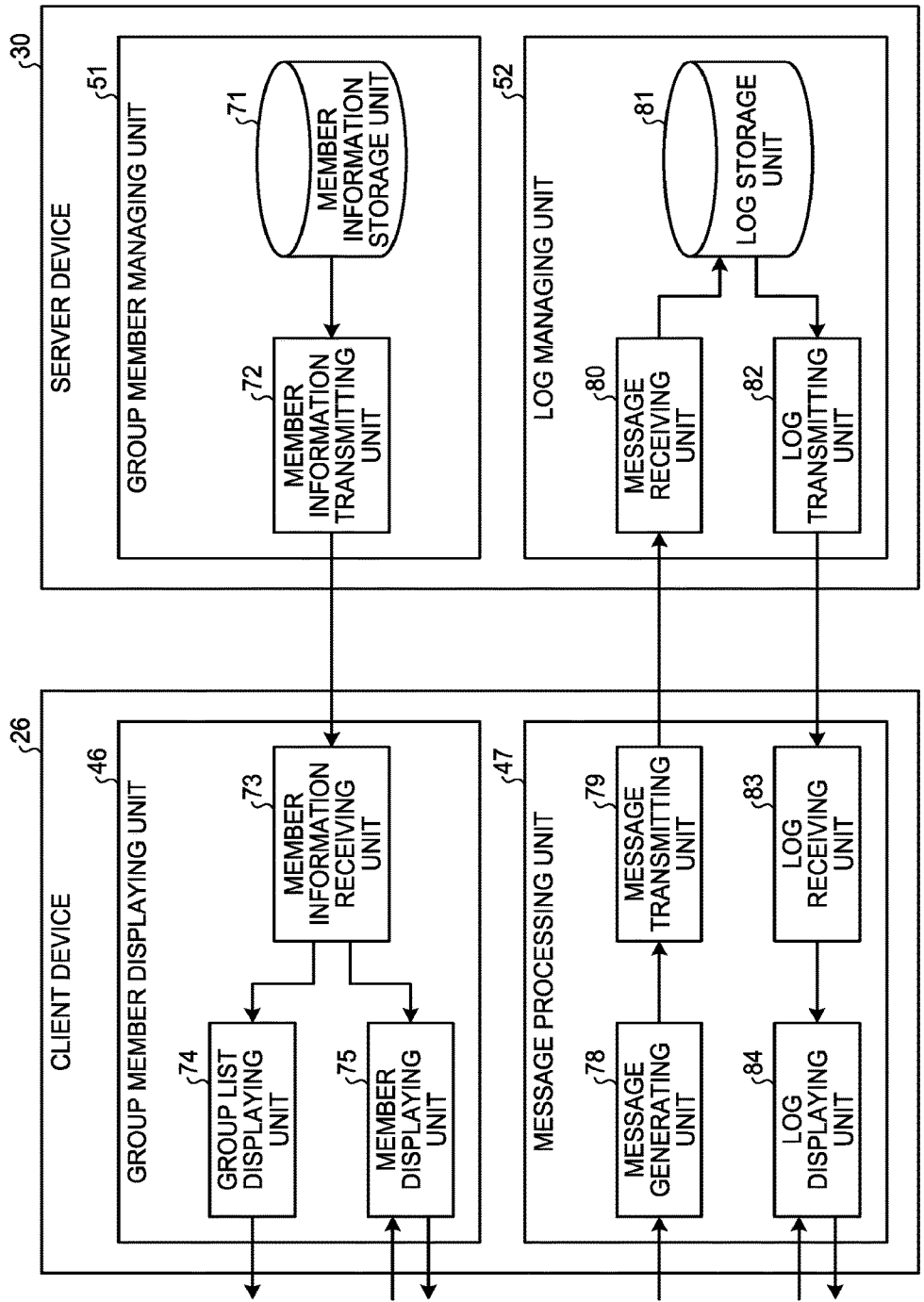
FIG. 7 is a diagram illustrating functional configurations of the client device and the server device according to the first embodiment for executing group and member management and message transmission and reception.

FIG. 7 is a diagram illustrating functional configurations of the client device 26 and the server device 30 according to the first embodiment for executing group and member management and message transmission and reception.

The group member managing unit 51 includes a member information storage unit 71 and a member information transmitting unit 72. The group member displaying unit 46 includes a member information receiving unit 73, a group list displaying unit 74, and a member displaying unit 75.

The member information storage unit 71 stores therein a user ID for identifying each user and an instrument ID for identifying each instrument 20. The member information storage unit 71 stores therein a group ID for identifying a group to which each user belongs.

Upon access from the client device 26 operated by any user, the member information transmitting unit 72 transmits a group list of groups to which the user belongs, a group ID for identifying each group included in the group list, and a member list indicating any member of each group included in the group list. Upon change of any member belonging to a group, the member information transmitting unit 72 transmits the member list of the group to each client device 26 operated by a member in the group.

The member information receiving unit 73 receives the group list, the group ID, and the member list from the server device 30. The group list displaying unit 74 displays the group list in response to an instruction from a user. When a group ID for identifying any group included in the group list is specified by the user, the member displaying unit 75 displays the member list corresponding to the specified group ID.

The message processing unit 47 includes a message generating unit 78, a message transmitting unit 79, a log receiving unit 83, and a log displaying unit 84. The log managing unit 52 includes a message receiving unit 80, a log storage unit 81, and a log transmitting unit 82.

The message generating unit 78 receives selection of any one of groups to which a user belongs. The message generating unit 78 displays, for example, the message screen illustrated in FIG. 2, and generates a message in response to an operation on the message screen by the user. The message is, for example, text data. Alternatively, the message may be image data or sound data. The message transmitting unit 79 transmits, to the server device 30, the generated message together with a group ID for identifying the selected group.

The message receiving unit 80 receives the message together with the group ID from the client device 26. The log storage unit 81 stores therein the message received by the message receiving unit 80 in association with the group ID. Upon access from the client device 26 operated by any user, the log transmitting unit 82 transmits, to the client device 26, a log of messages transmitted by users in any group to which the user belongs.

The log receiving unit 83 receives, from the server device 30, a log of messages transmitted by members of any group to which the user operating the client device 26 belongs. The log displaying unit 84 receives selection of any one of groups to which the user belongs. The log displaying unit 84 displays, on the message screen illustrated in FIG. 2, a log of messages transmitted by members belonging to the selected group.

Figure 8:
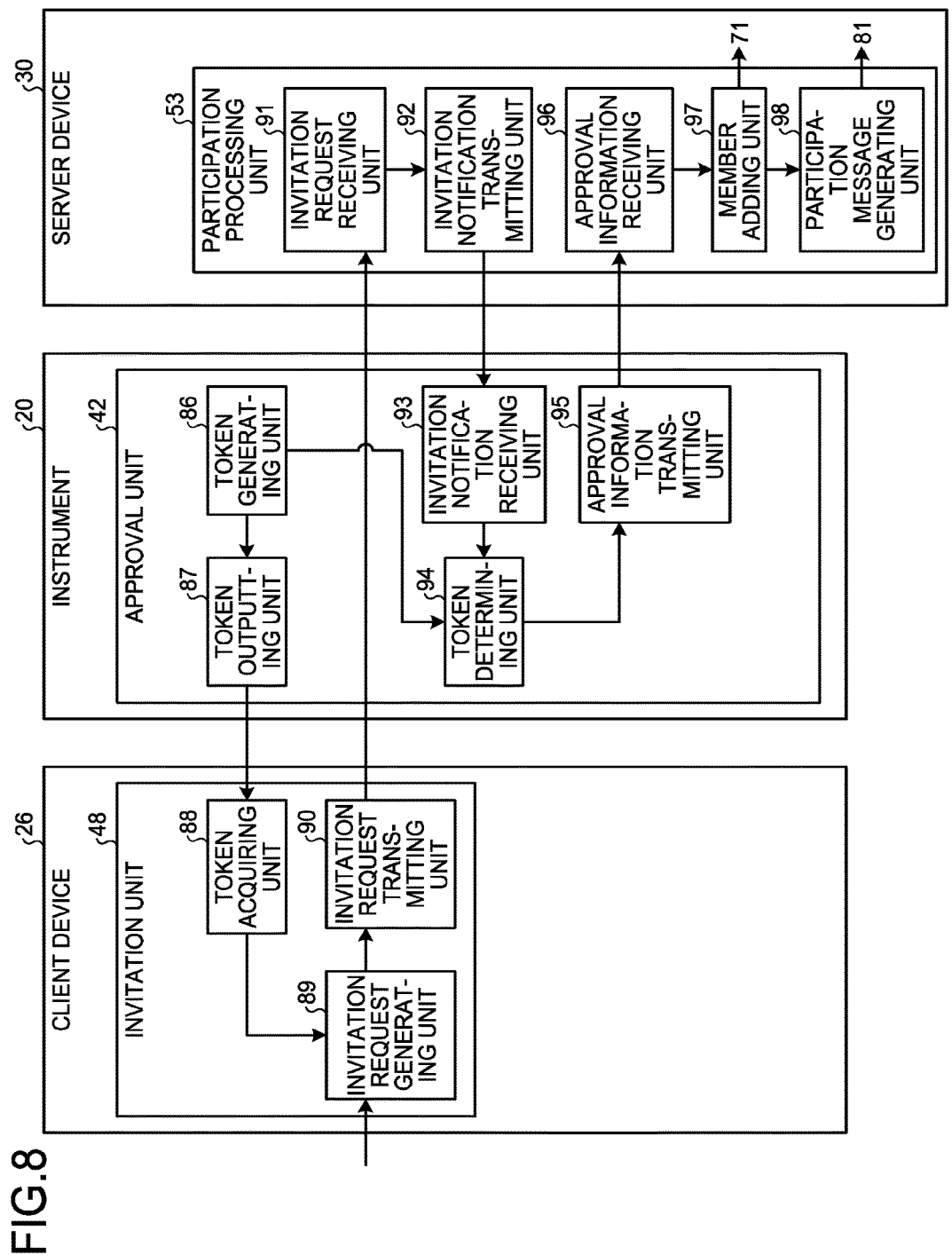
FIG. 8 is a diagram illustrating functional configurations of the instrument, the client device, and the server device according to the first embodiment for executing processing that allows participation of the instrument into a group.

FIG. 8 is a diagram illustrating functional configurations of the instrument 20, the client device 26, and the server device 30 according to the first embodiment for executing processing that allows participation of the instrument 20 in a group.

The approval unit 42 includes a token generating unit 86, a token outputting unit 87, an invitation notification receiving unit 93, a token determining unit 94, and an approval information transmitting unit 95. The invitation unit 48 includes a token acquiring unit 88, an invitation request generating unit 89, and an invitation request transmitting unit 90. The participation processing unit 53 includes an invitation request receiving unit 91, an invitation notification transmitting unit 92, an approval information receiving unit 96, a member adding unit 97, and a participation message generating unit 98.

The token generating unit 86 generates token information in response to an operation by a user. The token information is, for example, a random string that changes each time. The token generating unit 86 feeds the generated token information to the token outputting unit 87 and the token determining unit 94.

The token outputting unit 87 outputs, in response to an operation by the user, token information acquirable by the client device 26 and an instrument ID for identifying the own instrument 20. For example, the token outputting unit 87 displays a two-dimensional code (QR code (registered trademark) or bar code, for example) indicating the token information and the instrument ID. For example, the token outputting unit 87 outputs the token information and the instrument ID through non-contact proximity communication (NFC). For example, the token outputting unit 87 may output the token information and the instrument ID to the client device 26 by infrared or other communication.

The token acquiring unit 88 acquires, in response to an operation by the user, the token information and the instrument ID output from the instrument 20. For example, when the instrument 20 displays the two-dimensional code, the token acquiring unit 88 acquires the token information and the instrument ID included in the two-dimensional code by capturing an image of the two-dimensional code through the camera 407 included in the client device 26. For example, when the instrument 20 outputs the token information and the instrument ID through the non-contact proximity communication (NFC), the token acquiring unit 88 receives the token information and the instrument ID through the non-contact proximity communication (NFC).

The invitation request generating unit 89 receives selection of a group to which the instrument 20 is invited from among groups to which a user operating the client device 26 belongs. The invitation request generating unit 89 generates an invitation request including a group ID for identifying the selected group, and the token information and the instrument ID acquired by the token acquiring unit 88. The invitation request transmitting unit 90 transmits the generated invitation request to the server device 30.

The invitation request receiving unit 91 receives the invitation request from the client device 26. The invitation request receiving unit 91 feeds the invitation notification transmitting unit 92 with the token information, the instrument ID, and the group ID included in the invitation request.

The invitation notification transmitting unit 92 transmits invitation notification for invitation to the group having the group ID received from the invitation request receiving unit 91, to the instrument 20 having the instrument ID received from the invitation request receiving unit 91. In this case, the invitation notification transmitting unit 92 adds, to the invitation notification, the token information and the group ID received from the invitation request receiving unit 91.

The invitation notification receiving unit 93 receives the invitation notification from the server device 30. The invitation notification receiving unit 93 feeds the token determining unit 94 with the token information and the group ID included in the invitation notification.

The token determining unit 94 determines whether the invitation notification including the token information output from the token outputting unit 87 has been received from the server device 30. Specifically, the token determining unit 94 determines that the invitation notification is valid if the token information generated by the token generating unit 86 matches the token information included in the invitation notification. The token determining unit 94 determines that the invitation notification is not valid if no match has been made between the token information. The token determining unit 94 feeds the approval information transmitting unit 95 with a result of the determination and the group ID.

If the received invitation notification is valid, the approval information transmitting unit 95 transmits, to the server device 30, approval information that approves participation in a group specified by the group ID. In this case, the approval information transmitting unit 95 adds the group ID and the instrument ID to the approval information. If the received invitation notification is not valid, the approval information transmitting unit 95 may perform no processing or may give notification that the invitation notification is not valid.

The approval information receiving unit 96 receives the approval information from the instrument 20. The approval information receiving unit 96 feeds the member adding unit 97 with the group ID and the instrument ID included in the received approval information.

The member adding unit 97 accesses the member information storage unit 71 to add, as a new member to the group having the group ID included in the approval information, the instrument 20 having the instrument ID included in the approval information. When any member belonging to the group is updated by the member adding unit 97, the member information transmitting unit 72 transmits a member list obtained through the update to each member belonging to the updated group.

When the member adding unit 97 has added the instrument 20 as a member, the participation message generating unit 98 generates a participation message. Then, the participation message generating unit 98 stores, in the log storage unit 81, a log of the generated participation message in association with the group to which the instrument 20 is added. When the log of the participation message has been stored in the log storage unit 81, the log transmitting unit 82 transmits the participation message to each member belonging to the group to which the instrument 20 has been added.

Figure 9:
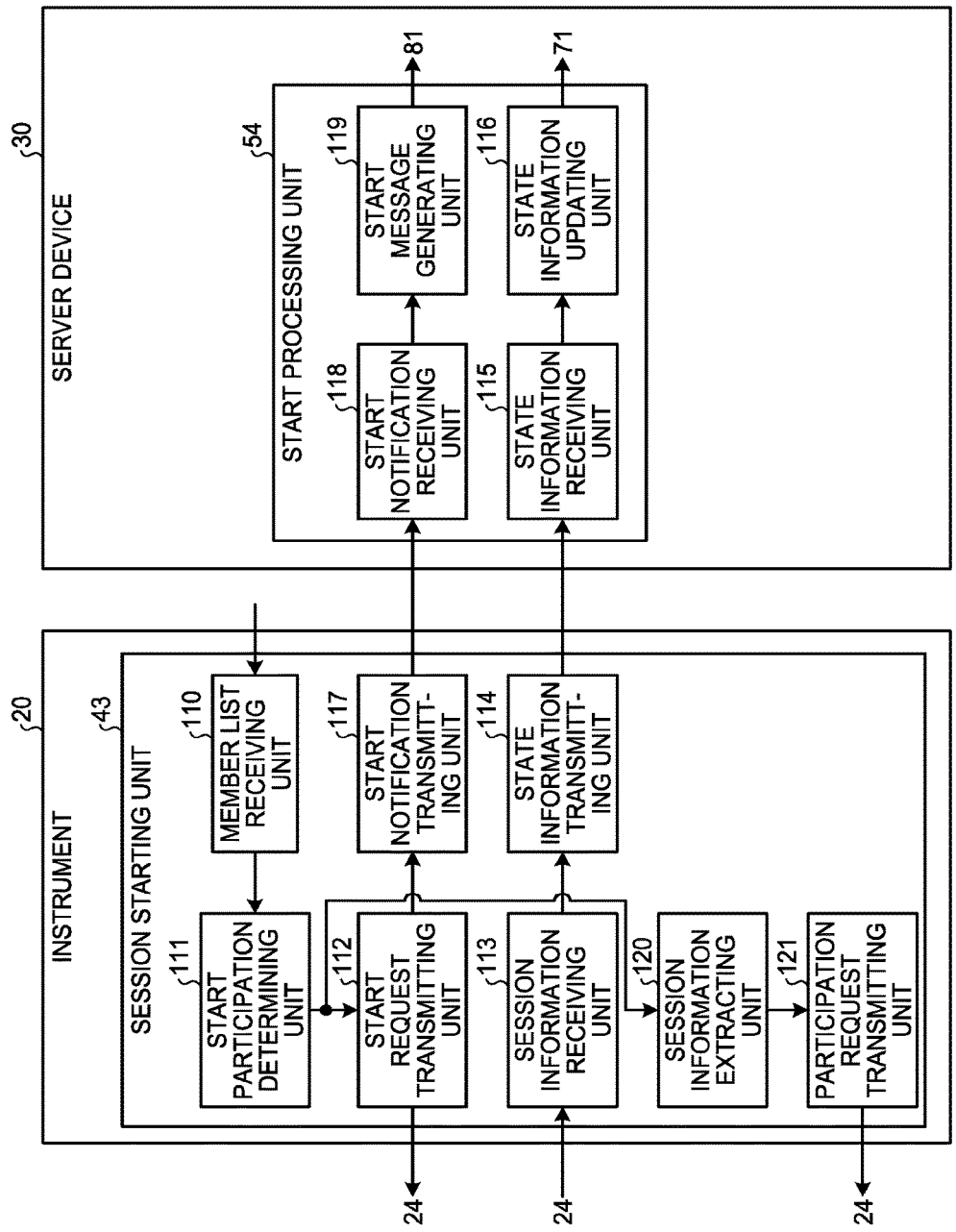
FIG. 9 is a diagram illustrating functional configurations of the instrument and the server device according to the first embodiment for executing processing that starts a session and processing that allows participation of the instrument into a session.

FIG. 9 is a diagram illustrating functional configurations of the instrument 20 and the server device 30 according to the first embodiment for executing processing that starts a session and processing that allows participation of the instrument 20 in a session.

The session starting unit 43 includes a member list receiving unit 110, a start participation determining unit 111, a start request transmitting unit 112, a session information receiving unit 113, a state information transmitting unit 114, a start notification transmitting unit 117, a session information extracting unit 120, and a participation request transmitting unit 121. The start processing unit 54 includes a state information receiving unit 115, a state information updating unit 116, a start notification receiving unit 118, and a start message generating unit 119.

The member list receiving unit 110 receives, from the server device 30, the member list of a group in which the own instrument 20 participates. The member list receiving unit 110 receives a member list upon each update of any member belonging to the group.

The start participation determining unit 111 determines whether to start a new session or allow participation in an existing session. The start participation determining unit 111 refers to the received member list to determine that no session exists if no other instrument 20 of the same kind exists in the member list, and start a new session. The start participation determining unit 111 refers to the received member list to determine that a session already exists if another instrument 20 of the same kind exists in the member list, and allow participation of the own instrument 20 in the existing session.

When starting a new session, the start participation determining unit 111 calls the start request transmitting unit 112. The start request transmitting unit 112 transmits, to the session managing device 24, a start request to start a new session. The start request includes the IP address of the own instrument 20, and a password for access to the own instrument 20.

Upon reception of the start request from the instrument 20, the session managing device 24 starts a session including the instrument 20. For example, the session managing device 24 sets the address and the password of the instrument 20 to the relay device 22. This configuration allows the relay device 22 to communicate information with the instrument 20 having transmitted the start request.

When only one instrument 20 is participating, a session can be still started for communication of information through the relay device 22. In this case, only one instrument 20 is participating in the session right after the session has been started (single-person conference). The session managing device 24 transmits, to the instrument 20 having transmitted a request to start a session, session information (a conference ID and a password, for example) for participation in a newly started session.

The session information receiving unit 113 receives the session information (the conference ID and the password, for example) from the session managing device 24. The session information receiving unit 113 extracts the conference ID and the password included in the received session information, and feeds the conference ID and the password to the state information transmitting unit 114. The state information transmitting unit 114 transmits, to the server device 30, the acquired conference ID, the acquired password, an instrument ID for identifying the own instrument 20, and a group ID for identifying a group in which the own instrument 20 is participating.

The state information receiving unit 115 receives the conference ID, the password, the instrument ID, and the group ID from the instrument 20. The state information receiving unit 115 feeds the state information updating unit 116 with the conference ID, the password, the instrument ID, and the group ID thus received. The state information updating unit 116 accesses the member list of the received group ID stored in the member information storage unit 71. Then, the state information updating unit 116 adds, in the member list of the received group ID, the received conference ID and the received password as items of state information describing the state of the instrument 20 having the received instrument ID.

When the start request transmitting unit 112 has transmitted a start request to the session managing device 24, the start notification transmitting unit 117 transmits, to the server device 30, activation notification that a session has been started. The activation notification includes the instrument ID and the group ID.

The start notification receiving unit 118 receives the activation notification from the instrument 20. The start notification receiving unit 118 feeds the start message generating unit 119 with the instrument ID and the group ID included in the activation notification.

Upon reception of the activation notification, the start message generating unit 119 generates a start message indicating that a session has been newly started. Then, the start message generating unit 119 stores, in the log storage unit 81, a log of the generated start message in association with the group having the group ID included in the activation notification. When the log of the start message has been stored in the log storage unit 81, the log transmitting unit 82 transmits the start message to each member belonging to the group having the group ID included in the activation notification.

The start participation determining unit 111 calls the session information extracting unit 120 to allow participation of the own instrument 20 in an existing session. The session information extracting unit 120 extracts the session information (the conference ID and the password) from the state information of another instrument 20 of the same kind included in the member list. The session information extracting unit 120 feeds the extracted session information to the participation request transmitting unit 121.

Upon reception of the session information from the session information extracting unit 120, the participation request transmitting unit 121 transmits a participation request for requesting participation in the existing session. The participation request includes the session information, the IP address of the own instrument 20, and a password for access to the own instrument 20.

Upon reception of the participation request from the instrument 20, the session managing device 24 allows participation of the instrument 20 in a session having a specified conference ID subject to validness of the session information (the conference ID and the password). For example, the session managing device 24 sets, to the relay device 22, the IP address and the password of the instrument 20 having requested participation. This configuration allows the relay device 22 to transmit information received from the instrument 20 already participating in the session to the newly participating instrument 20, and further allows communications of information in the opposite direction.

Figure 10:
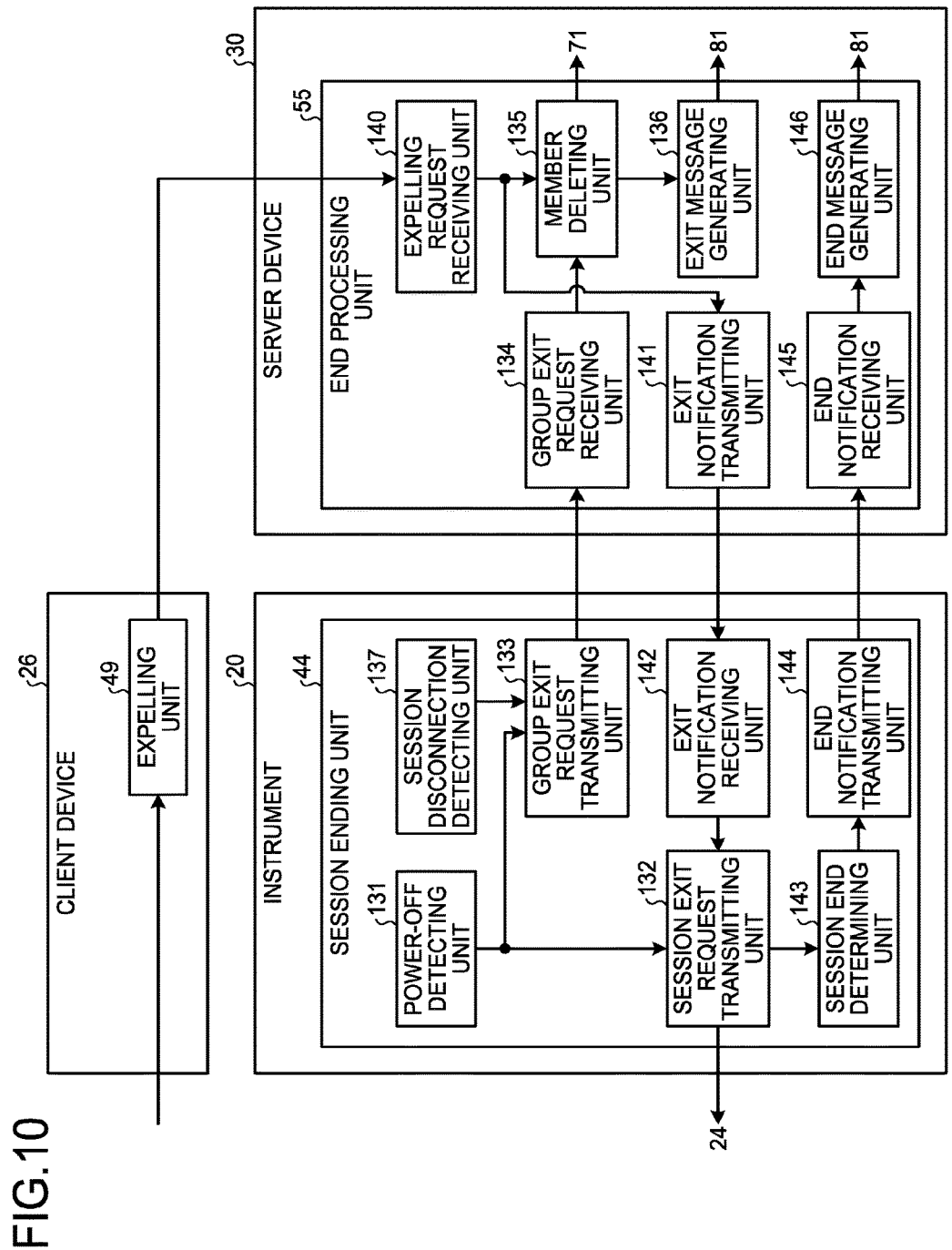
FIG. 10 is a diagram illustrating functional configurations of the instrument, the client device, and the server device according to the first embodiment for executing processing that causes the instrument to exit a session and processing that ends the session.

FIG. 10 is a diagram illustrating functional configurations of the instrument 20, the client device 26, and the server device 30 according to the first embodiment for executing processing that causes the instrument 20 to exit a session and processing that ends the session.

The session ending unit 44 includes a power-off detecting unit 131, a session exit request transmitting unit 132, a group exit request transmitting unit 133, a session disconnection detecting unit 137, an exit notification receiving unit 142, a session end determining unit 143, and an end notification transmitting unit 144. The end processing unit 55 includes a group exit request receiving unit 134, a member deleting unit 135, an exit message generating unit 136, an expelling request receiving unit 140, an exit notification transmitting unit 141, an end notification receiving unit 145, and an end message generating unit 146.

The power-off detecting unit 131 detects a power-off operation performed on the instrument 20. When the power-off detecting unit 131 has detected the power-off operation, the session exit request transmitting unit 132 transmits a session exit request to the session managing device 24. Upon reception of the session exit request from the instrument 20, the session managing device 24 causes the instrument 20 to exit the session.

When the power-off detecting unit 131 has detected the power-off operation, the group exit request transmitting unit 133 transmits a group exit request to the server device 30. The group exit request includes the instrument ID and the group ID.

The group exit request receiving unit 134 receives the group exit request from the instrument 20. The group exit request receiving unit 134 feeds the member deleting unit 135 with the group ID and the instrument ID included in the group exit request.

The member deleting unit 135 accesses the member list of the group ID included in the group exit request, which is stored in the member information storage unit 71. The member deleting unit 135 deletes the instrument 20 having the instrument ID included in the group exit request from among members of the accessed member list.

When the member deleting unit 135 has deleted the instrument 20 from among the members, the exit message generating unit 136 generates an exit message indicating exit of the instrument 20 from among the members. Then, the exit message generating unit 136 stores, in the log storage unit 81, a log of the generated exit message in association with the group having the group ID included in the group exit request. When the log of the exit message has been stored in the log storage unit 81, the log transmitting unit 82 transmits the exit message to each member belonging to the group having the group ID included in the group exit request.

The session disconnection detecting unit 137 detects session disconnection for some reason. For example, the session disconnection detecting unit 137 detects session disconnection due to failure of communication through the network. When the session disconnection detecting unit 137 has detected session disconnection, the group exit request transmitting unit 133 transmits a group exit request to the server device 30. Then, the group exit request receiving unit 134, the member deleting unit 135, and the exit message generating unit 136 executes, at transmission of the group exit request due to the session disconnection, processing similar to that performed in response to the power-off operation.

The expelling unit 49 of the client device 26 receives, from a user, an operation to expel the instrument 20 participating in a group. In this case, the expelling unit 49 receives the group ID of the group and the instrument ID of the instrument 20 at the expelling operation. Then, the expelling unit 49 transmits, to the server device 30, an expelling request to expel the instrument 20 participating in the group. The expelling request includes the group ID and the instrument ID received at the expelling operation.

The expelling request receiving unit 140 receives the expelling request from the client device 26. The expelling request receiving unit 140 feeds the member deleting unit 135 with the group ID and the instrument ID included in the expelling request. Then, the member deleting unit 135 and the exit message generating unit 136 execute, at reception of the expelling request, processing similar to that performed in response to the power-off operation.

The exit notification transmitting unit 141 receives the instrument ID included in the expelling request from the expelling request receiving unit 140. The exit notification transmitting unit 141 transmits exit notification indicating exit of the group to the instrument 20 having the instrument ID included in the expelling request.

The exit notification receiving unit 142 receives the exit notification from the server device 30. Upon the reception of the exit notification from the server device 30, the exit notification receiving unit 142 calls the session exit request transmitting unit 132. When called by the exit notification receiving unit 142, the session exit request transmitting unit 132 transmits a session exit request to the session managing device 24.

When the session exit request transmitting unit 132 has transmitted the session exit request, the session end determining unit 143 determines whether the own instrument 20 is the last instrument 20 included in the session. If the own instrument 20 is the last instrument 20 included in the session, the session end determining unit 143 determines that the session has ended. If the own instrument 20 has exited the session but any other instrument 20 is included in the session, the session end determining unit 143 determines that the session does not end.

If the session end determining unit 143 determines that the session has ended, the end notification transmitting unit 144 transmits an end notification indicating that the session has ended to the server device 30. The end notification includes the group ID of the group.

The end notification receiving unit 145 receives the end notification from the instrument 20. The end notification receiving unit 145 feeds the end message generating unit 146 with the group ID included in the end notification.

Upon reception of the end notification from any instrument 20, the end message generating unit 146 generates an end message indicating that the session has ended. Then, the end message generating unit 146 stores, in the log storage unit 81, a log of the generated end message in association with the group having the group ID included in the end notification. When the log of the end message has been stored in the log storage unit 81, the log transmitting unit 82 transmits the end message to each member belonging to the group having the group ID included in the end notification.

Figure 11:
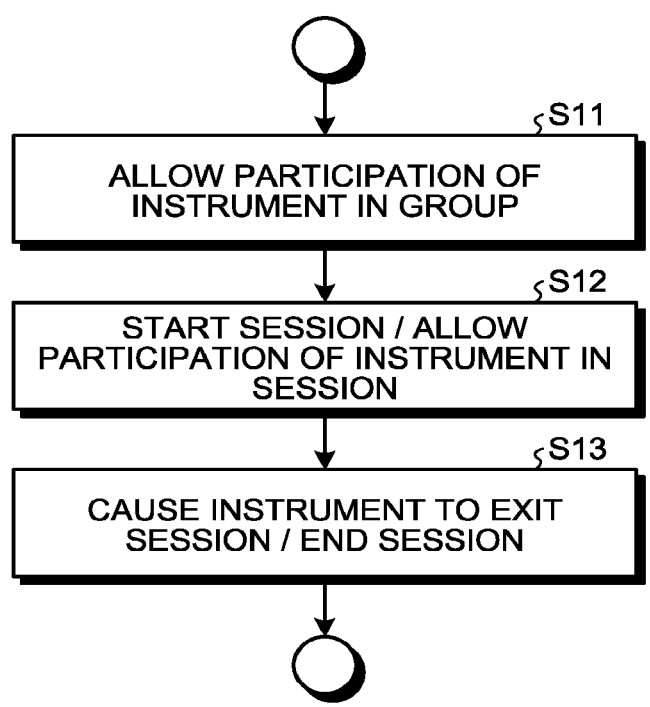
FIG. 11 is a flowchart of the processing of the conference system.

FIG. 11 is a flowchart of the processing at the conference system 10. The conference system 10 executes processing on each instrument 20, following the process illustrated in FIG. 11.

First, at step S11, the conference system 10 executes processing that allows participation of the instrument 20 in a group. Subsequently, at step S12, the conference system 10 executes processing that starts a session or processing that allows participation of the instrument 20 in a session. Then, at step S13, the conference system 10 executes processing that causes the instrument 20 to exit the session or processing that ends the session.

Figure 12:
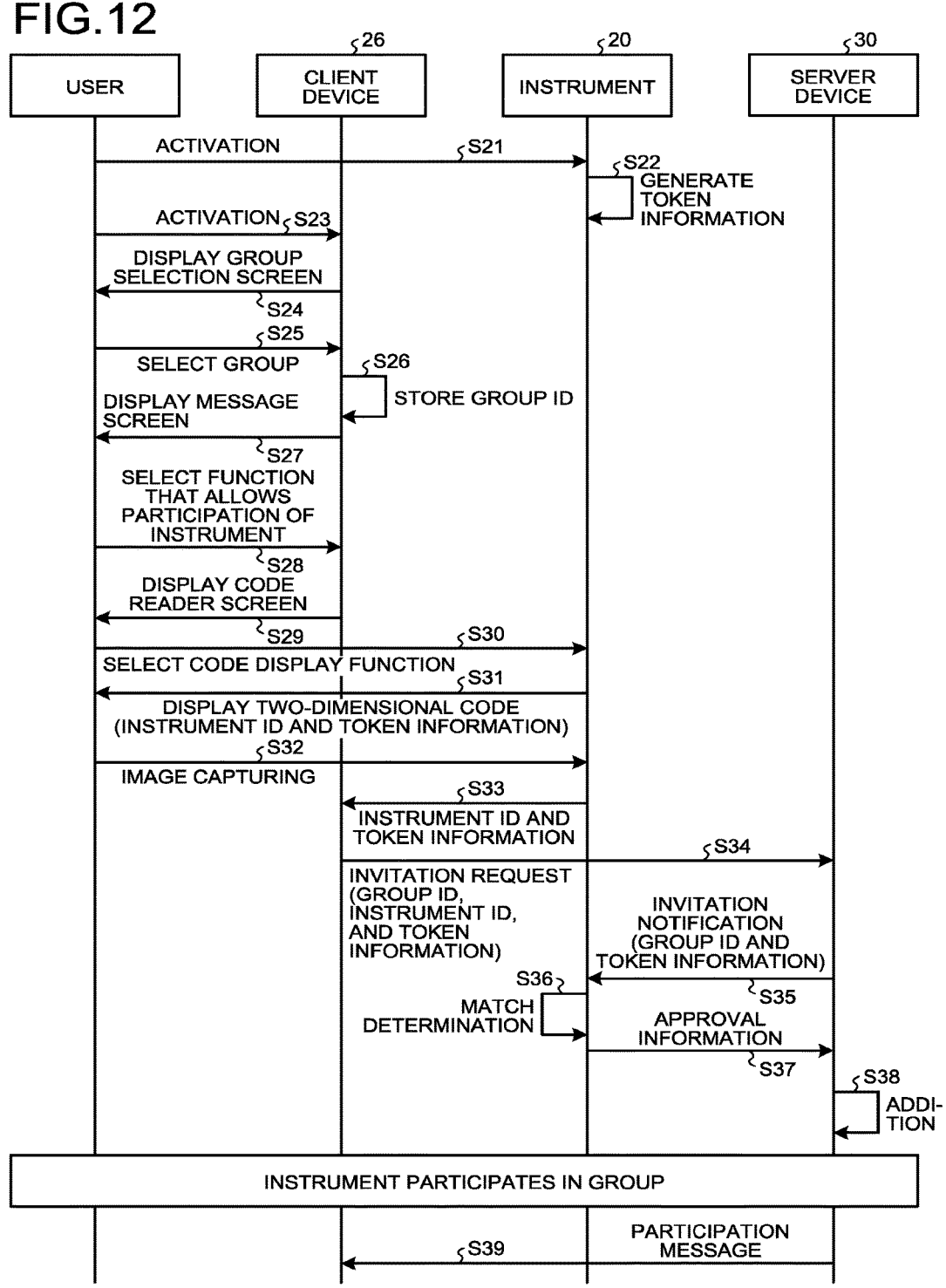
FIG. 12 is a diagram illustrating the sequence of processing that allows participation of the instrument in a group.

FIG. 12 is a diagram illustrating the sequence of processing that allows participation of the instrument 20 in a group. The conference system 10 executes the processing to allow participation of the instrument 20 in a group, following the sequence illustrated in FIG. 12.

First, a user activates the instrument 20 (step S21). Subsequently, the instrument 20 generates token information (step S22).

Subsequently, the user activates the client device 26 (step S23). For example, the user executes a predetermined computer program on the client device 26. When activated, the client device 26 displays a group selection screen, for example, as illustrated in "A" of FIG. 13 (step S24). The group selection screen includes a group list indicating a group to which the user belongs as a member.

Figure 13:
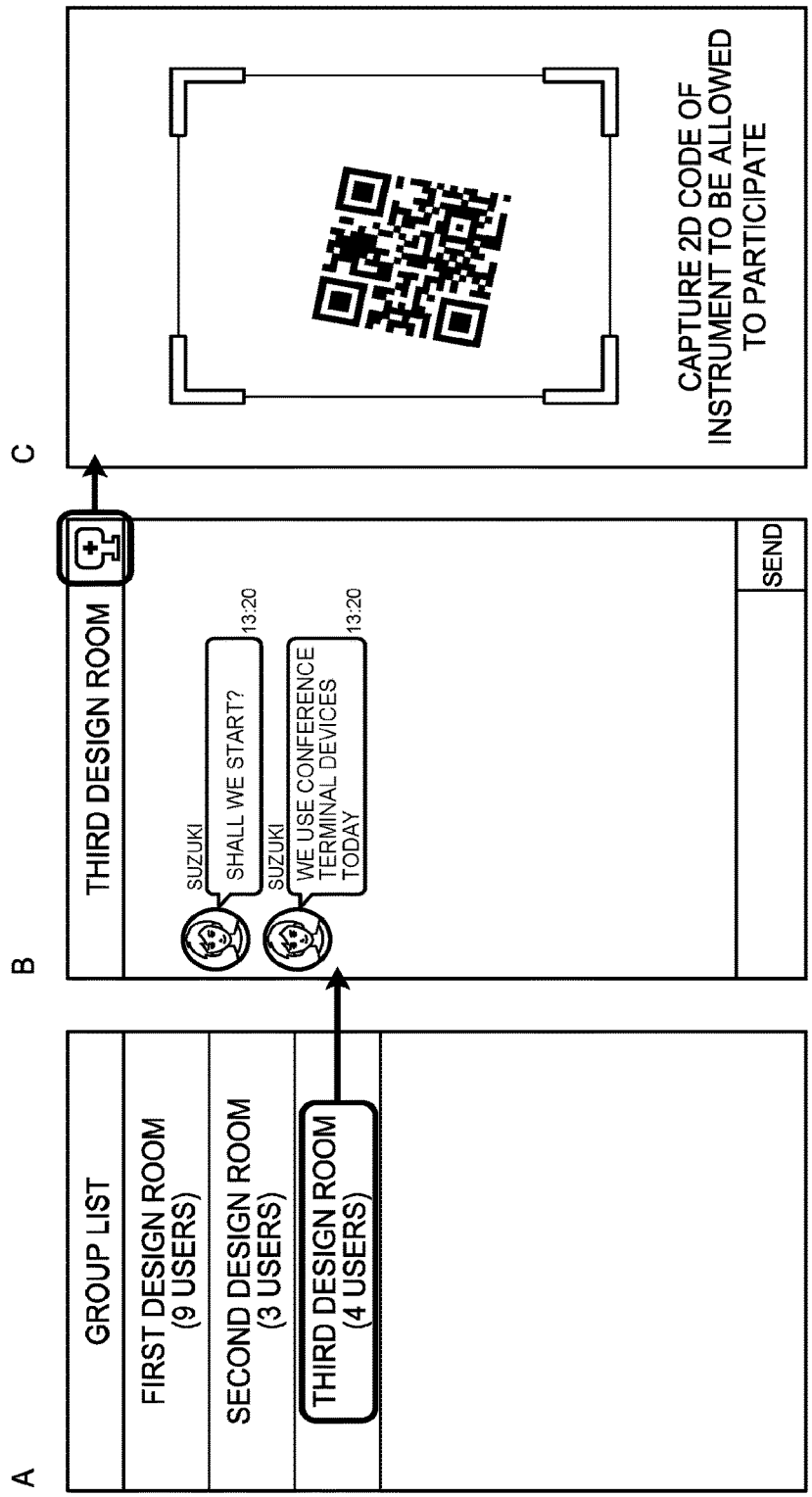
FIG. 13 is a diagram illustrating screen transition of the client device at processing that allows participation of the instrument in a group.

Subsequently, as illustrated in "A" of FIG. 13, the user operates the group selection screen to select any one group (step S25). Upon the selection of the group, the client device 26 stores a group ID for identifying the selected group (step S26). Subsequently, the client device 26 displays a message screen of the selected group as illustrated in "B" of FIG. 13 (step S27).

This message screen includes a button for executing a function that allows participation of the instrument 20 in a group. Subsequently, as illustrated in "B" of FIG. 13, the user operates the message screen to select the function that allows participation of the instrument 20 in a group (step S28). In this example, a function that reads a two-dimensional code (QR code (registered trademark), for example) is selected. Upon the selection of the function that reads a two-dimensional code, the client device 26 displays a code reader screen for reading a two-dimensional code as illustrated in "C" of FIG. 13 (step S29).

Figure 14:
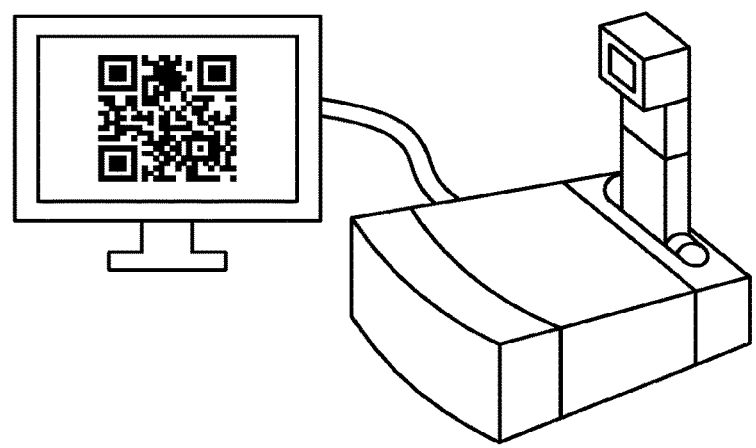
FIG. 14 is a diagram illustrating the instrument displaying a two-dimensional code.

Subsequently, the user operates the instrument 20 to select the code display function (step S30). Upon the selection of the code display function, the instrument 20 causes the display device to display a two-dimensional code, for example, as illustrated in FIG. 14 (step S31). This two-dimensional code includes the instrument ID of the instrument 20 and the token information.

Subsequently, the user captures an image of the two-dimensional code displayed on the instrument 20 by the client device 26 (step S32). Subsequently, the client device 26 acquires, from the captured image of the two-dimensional code, the instrument ID and the token information included in the two-dimensional code (step S33).

Subsequently, the client device 26 transmits, to the server device 30, an invitation request including a group ID for identifying a group selected by the user, the instrument ID, and the token information (step S34). Subsequently, the server device 30 transmits, to the instrument 20 specified by the instrument ID included in the invitation request, invitation notification including the group ID and the token information (step S35).

Upon reception of the invitation notification from the server device 30, the instrument 20 determines whether the token information generated at step S22 matches the token information included in the invitation notification (step S36). If the match is made, the instrument 20 determines that the invitation notification is valid. Upon the determination that the invitation notification is valid, the instrument 20 transmits approval information to the server device 30 (step S37).

Upon reception of the approval information, the server device 30 adds the instrument 20 as a member of the group having the group ID (step S38). Accordingly, the instrument 20 participates in the group.

Figure 15:
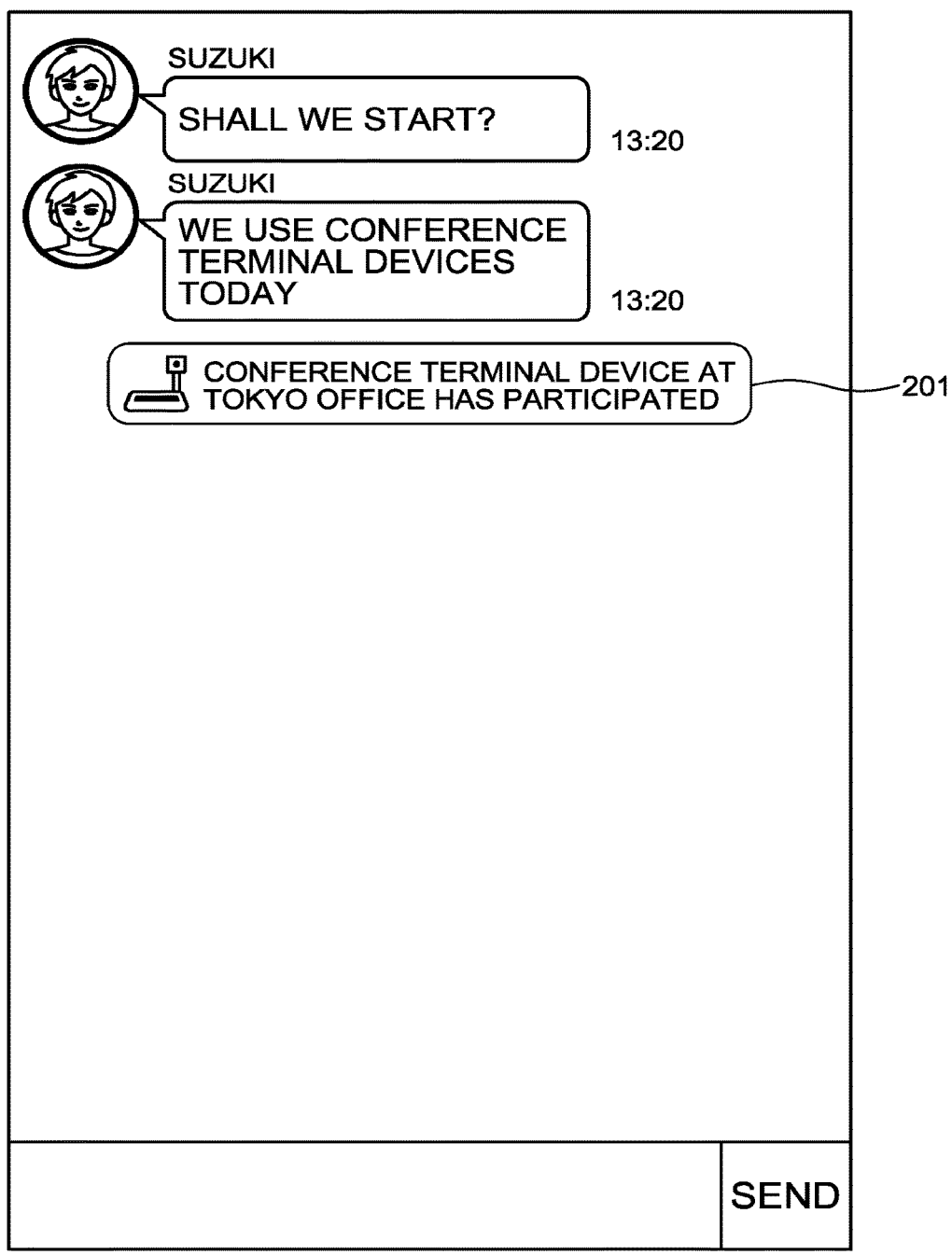
FIG. 15 is a diagram illustrating a message screen displaying a message indicating participation of a conference terminal device at a Tokyo office in a group.

Then, the server device 30 generates a participation message indicating the participation of the instrument 20 in the group, and transmits the participation message to the client devices 26 of all members of the group (step S39). Accordingly, the client device 26 can display, on the message screen, a message 201 illustrated in FIG. 15, indicating participation of a conference terminal device at the Tokyo office in the group.

Figure 16:
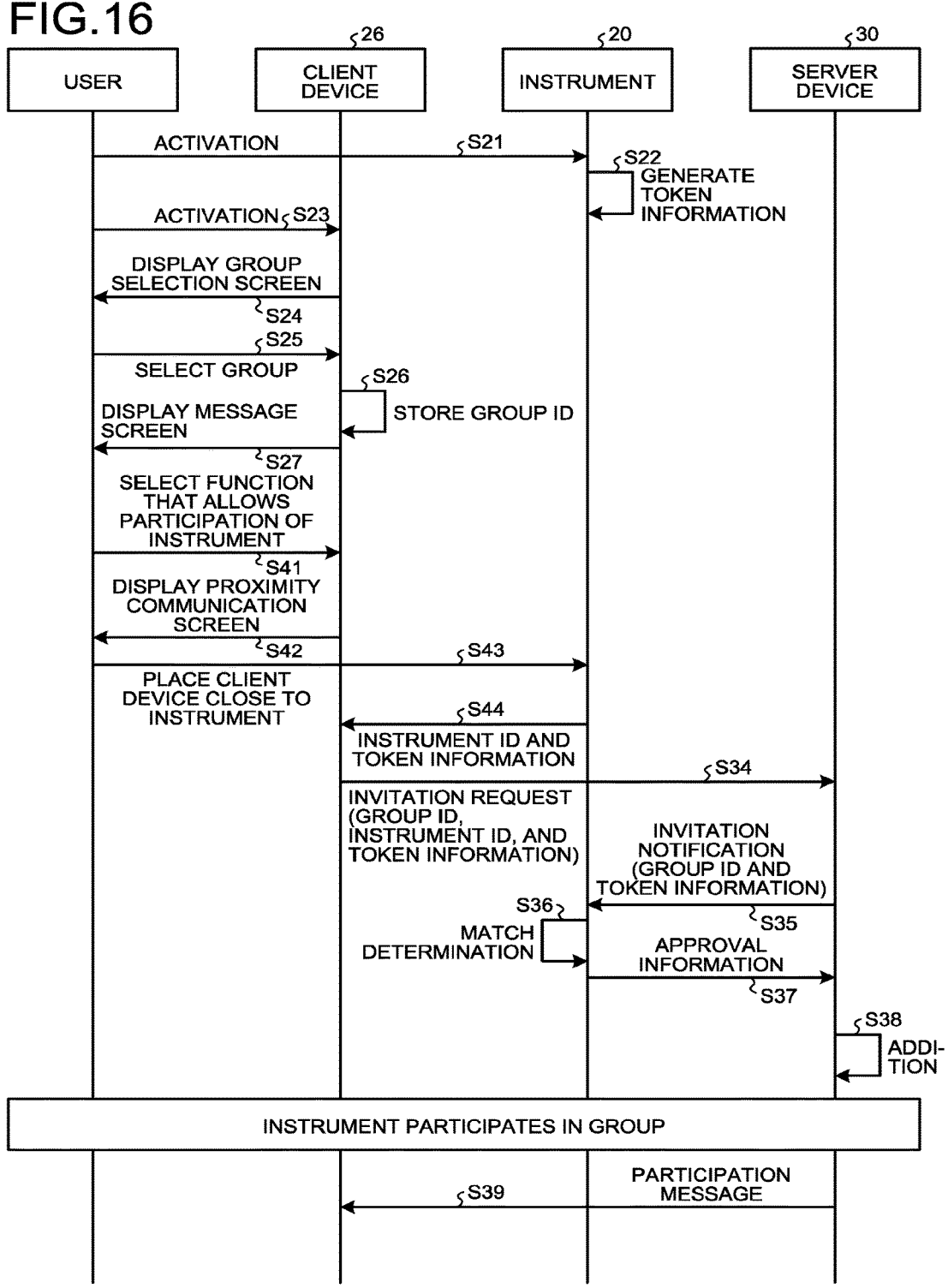
FIG. 16 is a diagram illustrating the sequence of processing that allows participation of the instrument in a group by a non-contact proximity communication (NFC) scheme.

FIG. 16 is a diagram illustrating the sequence of processing that allows participation of the instrument 20 in a group by the non-contact proximity communication (NFC) scheme. In the conference system 10, the instrument 20 can be allowed to participate in a group by the non-contact proximity communication (NFC) scheme. In this case, the conference system 10 executes the processing, following the sequence illustrated in FIG. 16.

First, the conference system 10 executes, at steps S21 to S27, processing same as that of the sequence illustrated in FIG. 12.

Figure 17:
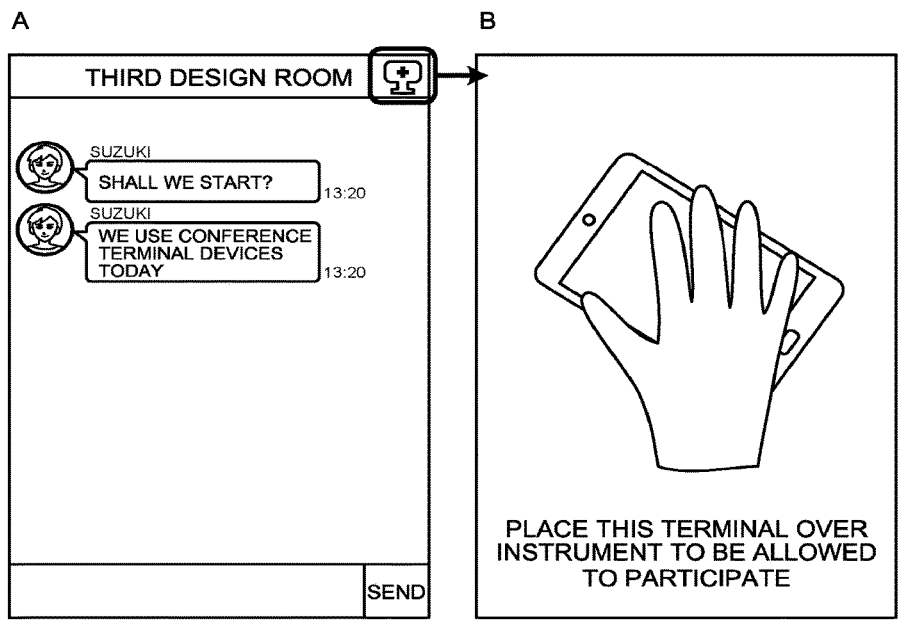
FIG. 17 is a diagram illustrating screen transition of the client device at processing that allows participation of the instrument in a group by the non-contact proximity communication scheme.

When the message screen is displayed, the user operates the message screen to select a function that allows participation of the instrument 20 in a group as illustrated in "A" of FIG. 17 (step S41). In this example, the user selects a function that reads information by the non-contact proximity communication scheme. Upon the selection of the function that reads information by the non-contact proximity communication scheme, the client device 26 displays a proximity communication screen for allowing the user to read information through the non-contact proximity communication as illustrated in "B" of FIG. 17 (step S42).

Subsequently, the user places the client device 26 close to a non-contact communication terminal of the instrument 20 (step S43). Subsequently, the client device 26 acquires, from the instrument 20, the instrument ID and the token information thereof through the non-contact communication (step S44).

Thereafter, the conference system 10 executes, at steps S34 to S39, processing same as that of the sequence illustrated in FIG. 12.

Figure 18:
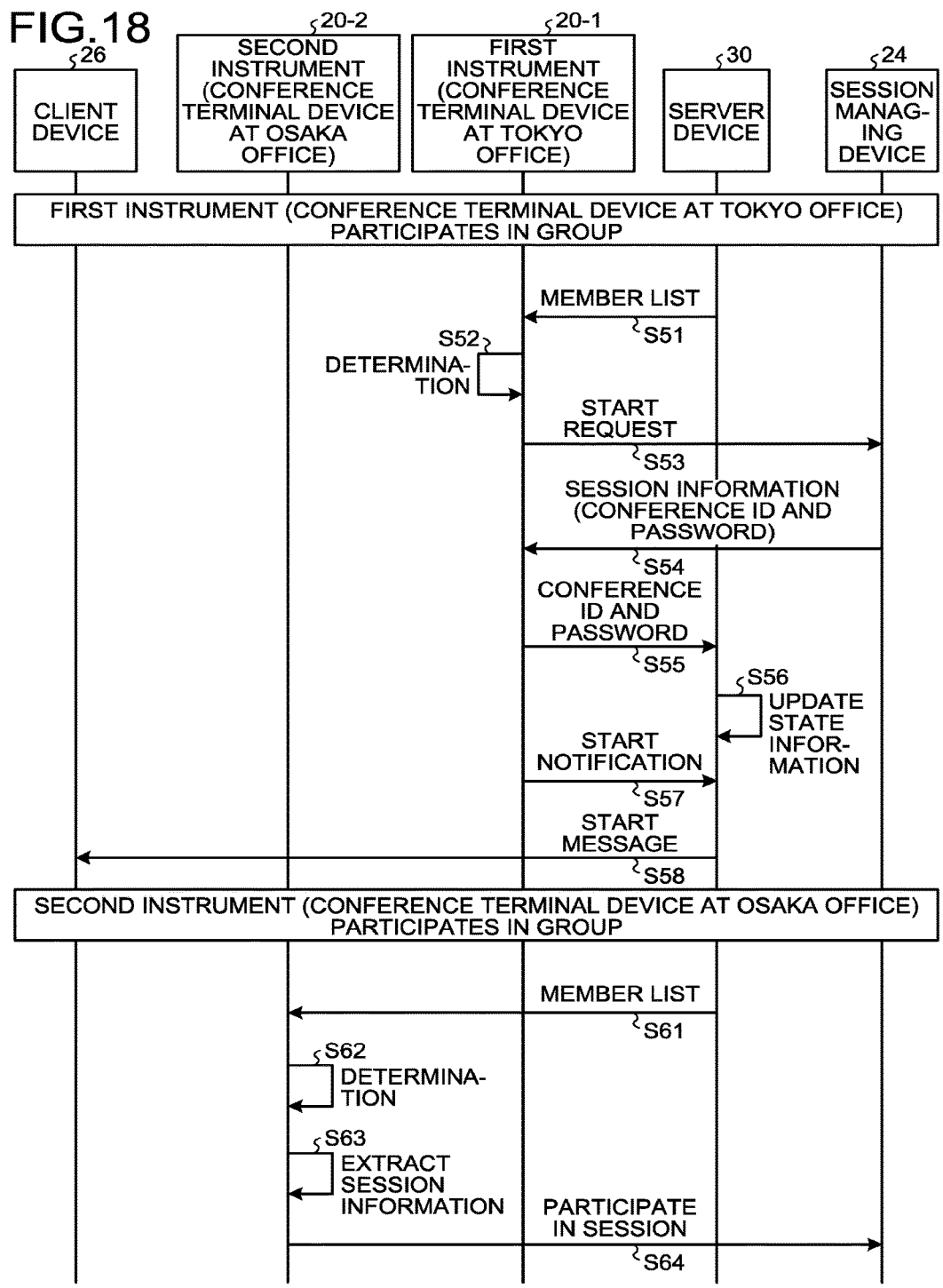
FIG. 18 is a diagram illustrating the sequence of processing that starts a session and processing that allows participation of the instrument in the session in the conference system.

FIG. 18 is a diagram illustrating the sequence of processing that starts a session and processing that allows participation of the instrument 20 in a session in the conference system 10. When starting a session or when allowing participation of the instrument 20 in a session, the conference system 10 executes the processing, following the sequence illustrated in FIG. 18.

First, upon participation of the first instrument 20-1 (for example, the conference terminal device at the Tokyo office) in a group, the first instrument 20-1 receives the member list of the group from the server device 30 (step S51).

Subsequently, the first instrument 20-1 determines whether to start a new session or participate in an existing session (step S52). The first instrument 20-1 starts a new session if no other instrument 20 of the same kind exists in the received member list, or participates in an existing session if another instrument 20 of the same kind exists in the member list. In this example, no other instrument 20 exists in the member list, and thus the first instrument 20-1 determines to start a new session.

Subsequently, the first instrument 20-1 transmits a request to start a session to the session managing device (step S53). Subsequently, upon reception of the start request from the first instrument 20-1, the session managing device 24 starts a session including the first instrument 20-1. Subsequently, the session managing device 24 transmits session information (a conference ID and a password) to the first instrument 20-1 (step S54).

Subsequently, the first instrument 20-1 transmits, to the server device 30, the conference ID and the password included in the session information received from the session managing device 24 (step S55). As illustrated in FIG. 19, the server device 30 adds the received conference ID and the received password as items of the state information of the first instrument 20-1 in the member list of the corresponding group (step S56).

Upon the transmission of the start request to the session managing device 24, the first instrument 20-1 transmits, to the server device 30, an activation notification indicating that a session has started (step S57).

Figure 20:
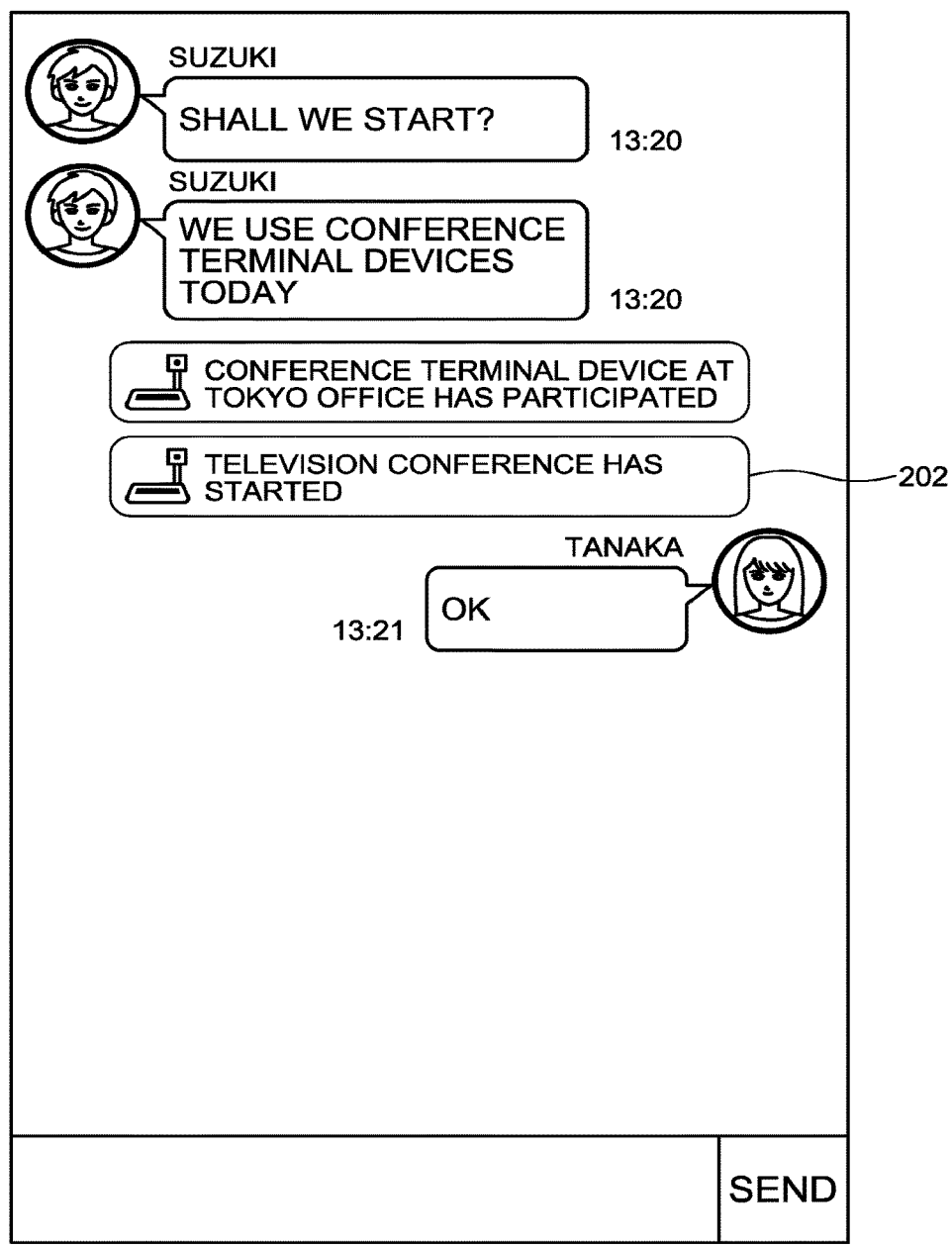
FIG. 20 is a diagram illustrating a message screen displaying a message indicating that a television conference has started.

Upon reception of the activation notification from the first instrument 20-1, the server device 30 generates a start message and transmits the start message to the client devices 26 of all members of the group (step S58). Accordingly, the client device 26 can display, on the message screen, a message 202 illustrated in FIG. 20, indicating that a television conference has started.

Figure 21:
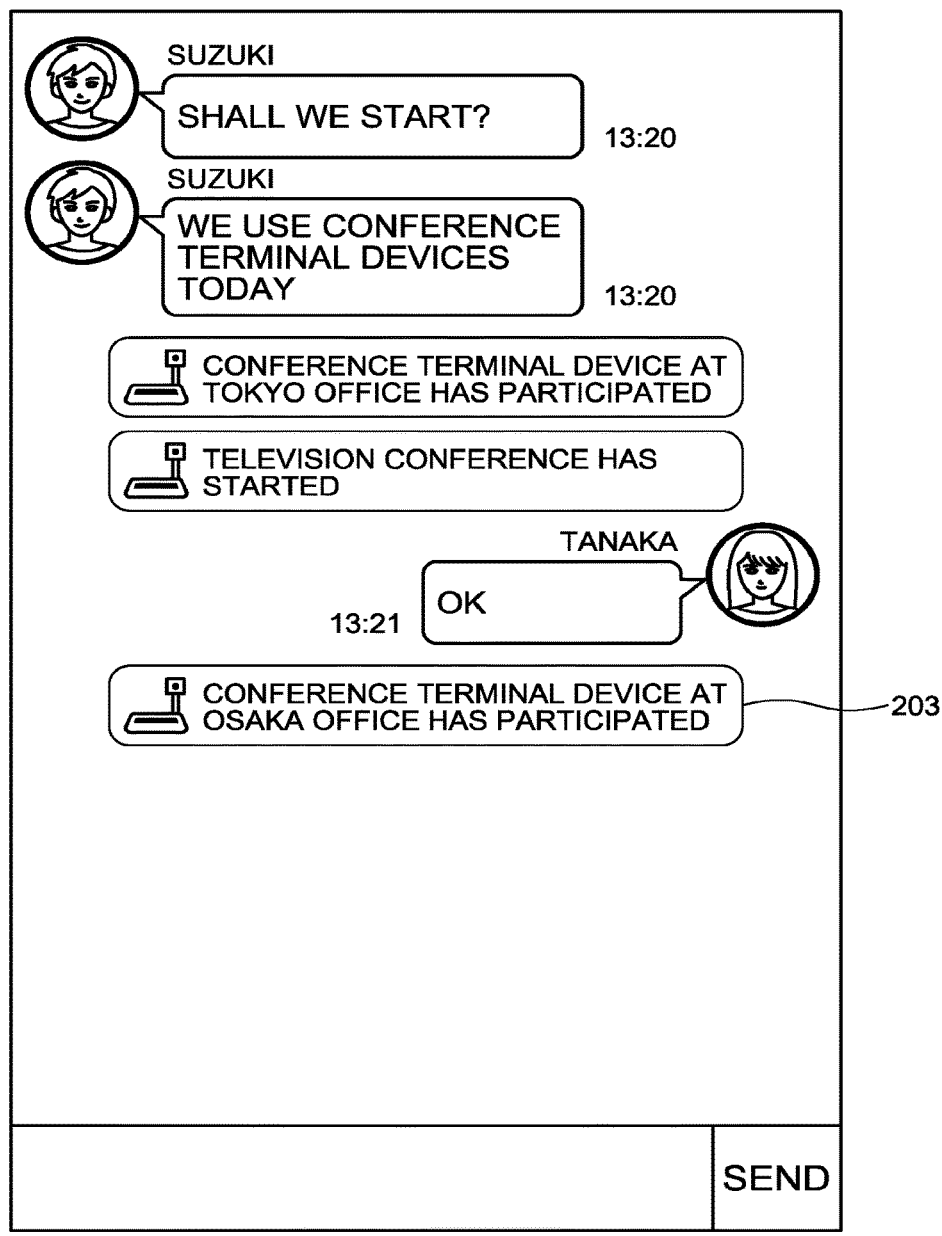
FIG. 21 is a diagram illustrating a message screen displaying a message indicating participation of a conference terminal device at an Osaka office in a group.

Assume that, subsequently, the second instrument 20-2 (for example, a conference terminal device at the Osaka office) has participated in the group. In this case, for example, the client device 26 displays, on the message screen, a message 203 illustrated in FIG. 21, indicating that the conference terminal device at the Osaka office has participated in the group.

Subsequently, the second instrument 20-2 receives the member list of the group from the server device 30 (step S61). Subsequently, the second instrument 20-2 determines whether to start a new session or participate in an existing session (step S62). In this example, the member list includes the first instrument 20-1, and thus the second instrument 20-2 determines to participate in an existing session.

Subsequently, the second instrument 20-2 extracts session information (a conference ID and a password) from the state information of the first instrument 20-1 included in the member list (step S63). Subsequently, the second instrument 20-2 transmits a request to participate in the session to the session managing device 24 (step S64). This participation request includes the conference ID and the password necessary for participation in the session. Then, upon reception of the participation request from the second instrument 20-2, the session managing device 24 allows participation of the second instrument 20-2.

In this manner, the session managing device 24 allows participation of the two instruments of the first instrument 20-1 and the second instrument 20-2 in the session, thereby achieving a television conference.

Figure 22:
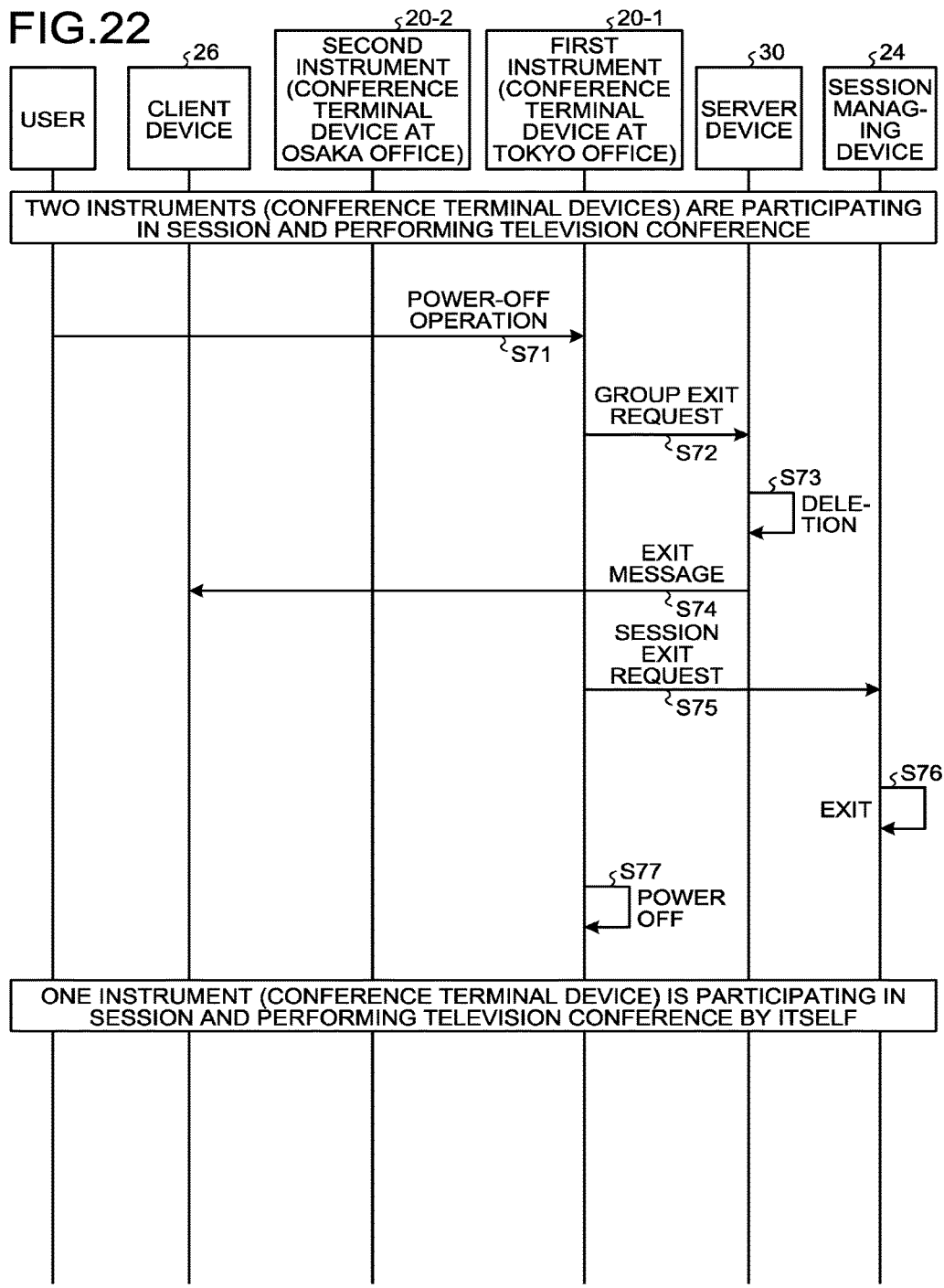
FIG. 22 is a diagram illustrating the sequence of processing that causes the instrument to exit a session upon a power-off operation.

FIG. 22 is a diagram illustrating the sequence of processing that causes the instrument 20 to exit a session upon a power-off operation in the conference system 10. Upon the power-off operation on the instrument 20, the conference system 10 causes the instrument 20 to exit the session, following the sequence illustrated in FIG. 22.

In the conference system 10, the two instruments of the first instrument 20-1 (conference terminal device at the Tokyo office) and the second instrument 20-2 (conference terminal device at the Osaka office) are participating in the session and performing a television conference.

First, a user performs a power-off operation on the first instrument 20-1 (step S71). Upon detection of the power-off operation, the first instrument 20-1 transmits a group exit request to the server device 30 (step S72). The group exit request includes the instrument ID and the group ID of the first instrument 20-1.

Subsequently, the server device 30 deletes the instrument 20 having the instrument ID included in the group exit request from among members of the group having the group ID included in the group exit request (step S73). Accordingly, the first instrument 20-1 exits the group.

Figure 23:
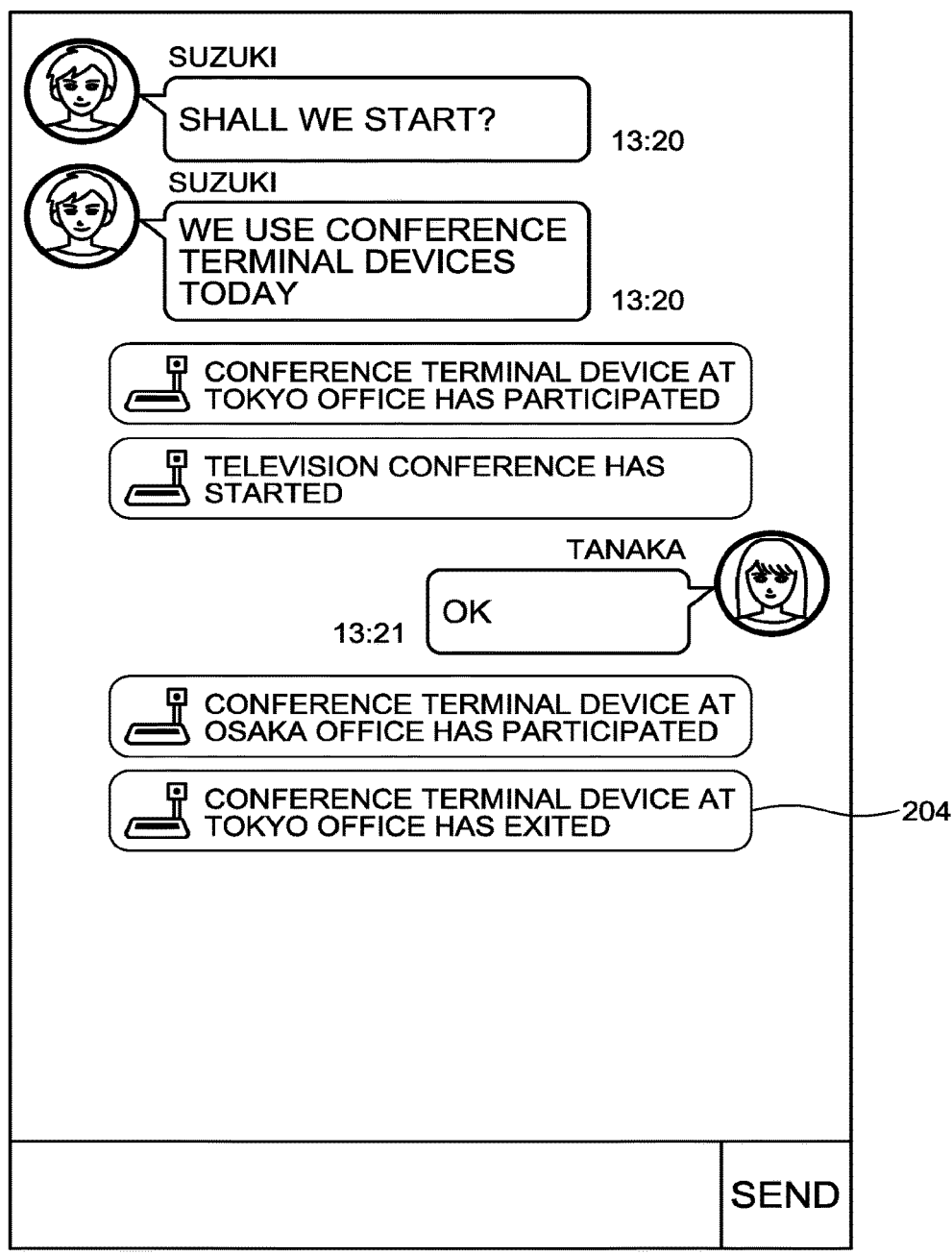
FIG. 23 is a diagram illustrating a message screen displaying a message indicating exit of the conference terminal device at the Tokyo office from a group.

Then, the server device 30 generates an exit message indicating that the first instrument 20-1 has exited the group, and transmits the exit message to the client devices 26 of all members of the group (step S74). Accordingly, the client device 26 can display, on the message screen, a message 204 illustrated in FIG. 23, indicating that the conference terminal device at the Tokyo office has exited the group.

Upon the detection of the power-off operation, the first instrument 20-1 transmits a session exit request to the session managing device 24 (step S75). Upon reception of the session exit request from the first instrument 20-1, the session managing device 24 causes the first instrument 20-1 to exit the session (step S76).

Then, the power of the first instrument 20-1 is turned off (step S77). Thereafter, in the conference system 10, only the second instrument 20-2 (conference terminal device at the Osaka office) is participating in the session, performing a television conference by itself (single-person conference).

Figure 24:
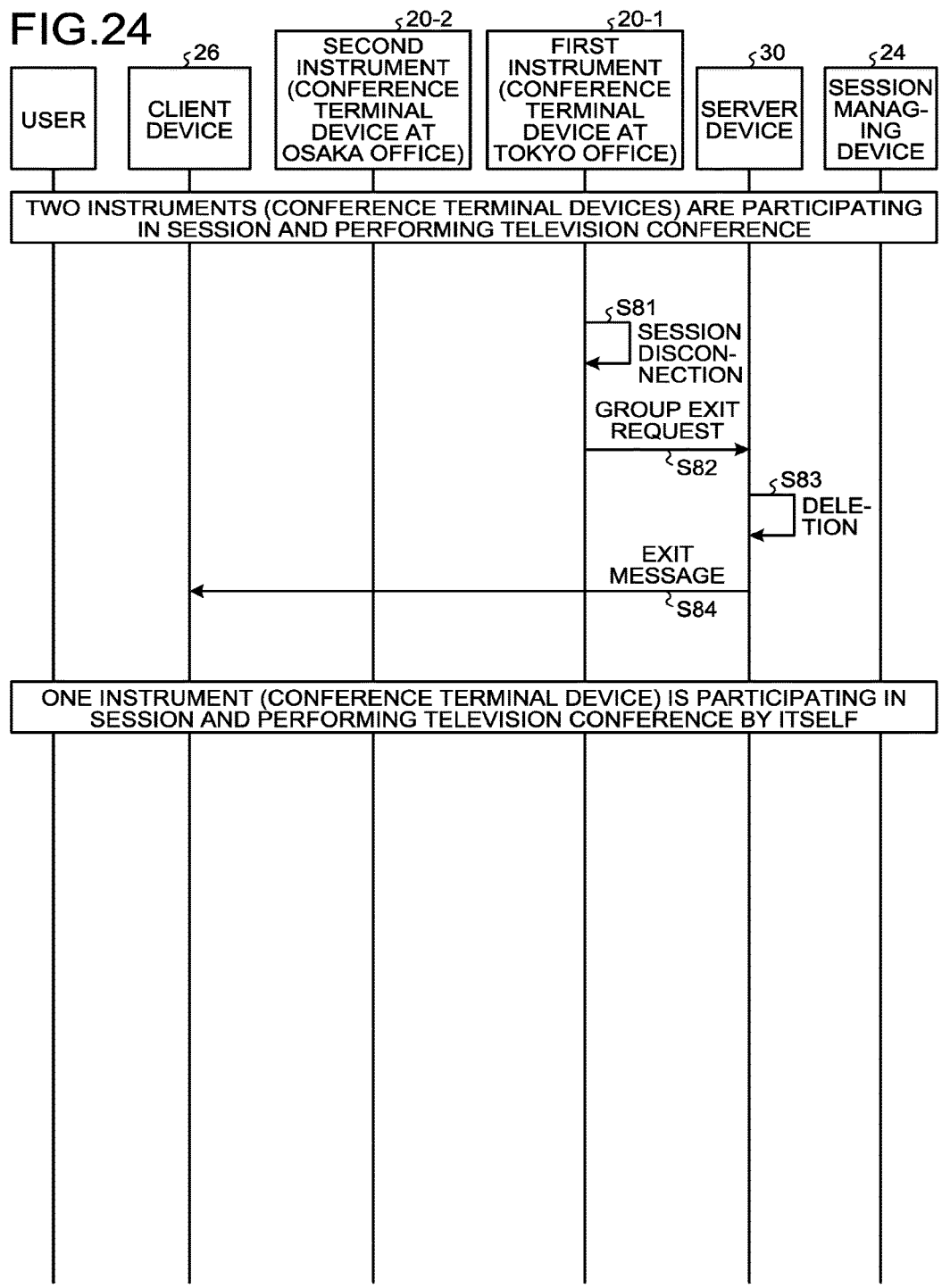
FIG. 24 is a diagram illustrating the sequence of processing that causes the instrument to exit a group upon disconnection of a session in the conference system.

FIG. 24 is a diagram illustrating the sequence of processing that causes the instrument 20 to exit a group upon disconnection of a session in the conference system 10. The conference system 10 causes the instrument 20 to exit the group, for example, upon disconnection of the session, following the sequence illustrated in FIG. 24.

In the conference system 10, the two instruments of the first instrument 20-1 (conference terminal device at the Tokyo office) and the second instrument 20-2 (conference terminal device at the Osaka office) are participating in a session and performing a television conference.

First, the first instrument 20-1 detects disconnection of the session (step S81). Upon the detection of the disconnection of the session, the first instrument 20-1 transmits a group exit request to the server device 30 (step S82).

Subsequently, the server device 30 deletes, from the member group having a group ID included in the group exit request, the instrument 20 having an instrument ID included in the group exit request (step S83). Accordingly, the first instrument 20-1 exits the group.

Then, the server device 30 generates an exit message indicating that the first instrument 20-1 has exited the group, and transmits the exit message to the client devices 26 of all members of the group (step S84). Thereafter, in the conference system 10, only the second instrument 20-2 (conference terminal device at the Osaka office) is participating in the session and performing a television conference by itself.

Figure 25:
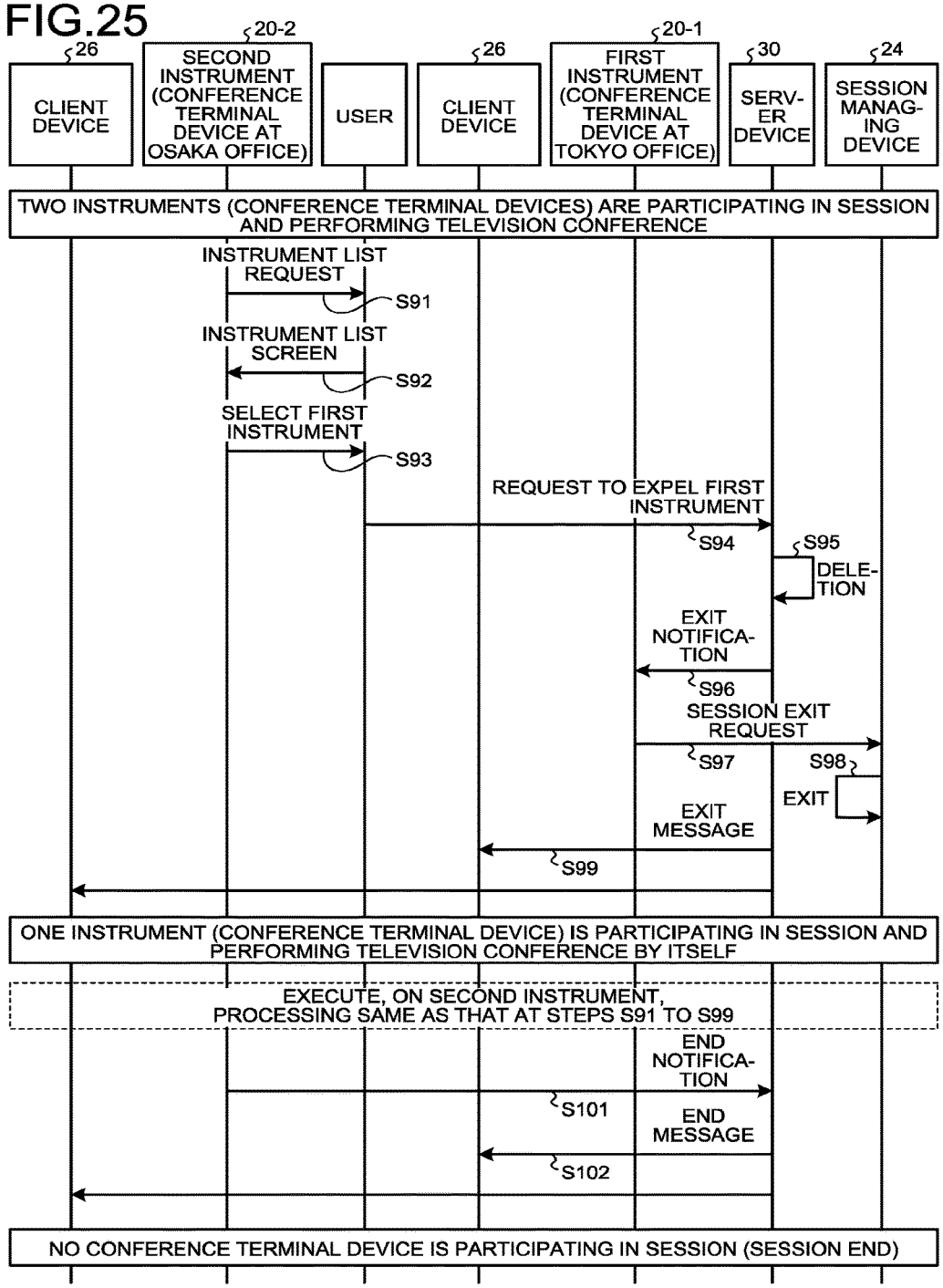
FIG. 25 is a diagram illustrating the sequence of processing that causes the instrument to exit a session upon an expelling operation performed by a user in the conference system.

FIG. 25 is a diagram illustrating the sequence of processing that causes the instrument 20 to exit a session upon an expelling operation by a user in the conference system 10. Upon the expelling operation on the client device 26 by the user, the conference system 10 causes the instrument 20 to exit the session, following the sequence illustrated in FIG. 25.

In the conference system 10, the two instruments of the first instrument 20-1 (conference terminal device at the Tokyo office) and the second instrument 20-2 (conference terminal device at the Osaka office) are participating in a session and performing a television conference.

Figure 26:
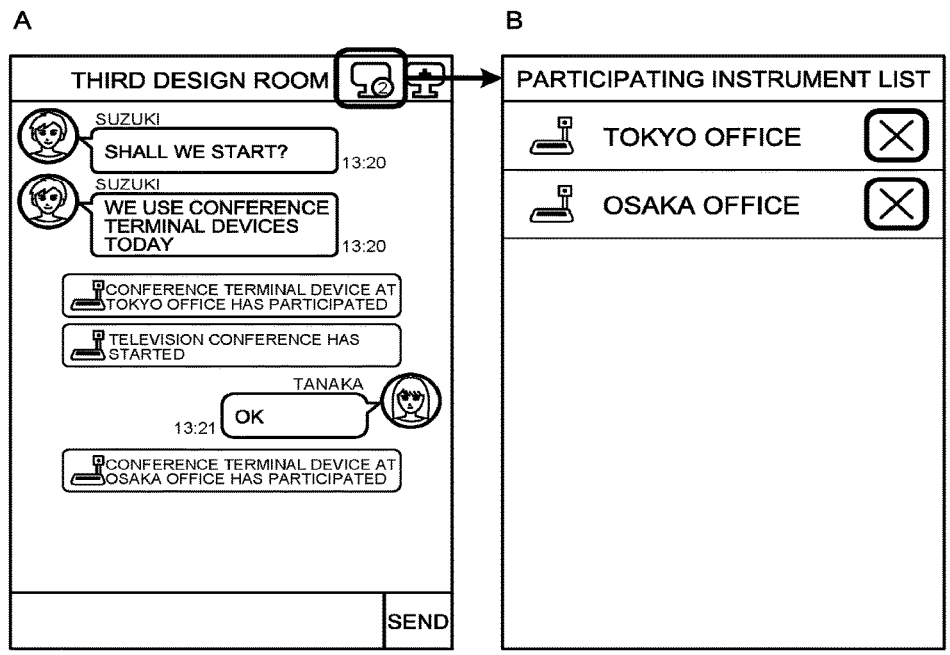
FIG. 26 is a diagram illustrating screen transition of the client device at processing that expels the instrument.

First, the user performs an operation on the message screen to display an instrument list as illustrated in "A" of FIG. 26 (step S91). Upon the operation to display an instrument list, the client device 26 displays an instrument list screen as illustrated in "B" of FIG. 26 (step S92). The instrument list screen displays a list of any instrument 20 participating in the group.

In this example, the two instruments of the first instrument 20-1 (conference terminal device at the Tokyo office) and the second instrument 20-2 (conference terminal device at the Osaka office) are displayed on the instrument list screen. Subsequently, the user selects any of the instruments 20 to perform an expelling operation for exit from the group (step S93). In this example, the user selects the first instrument 20-1 to perform the expelling operation thereon.

Upon reception of the expelling operation on the first instrument 20-1, the client device 26 transmits, to the server device 30, an expelling request to cause the first instrument 20-1 to exit the group (step S94). The expelling request includes the group ID of the group and the instrument ID of the first instrument 20-1.

The server device 30 deletes the instrument 20 (first instrument 20-1) having the instrument ID included in the expelling request from among members of the group having the group ID included in the expelling request (step S95). Accordingly, the first instrument 20-1 exits the group.

Subsequently, the server device 30 transmits, to the first instrument 20-1, an exit notification indicating the exit from the group (step S96). Upon reception of the exit notification, the first instrument 20-1 transmits a session exit request to the session managing device 24 (step S97). Upon reception of the session exit request from the first instrument 20-1, the session managing device 24 causes the first instrument 20-1 to exit the session (step S98).

The server device 30 generates an exit message indicating that the first instrument 20-1 has exited the group, and transmits the exit message to the client devices 26 of all members of the group (step S99).

Accordingly, in the conference system 10, only the second instrument 20-2 (conference terminal device at the Osaka office) is participating in the session, performing a television conference by itself.

Subsequently, the user performs an expelling operation to cause the second instrument 20-2 (conference terminal device at the Osaka office) to exit the group. In this case, the conference system 10 executes, on the second instrument 20-2, processing same as that at steps S91 to S99.

In this example, the second instrument 20-2 is the last instrument 20 included in the session. Thus, after the transmission of the session exit request (step S97), the second instrument 20-2 transmits, to the server device 30, an end notification indicating that the session has ended (step S101). The end notification includes the group ID.

Figure 27:
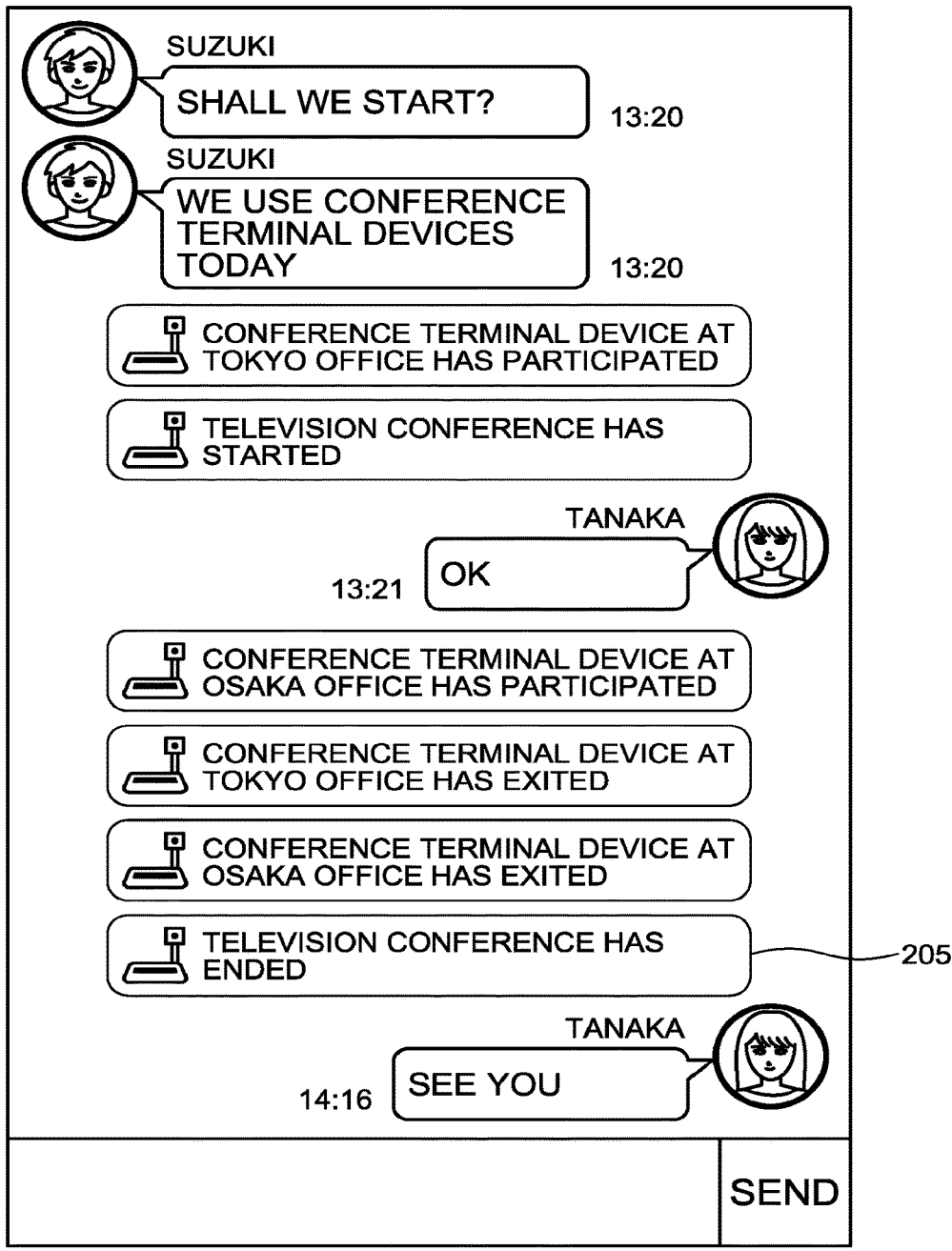
FIG. 27 is a diagram illustrating a message screen displaying a message indicating that a television conference has ended.

Upon reception of the end notification from the second instrument 20-2, the server device 30 generates an end message indicating that the session has ended. The server device 30 transmits the generated end message to the client devices 26 of all members of the group having the group ID included in the end notification (step S102). Accordingly, the client device 26 can display, on the message screen, a message 205 illustrated in FIG. 27, indicating that the television conference has ended. Thereafter, in the conference system 10, no instrument 20 (conference terminal device) is participating in the session (session ended state).

As described above, the conference system 10 according to the present embodiment can allow participation of the instrument 20 in a session for a television conference by using the messaging system achieved by the client device 26 and the server device 30. The conference system 10 can also causes the instrument 20 to exit a session for a television conference by using the messaging system. In this manner, without inputting of, for example, an address and a password by a user, the conference system 10 according to the present embodiment can easily start and end a session that is processing for communications of information with another instrument.

Second Embodiment

The following describes a sharing system 210 according to a second embodiment. The sharing system 210 according to the second embodiment has functions and configurations substantially identical to those of the conference system 10 according to the first embodiment. Thus, in the description of the sharing system 210 according to the second embodiment, any device or unit having the configurations and functions substantially identical to those of the conference system 10 according to the first embodiment is denoted by an identical reference numeral, and detailed description of any common content will be omitted.

Figure 28:
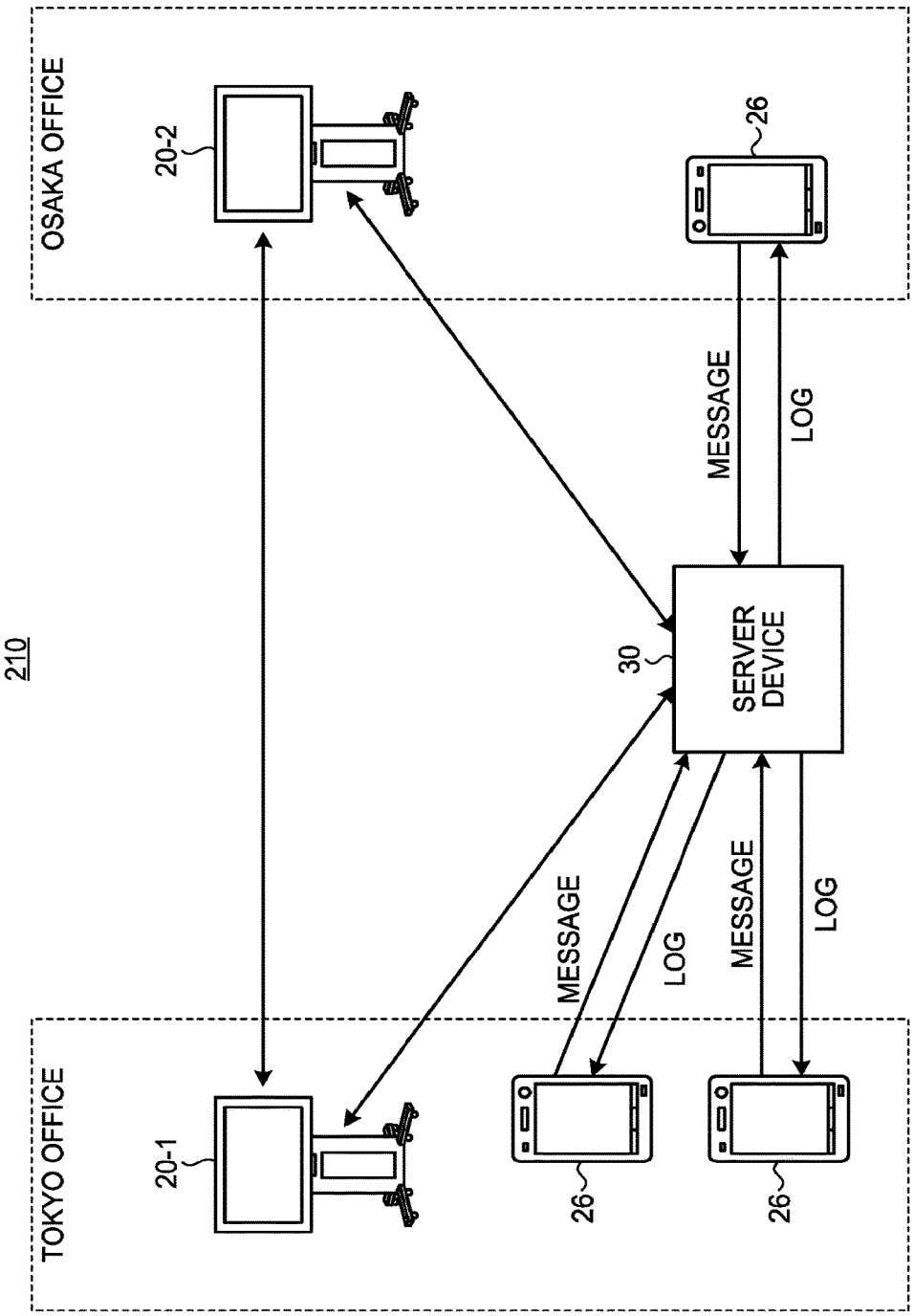
FIG. 28 is a diagram illustrating a sharing system according to a second embodiment of the present invention.

FIG. 28 is a diagram illustrating the sharing system 210 according to the second embodiment. The sharing system 210 allows sharing of an electronic blackboard between users at the first and the second places. In other words, the sharing system 210 can allow the users at the first and the second places to draw line drawings on electronic blackboards as if the users are sharing one electronic blackboard.

Specifically, the sharing system 210 displays, a line drawing input on the electronic blackboard at the first place by handwriting, on the electronic blackboard at the first place and the electronic blackboard at the second place. The sharing system 210 also displays, a line drawing input on the electronic blackboard at the second place by handwriting, on the electronic blackboard at the first place and the electronic blackboard at the second place. The present example is an example of the sharing system 210 in which an electronic blackboard is shared by users at the first and the second places, but an electronic blackboard may be shared by users at three places or more.

The sharing system 210 includes the first instrument 20-1, the second instrument 20-2, a plurality of the client devices 26, and the server device 30. These devices are connected with each other through a network.

In the second embodiment, the first instrument 20-1 is an electronic blackboard installed at the first place. The second instrument 20-2 is an electronic blackboard installed at the second place. The electronic blackboard includes a board (display-input surface), displays, and acquires as drawing data, a line drawing input on the board by handwriting using, for example, an electronic pen. Such an electronic blackboard can provide an interface through which a user draws a line drawing by handwriting on, for example, a whiteboard.

In the second embodiment, the first instrument 20-1 and the second instrument 20-2 directly establish a session through the network without the relay device 22 or the like therebetween, and operate in a cooperative manner. With this configuration, the sharing system 210 allows a plurality of users at different places to draw line drawings as if sharing one electronic blackboard.

Figure 29:
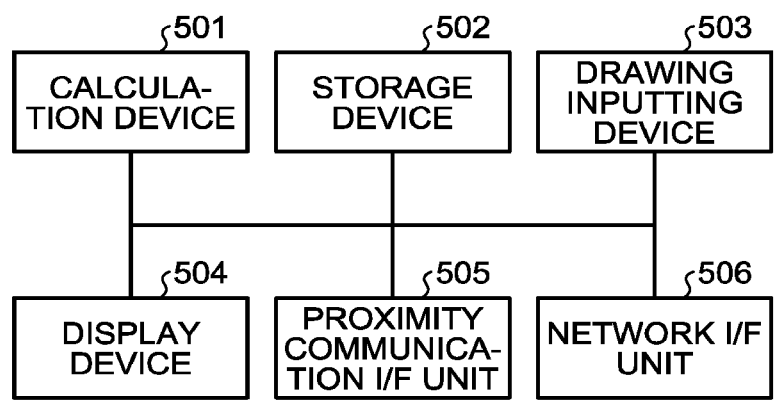
FIG. 29 is a diagram illustrating an exemplary hardware configuration of an instrument that is an electronic blackboard.

FIG. 29 is a diagram illustrating an exemplary hardware configuration of the instrument 20 that is an electronic blackboard. The instrument 20 that is an electronic blackboard includes a calculation device 501, a storage device 502, a drawing inputting device 503, a display device 504, a proximity communication I/F unit 505, and a network I/F unit 506.

The calculation device 501 includes a CPU, a ROM, and a RAM, and controls the entire instrument 20 by executing a computer program. The storage device 502 is, for example, a flash memory or a hard disk, and stores therein a computer program and various kinds of data. The drawing inputting device 503 acquires handwriting input by a user using, for example, an electronic pen, and generates drawing information. The display device 504 displays the drawing information input by the user. The drawing inputting device 503 and the display device 504 may be integrated with each other.

The proximity communication I/F unit 505 performs communication of information with an external device by, for example, the non-contact proximity communication (NFC) scheme. The network I/F unit 506 communicates information with another device through the network in accordance with a communication protocol such as the Internet protocol.

Figure 30:
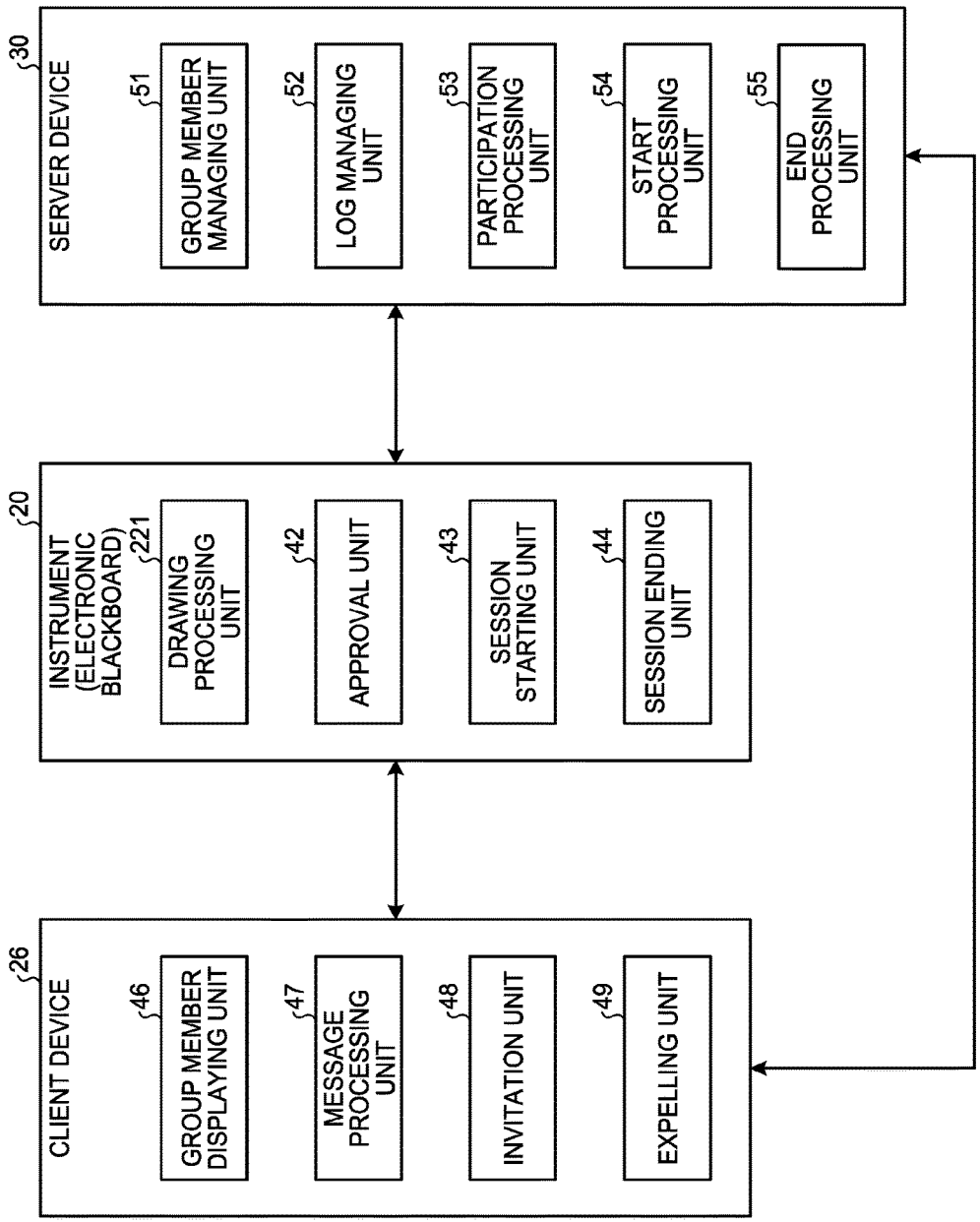
FIG. 30 is a diagram illustrating functional configurations of the instrument, the client device, and the server device according to the second embodiment.

FIG. 30 is a diagram illustrating functional configurations of the instrument 20, the client device 26, and the server device 30 according to the second embodiment.

The instrument 20 that is an electronic blackboard includes a drawing processing unit 221, the approval unit 42, the session starting unit 43, and the session ending unit 44. These functions are each achieved through cooperation of a computer program executed by the calculation device 501 illustrated in FIG. 29 and the hardware illustrated in FIG. 29.

The drawing processing unit 221 executes processing for performing input and display of the drawing information and achieving sharing of the electronic blackboard. More detailed description of the function of the drawing processing unit 221 will be further given later with reference to FIG. 31.

Figure 31:
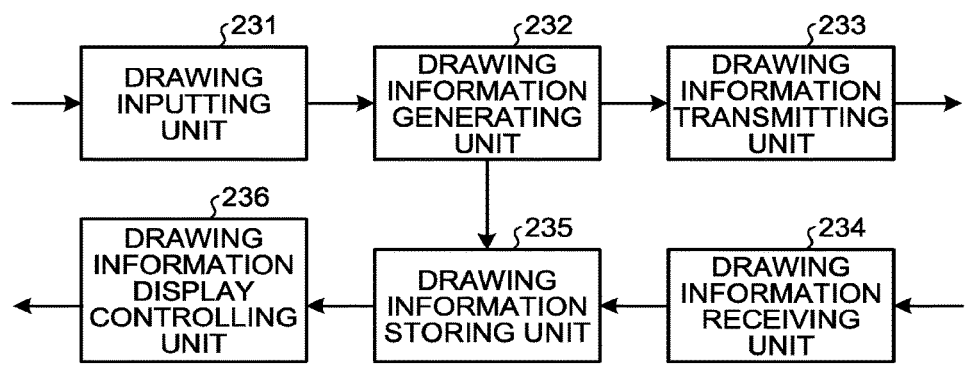
FIG. 31 is a diagram illustrating a functional configuration of a drawing processing unit.

FIG. 31 is a diagram illustrating a functional configuration of the drawing processing unit 221. The drawing processing unit 221 includes a drawing inputting unit 231, a drawing information generating unit 232, a drawing information transmitting unit 233, a drawing information receiving unit 234, a drawing information storage unit 235, and a drawing information display controlling unit 236.

The drawing inputting unit 231 receives a drawing operation by a user using, for example, an electronic pen. The drawing information generating unit 232 generates drawing information in accordance with the drawing operation by the user. The drawing information transmitting unit 233 transmits the generated drawing information to another electronic blackboard through the network at electronic blackboard sharing.

At electronic blackboard sharing, the drawing information receiving unit 234 receives drawing information transmitted from another electronic blackboard. The drawing information storage unit 235 stores therein the drawing information generated by the drawing information generating unit 232. At electronic blackboard sharing, the drawing information storage unit 235 stores therein, in a synthesizing manner, the drawing information generated by the drawing information generating unit 232 and the drawing information received by the drawing information receiving unit 234. The drawing information display controlling unit 236 displays the drawing information stored in the drawing information storage unit 235.

Figure 32:
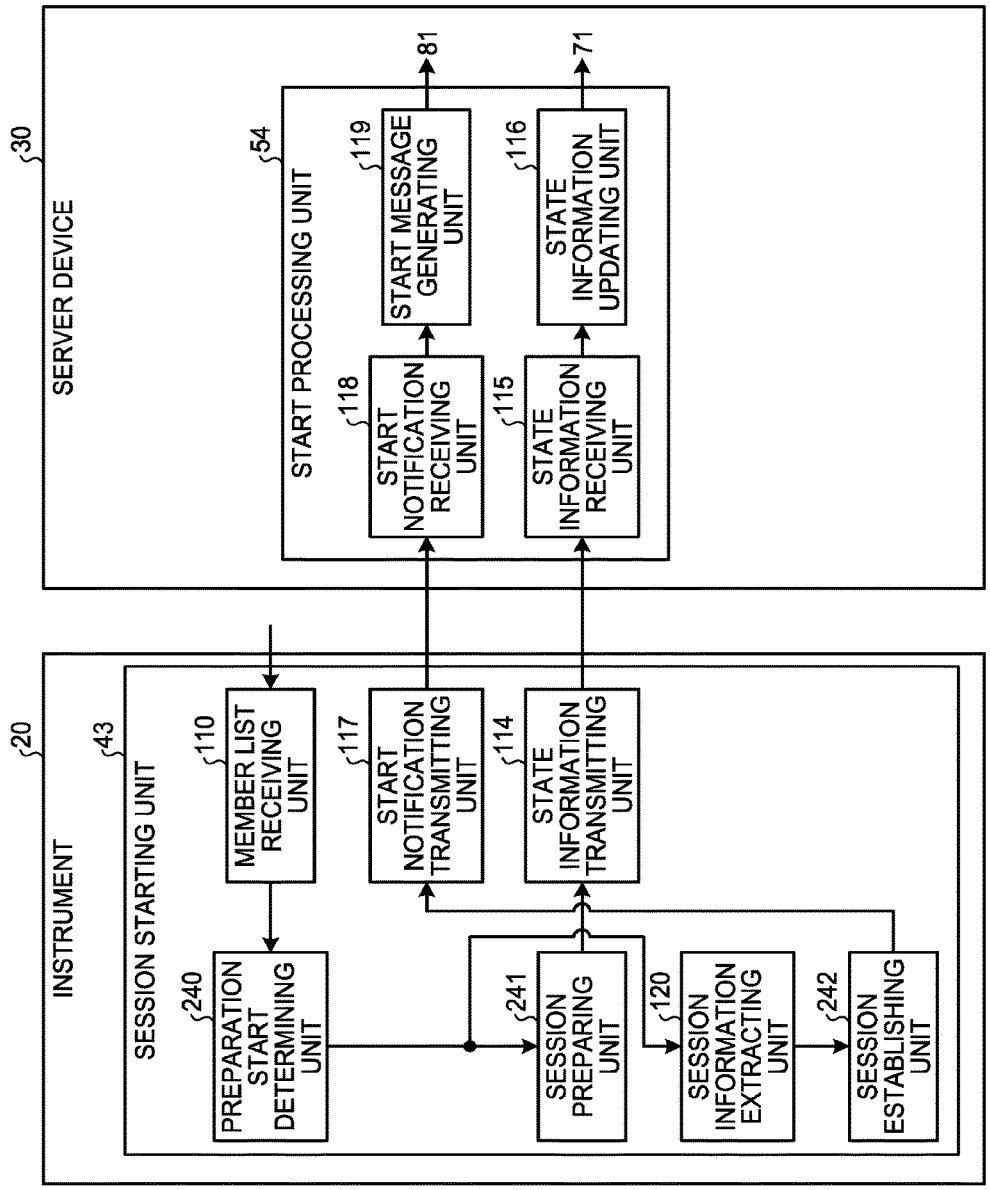
FIG. 32 is a diagram illustrating functional configurations of the instrument and the server device according to the second embodiment for executing processing that starts a session and processing that allows participation of the instrument in a session.

FIG. 32 is a diagram illustrating functional configurations of the instrument 20 and the server device 30 according to the second embodiment for executing processing that starts a session and processing that allows participation of the instrument 20 in a session.

The session starting unit 43 includes the member list receiving unit 110, a preparation start determining unit 240, a session preparing unit 241, the state information transmitting unit 114, the start notification transmitting unit 117, the session information extracting unit 120, and a session establishing unit 242.

Upon reception of a member list, the preparation start determining unit 240 determines whether to prepare or start a session. The preparation start determining unit 240 refers to the received member list, and prepares a session if no other instrument 20 of the same kind exists in the member list. The preparation start determining unit 240 refers to the received member list, and starts a session if another instrument 20 of the same kind exists in the member list.

When preparing a session, the preparation start determining unit 240 calls the session preparing unit 241. The session preparing unit 241 prepares for cooperation with another instrument 20. For example, the session preparing unit 241 is in a standby state that allows reception of an access from another instrument 20. In addition, the session preparing unit 241 generates the IP address of the own instrument 20 and a password for access to the own instrument 20.

Upon completion of the preparation of a session, the session preparing unit 241 feeds the generated IP address and the generated password to the state information transmitting unit 114. The state information transmitting unit 114 transmits, to the server device 30, the acquired IP address, the acquired password, an instrument ID for identifying the own instrument 20, and a group ID for identifying a group in which the own instrument 20 is participating.

The state information receiving unit 115 receives the IP address, the password, the instrument ID, and the group ID from the instrument 20. The state information receiving unit 115 feeds the state information updating unit 116 with the received IP address, the received password, the received instrument ID, and the received group ID. The state information updating unit 116 accesses the member list of the received group ID, which is stored in the member information storage unit 71. Then, the state information updating unit 116 adds, in the member list of the received group ID, the received IP address and the received password as items of the state information indicating the state of the instrument 20 having the received instrument ID.

When allowing participation of the own instrument 20 in an existing session, the preparation start determining unit 240 calls the session information extracting unit 120. The session information extracting unit 120 extracts session information (an IP address and a password) from state information of another instrument 20 included in the member list. The session information extracting unit 120 feeds the extracted session information to the session establishing unit 242.

Upon reception of the session information from the session information extracting unit 120, the session establishing unit 242 accesses another instrument 20 having the IP address included in the session information, by using the password included in the session information. Then, the session establishing unit 242 directly establishes a session with the other instrument 20 through the network. Accordingly, the session is established to allow the two instruments to communicate information with each other.

Upon the establishment of the session by the session establishing unit 242, the start notification transmitting unit 117 transmits activation notification indicating that the session has been started to the server device 30.

Figure 33:
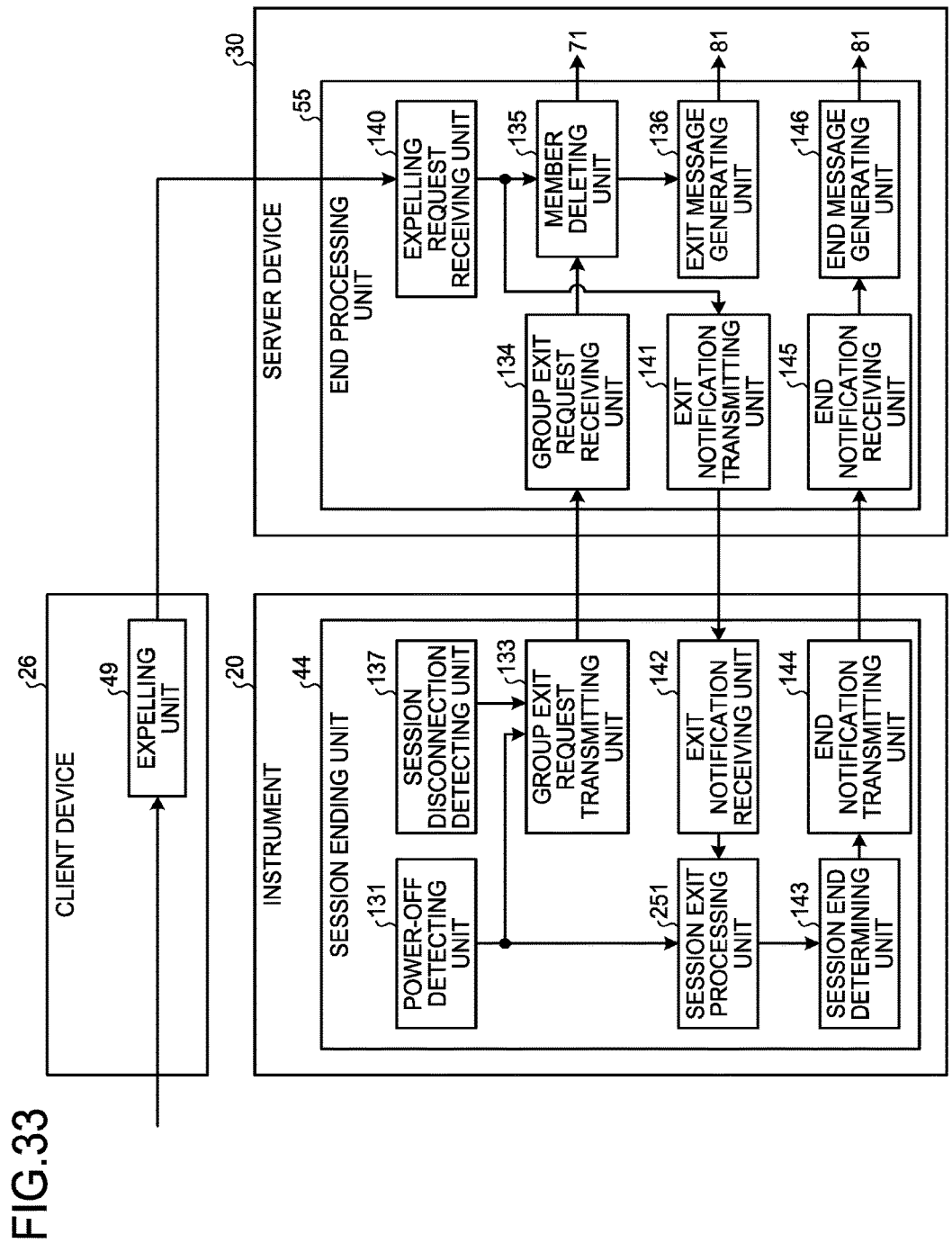
FIG. 33 is a diagram illustrating functional configurations of the instrument, the client device, and the server device according to the second embodiment for executing processing that causes the instrument to exit a session and processing that ends the session.

FIG. 33 is a diagram illustrating functional configurations of the instrument 20, the client device 26, and the server device 30 according to the second embodiment for executing processing that causes the instrument 20 to exit a session and processing that ends the session.

The session ending unit 44 includes the power-off detecting unit 131, a session exit processing unit 251, the group exit request transmitting unit 133, the session disconnection detecting unit 137, the exit notification receiving unit 142, the session end determining unit 143, and the end notification transmitting unit 144.

Upon detection of a power-off operation by the power-off detecting unit 131, the session exit processing unit 251 executes processing that causes the instrument 20 to exit a session. Upon reception of, from the server device 30, exit notification indicating the exit from the group, the session exit processing unit 251 executes processing that causes the instrument 20 to exit the session.

Upon the execution of the processing to exit the session by the session exit processing unit 251, the session end determining unit 143 determines whether the session has ended as a result of the exit of the own instrument 20. For example, when the two instruments 20 cooperate with each other, exit of one of the instruments 20 from the session causes the session to end. In such a case, the session end determining unit 143 determines that the session has ended. If the session is continued by another instrument 20 after the own instrument 20 has exited the session, the session end determining unit 143 determines that the session does not end.

When the session end determining unit 143 has determined that the session has ended, the end notification transmitting unit 144 transmits an end notification indicating that the session has ended to the server device 30.

Figure 34:
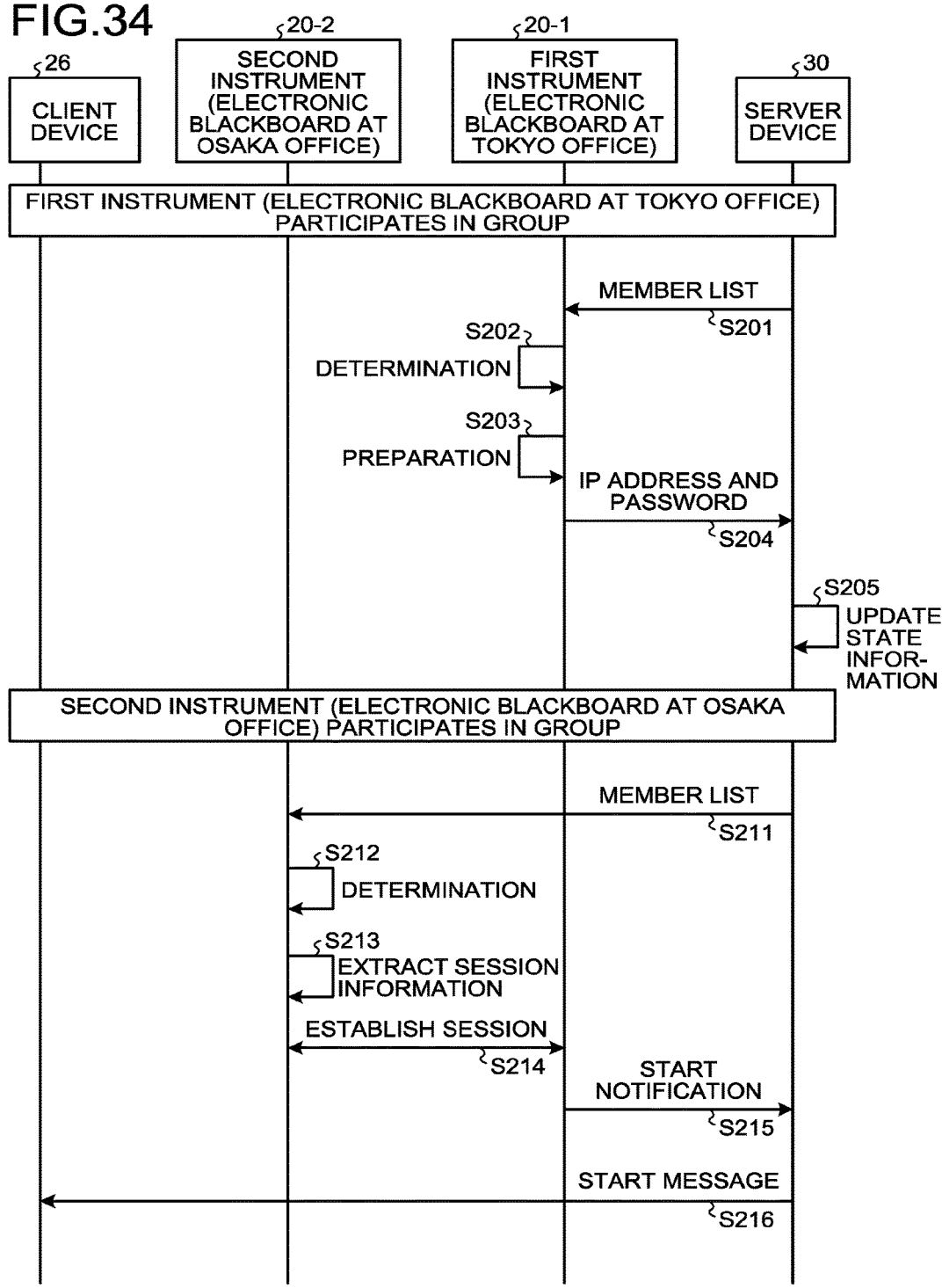
FIG. 34 is a diagram illustrating the sequence of processing that starts a session and processing that allows participation of the instrument in a session in the sharing system.

FIG. 34 is a diagram illustrating the sequence of processing that starts a session and processing that allows participation of the instrument 20 in a session in the sharing system 210. When starting a session or allowing participation of the instrument 20 in a session, the sharing system 210 executes the processing, following the sequence illustrated in FIG. 34.

Figure 35:
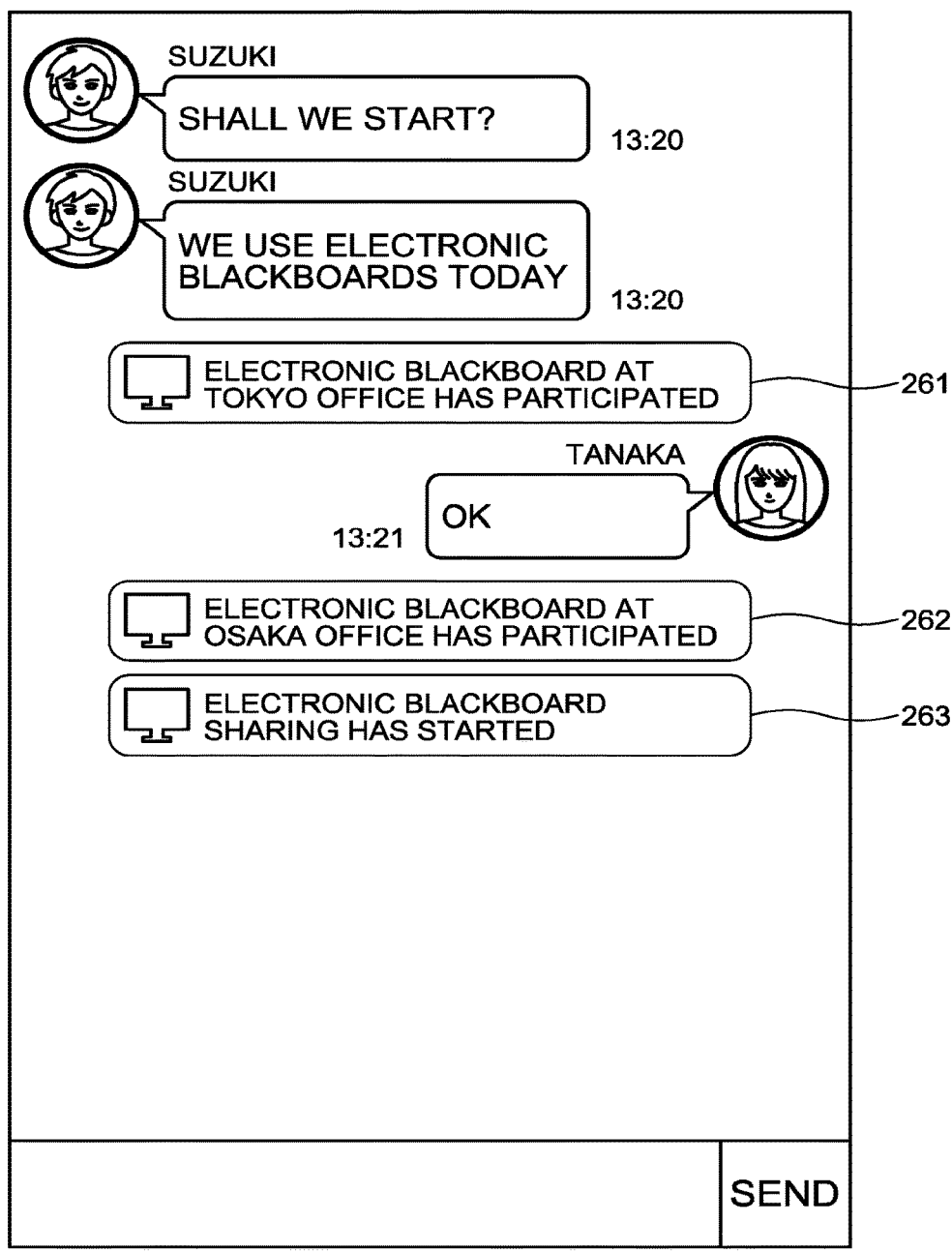
FIG. 35 is a diagram illustrating a message screen displaying a message indicating that electronic blackboard sharing has started.

First, the first instrument 20-1 (an electronic blackboard at the Tokyo office, for example) participates in a group. In this case, for example, the client device 26 displays, on the message screen, message 261 illustrated in FIG. 35, indicating the participation of the electronic blackboard at the Tokyo office. Then, upon participation of the first instrument 20-1 in the group, the first instrument 20-1 receives, from the server device 30, the member list of a group in which the own instrument 20 is participating (step S201).

Subsequently, the first instrument 20-1 determines whether to prepare or start a session (step S202). The first instrument 20-1 refers to the received member list, and prepares a session if no other instrument 20 of the same kind exists in the member list, or starts a session if another instrument 20 of the same kind exists in the member list. In this example, no other instrument 20 of the same kind exists in the member list, and thus the first instrument 20-1 determines to prepare a session.

Subsequently, the first instrument 20-1 prepares a session (step S203). Subsequently, the first instrument 20-1 transmits, to the server device 30, session information (an IP address and a password, for example) necessary for communications of information with the first instrument 20-1 (step S204). As illustrated in FIG. 36, the server device 30 adds the received IP address and the received password as items of the state information of the first instrument 20-1 in the member list of the corresponding group (step S205).

Subsequently, the second instrument 20-2 (an electronic blackboard at the Osaka office, for example) participates in the group. In this case, for example, the client device 26 displays, on the message screen, message 262 illustrated in FIG. 35, indicating the participation of the electronic blackboard at the Osaka office.

Subsequently, the second instrument 20-2 receives, from the server device 30, the member list of a group in which the own instrument 20 is participating (step S211). Subsequently, the second instrument 20-2 determines whether to prepare or start a session (step S212). In this example, the first instrument 20-1 exists in the member list, and thus the second instrument 20-2 determines to start a session.

Subsequently, the second instrument 20-2 extracts session information (an IP address and a password) from the state information of the first instrument 20-1 included in the member list (step S213). Subsequently, the second instrument 20-2 accesses the first instrument 20-1 by using the session information to establish a session (step S214).

Subsequently, upon the establishment of the session, the second instrument 20-2 transmits activation notification indicating that the session has started to the server device 30 (step S215). Upon reception of the activation notification from the second instrument 20-2, the server device 30 generates a start message indicating that the session has started, and transmits the start message to the client devices 26 of all members of the group (step S216). Accordingly, the client device 26 can display, on the message screen, message 263 illustrated in FIG. 35, indicating that electronic blackboard sharing has started.

Figure 37:
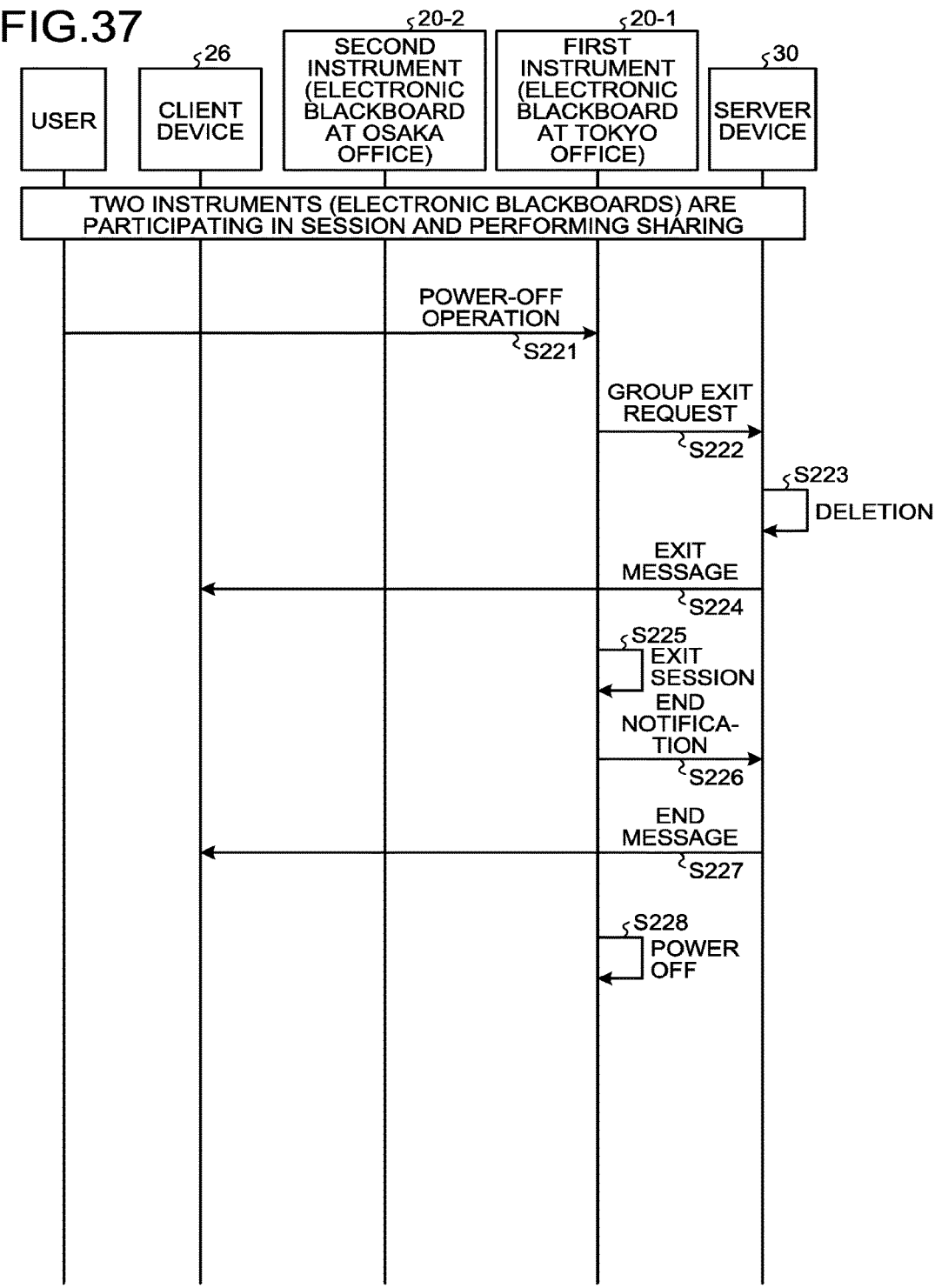
FIG. 37 is a diagram illustrating the sequence of processing that causes the instrument to exit a session upon a power-off operation in the sharing system.

FIG. 37 is a diagram illustrating the sequence of processing that causes the instrument 20 to exit a session upon a power-off operation in the sharing system 210. Upon the power-off operation on the instrument 20, the sharing system 210 causes the instrument 20 to exit the session, following the sequence illustrated in FIG. 37.

In the sharing system 210, the two instruments of the first instrument 20-1 (electronic blackboard at the Tokyo office) and the second instrument 20-2 (electronic blackboard at the Osaka office) are participating in the session and performing electronic blackboard sharing.

First, a user performs a power-off operation on the first instrument 20-1 (step S221). Upon detection of the power-off operation, the first instrument 20-1 transmits a group exit request to the server device 30 (step S222). The group exit request includes an instrument ID and a group ID.

Subsequently, the server device 30 deletes the instrument 20 having the instrument ID included in the group exit request from among members of the group having the group ID included in the group exit request (step S223). Accordingly, the first instrument 20-1 exits the group.

Figure 38:
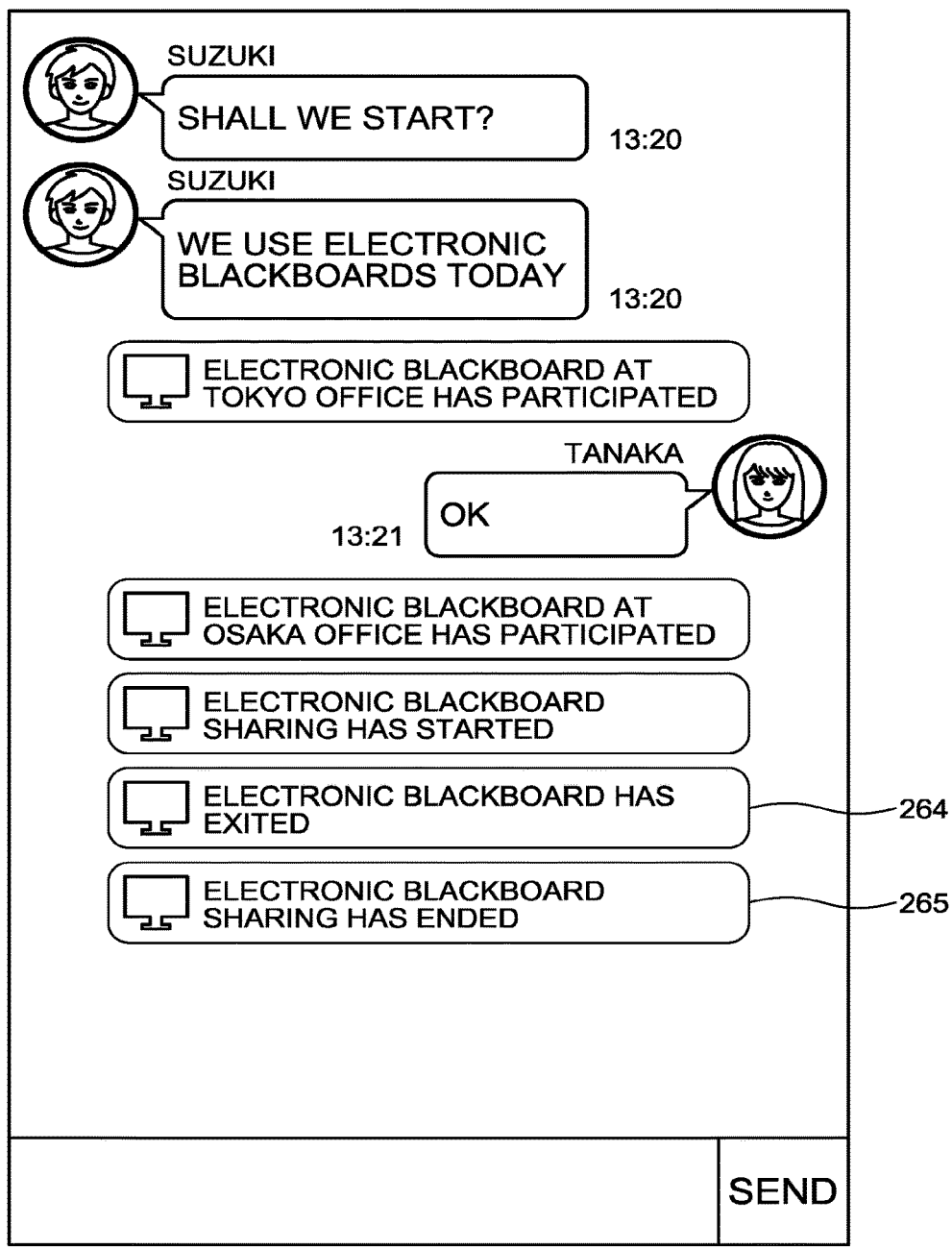
FIG. 38 is a diagram illustrating a message screen displaying a message indicating that electronic blackboard sharing has ended.

Then, the server device 30 generates an exit message indicating that the first instrument 20-1 has exited the group, and transmits the exit message to the client devices 26 of all members of the group (step S224). Accordingly, the client device 26 can display, on the message screen, message 264 illustrated in FIG. 38, indicating that the electronic blackboard at the Tokyo office has exited.

Upon the detection of the power-off operation, the first instrument 20-1 executes exit processing from the session (step S225). When the first instrument 20-1 exits the session, the session ends. Thus, the first instrument 20-1 transmits an end notification indicating that the session has ended to the server device 30 (step S226). The end notification includes a group ID.

Upon reception of the end notification from the first instrument 20-1, the server device 30 generates an end message indicating that the session has ended, and transmits the end message to the client devices 26 of all members of the group having the group ID included in the end notification (step S227). Accordingly, the client device 26 can display, on the message screen, message 265 illustrated in FIG. 38, indicating that electronic blackboard sharing has ended.

Then, the power of the first instrument 20-1 is turned off (step S228). Thereafter, the sharing system 210 is in a state that no electronic blackboard sharing is performed between the instruments 20.

Figure 39:
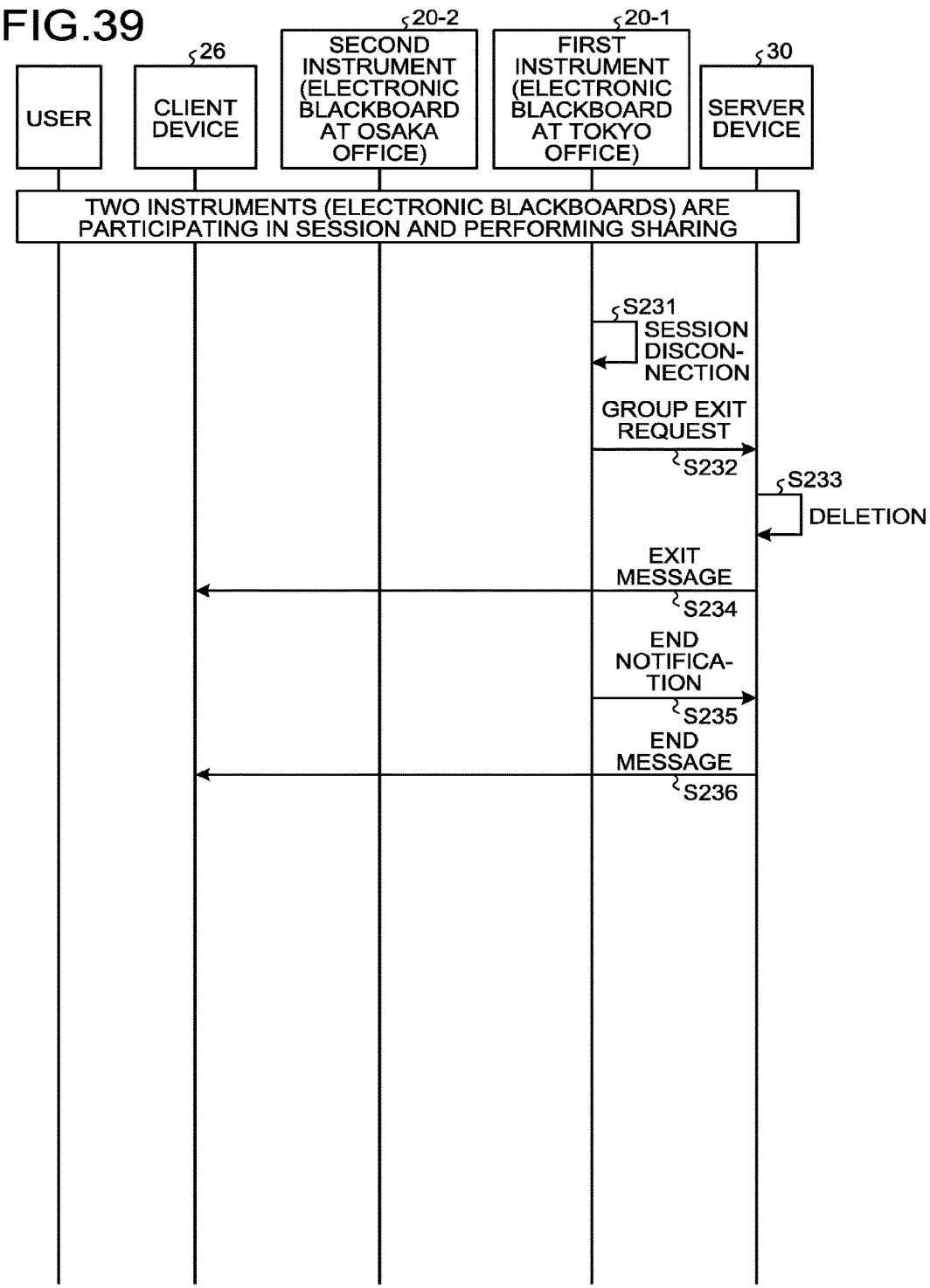
FIG. 39 is a diagram illustrating the sequence of processing that causes the instrument to exit a group upon disconnection of a session in the sharing system.

FIG. 39 is a diagram illustrating the sequence of processing that causes the instrument 20 to exit a group upon disconnection of a session in the sharing system 210. The sharing system 210 causes the instrument 20 to exit a group, for example, upon disconnection of a session, following the sequence illustrated in FIG. 39.

In the sharing system 210, the two instruments of the first instrument 20-1 (electronic blackboard at the Tokyo office) and the second instrument 20-2 (electronic blackboard at the Osaka office) are participating in a session and performing electronic blackboard sharing.

First, the first instrument 20-1 detects disconnection of a session (step S231). Upon the detection of the disconnection of the session, the first instrument 20-1 transmits a group exit request to the server device 30 (step S232).

Subsequently, the server device 30 deletes the instrument 20 having an instrument ID included in the group exit request from among members of the group having a group ID included in the group exit request (step S233). Accordingly, the first instrument 20-1 exits the group.

Then, the server device 30 generates an exit message indicating that the first instrument 20-1 has exited the group, and transmits the exit message to the client devices 26 of all members of the group (step S234).

When the first instrument 20-1 exits from the session, the session ends. Thus, upon the detection of the disconnection of the session, the first instrument 20-1 transmits an end notification indicating that the session has ended to the server device 30 (step S235). The end notification includes a group ID.

Upon reception of the end notification from the first instrument 20-1, the server device 30 generates an end message indicating that the session has ended, and transmits the end message to the client devices 26 of all members of the group having the group ID included in the end notification (step S236). Thereafter, the sharing system 210 is in a state that no electronic blackboard sharing is performed between the instruments 20.

Figure 40:
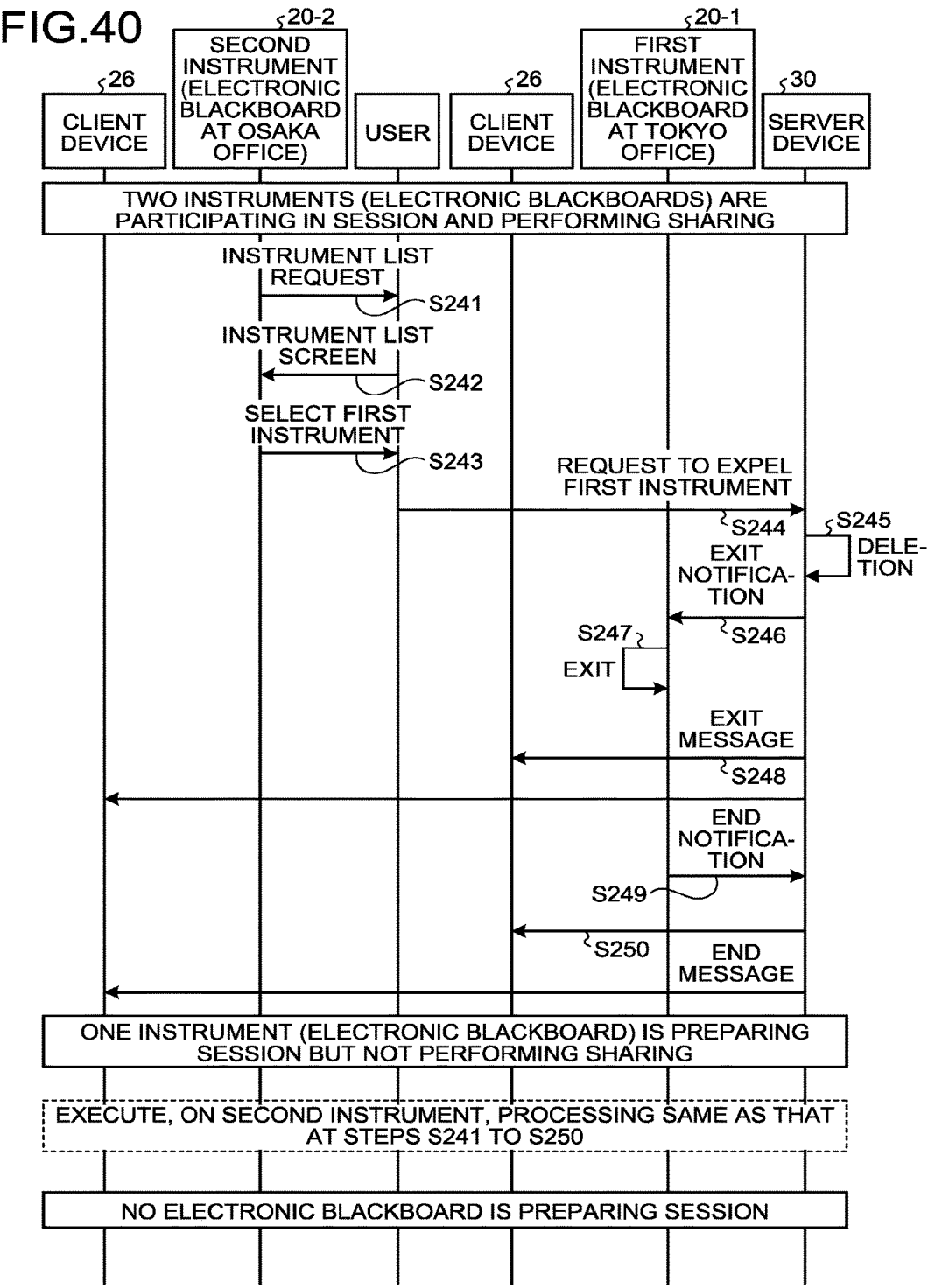
FIG. 40 is a diagram illustrating the sequence of processing that causes the instrument to exit a session upon an expelling operation performed by a user in the sharing system.

FIG. 40 is a diagram illustrating the sequence of processing that causes the instrument 20 to exit a session upon an expelling operation by a user in the sharing system 210. Upon the expelling operation on the client device 26 by the user, the sharing system 210 causes the instrument 20 to exit the session, following the sequence illustrated in FIG. 40.

In the sharing system 210, the two instruments of the first instrument 20-1 (electronic blackboard at the Tokyo office) and the second instrument 20-2 (electronic blackboard at the Osaka office) are participating in a session and performing electronic blackboard sharing.

First, the user performs, on the message screen, an operation to display an instrument list (step S241). Upon the operation to display the instrument list, the client device 26 displays an instrument list screen (step S242).

In this example, the two instruments of the first instrument 20-1 (electronic blackboard at the Tokyo office) and the second instrument 20-2 (electronic blackboard at the Osaka office) are indicated in the instrument list. Then, the user selects the first instrument 20-1 to perform an expelling operation to cause exit from a group (step S243).

Upon reception of the expelling operation on the first instrument 20-1 by the user, the client device 26 transmits, to the server device 30, an expelling request to cause the first instrument 20-1 to exit the group (step S244). The expelling request includes the group ID of the group and the instrument ID of the first instrument 20-1.

The server device 30 deletes the instrument 20 (first instrument 20-1) having the instrument ID included in the expelling request from among members of the group having the group ID included in the expelling request (step S245). Accordingly, the first instrument 20-1 exits the group.

Subsequently, the server device 30 transmits, to the first instrument 20-1, an exit notification indicating the exit from the group (step S246). Upon reception of the exit notification, the first instrument 20-1 executes exit processing from the session (step S247).

The server device 30 generates an exit message indicating that the first instrument 20-1 has exited the group, and transmits the exit message to the client devices 26 of all members of the group (step S248).

The session ends when the own instrument 20 exits the session, and thus the first instrument 20-1 transmits, to the server device 30, an end notification indicating that the session has ended (step S249). The end notification includes the group ID.

Upon reception of the end notification from the first instrument 20-1, the server device 30 generates an end message indicating that the session has ended, and transmits the end message to the client devices 26 of all members of the group having the group ID included in the end notification (step S250).

When the first instrument 20-1 exits the session, the session ends. However, the first instrument 20-1 becomes in a session preparation state that the first instrument 20-1 can receive access from another instrument 20.

In such a state, processing at steps S241 to S250 can be executed on the second instrument 20-2. In this case, the second instrument 20-2 cancels a session preparation state. Thereafter, in the sharing system 210, no instrument 20 (electronic blackboard) is preparing a session.

As described above, the sharing system 210 according to the present embodiment can allow participation of the instrument 20 in an electronic blackboard sharing session by using the messaging system achieved by the client device 26 and the server device 30. The conference system 10 can cause, by using the messaging system, the instrument 20 to exit a session for electronic blackboard sharing. In this manner, without inputting of, for example, an address and a password by a user, the conference system 10 according to the present embodiment can easily start and end a session that is processing for communications of information with another instrument.

Third Embodiment

The following describes an information processing system 600 according to a third embodiment. The information processing system 600 according to the third embodiment is applied to the conference system 10 according to the first embodiment and the sharing system 210 according to the second embodiment. In the description of the information processing system 600 according to the third embodiment, any device or unit having the functions and configurations substantially identical to those of the conference system 10 according to the first embodiment and the sharing system 210 according to the second embodiment is denoted by an identical reference numeral, and detailed description of any common content will be omitted.

Figure 41:
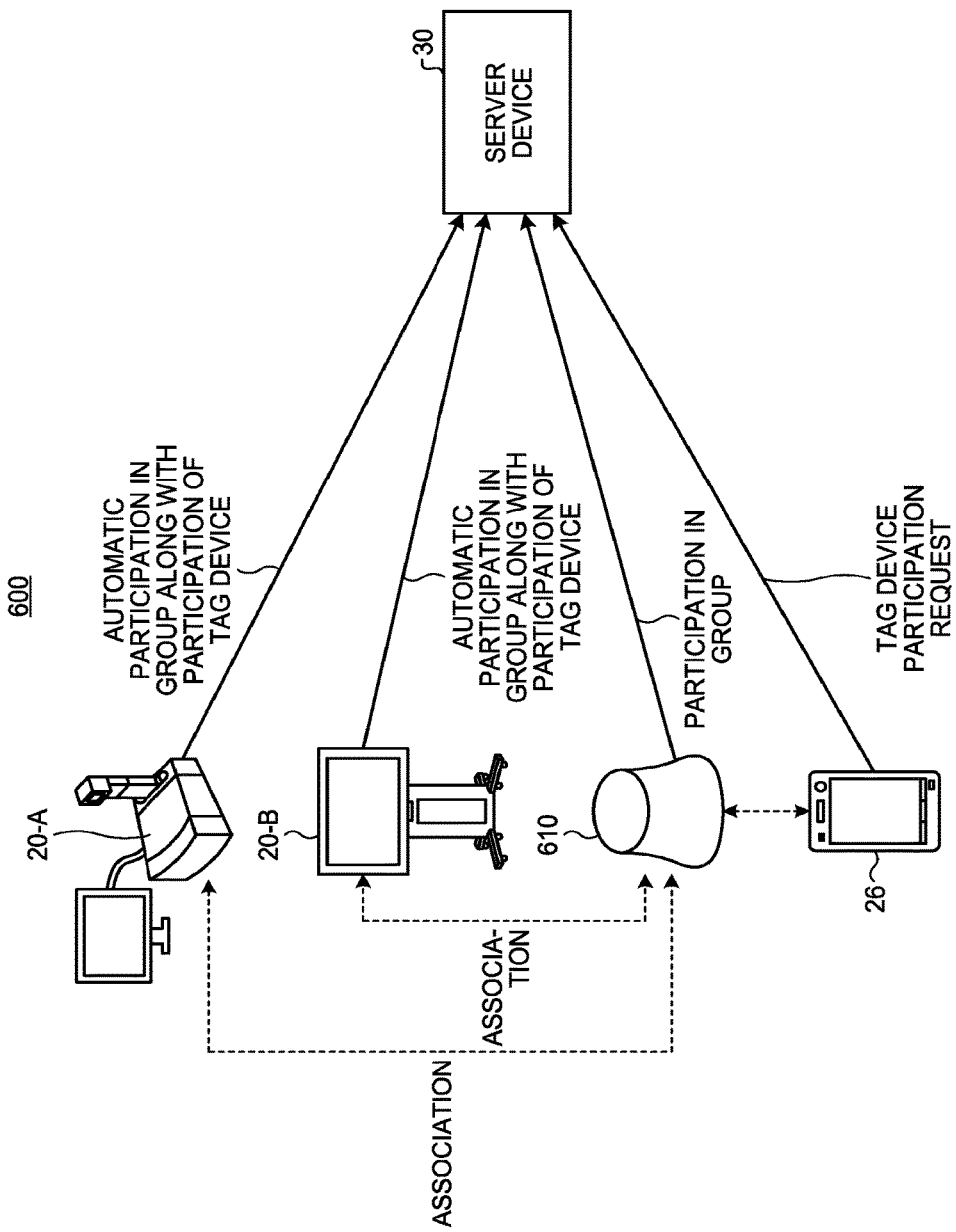
FIG. 41 is a diagram illustrating an information processing system according to a third embodiment of the present invention.

FIG. 41 is a diagram illustrating the information processing system 600 according to the third embodiment. The information processing system 600 includes at least one instrument 20, a tag device 610, the client device 26, and the server device 30.

The instrument 20 is, for example, a conference terminal device 20-A according to the first embodiment or an electronic blackboard 20-B according to the second embodiment. The instrument 20 participates in a group managed by the server device 30, and starts a session with the corresponding instrument 20 installed at, for example, another place. For example, upon participation in a group, the conference terminal device 20-A starts a session with another conference terminal device 20-A, and executes processing for a television conference. For example, upon participation in a group, the electronic blackboard 20-B starts a session with another electronic blackboard 20-B, and operates in a cooperative manner with another electronic blackboard 20-B.

The tag device 610 can communicate information with the server device 30 through the network. The tag device 610 can communicate information with the client device 26 through, for example, the non-contact proximity communication (NFC).

A unique tag ID is allocated to the tag device 610. The tag device 610 can participate in a group managed by the server device 30 by using the unique tag ID.

For example, the client device 26 transmits a request of participation of the tag device 610 in the group to the server device 30. Upon reception of the request of participation of the tag device 610 in the group from the client device 26, the server device 30 transmits a tag invitation request to the tag device 610. When the tag invitation request received from the server device 30 is valid, the tag device 610 approves the participation in the group. Upon the approval of the participation in the group by the tag device 610, the server device 30 allows the participation of the tag device 610 in the group.

Each instrument 20 can be associated with the tag device 610. The server device 30 stores therein association information indicating the instrument 20 associated with the tag device 610. With this configuration, the server device 30 can manage an association relation between the tag device 610 and the instrument 20.

Upon the participation of the tag device 610 in the group, the server device 30 allows participation of the instrument 20 associated with the tag device 610 in the group. Thus, the instrument 20 can automatically participate in the group along with the participation of the associated tag device 610 in the group. When a user performs an operation that allows participation of the tag device 610 in the group, all instruments 20 associated with the tag device 610 are allowed to participate in the group.

Figure 42:
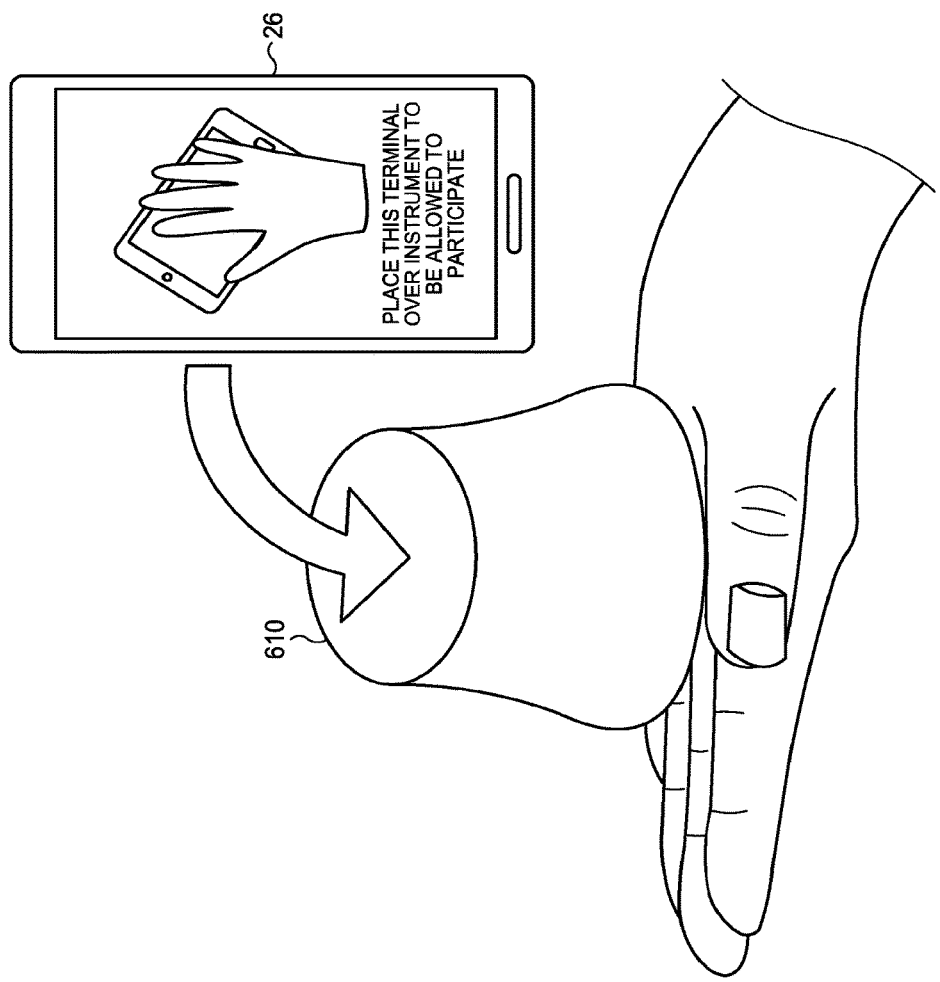
FIG. 42 is a diagram illustrating exemplary appearance of a tag device and the client device according to the third embodiment.

FIG. 42 is a diagram illustrating exemplary appearance of the tag device 610 and the client device 26 according to the third embodiment.

The tag device 610 has, for example, a size small enough to be carried by a user in one hand, and is portable with the user. The tag device 610 can communicate information with the client device 26 through, for example, the non-contact proximity communication. Thus, when the user performs a predetermined operation on the client device 26 and places the client device 26 close to the tag device 610 at a distance shorter than a predetermined distance, information can be communicated between the client device 26 and the tag device 610.

Figure 43:
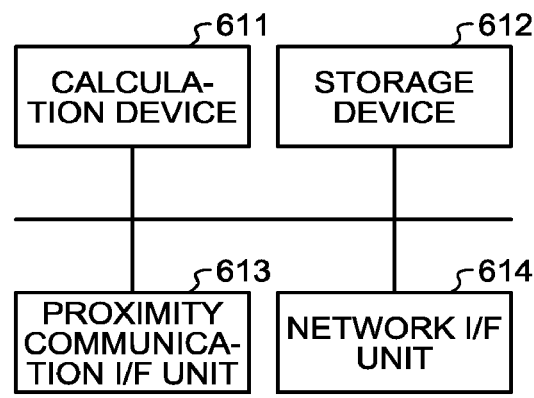
FIG. 43 is a diagram illustrating an exemplary hardware configuration of the tag device according to the third embodiment.

FIG. 43 is a diagram illustrating an exemplary hardware configuration of the tag device 610 according to the third embodiment. The tag device 610 includes a calculation device 611, a storage device 612, a proximity communication I/F unit 613, and a network I/F unit 614.

The calculation device 611 includes a CPU, a ROM, and a RAM, and controls information processing and the entire tag device 610 by executing a computer program. The storage device 612 is, for example, a flash memory or a hard disk, and stores therein a computer program and various kinds of data.

The proximity communication I/F unit 613 performs communications of information with an external device by, for example, the non-contact proximity communication scheme. The network I/F unit 614 communicates information with another device through the network in accordance with a communication protocol such as the Internet protocol. Thus, the tag device 610 is an information processing device having a configuration same as that of a typical computer.

Figure 44:
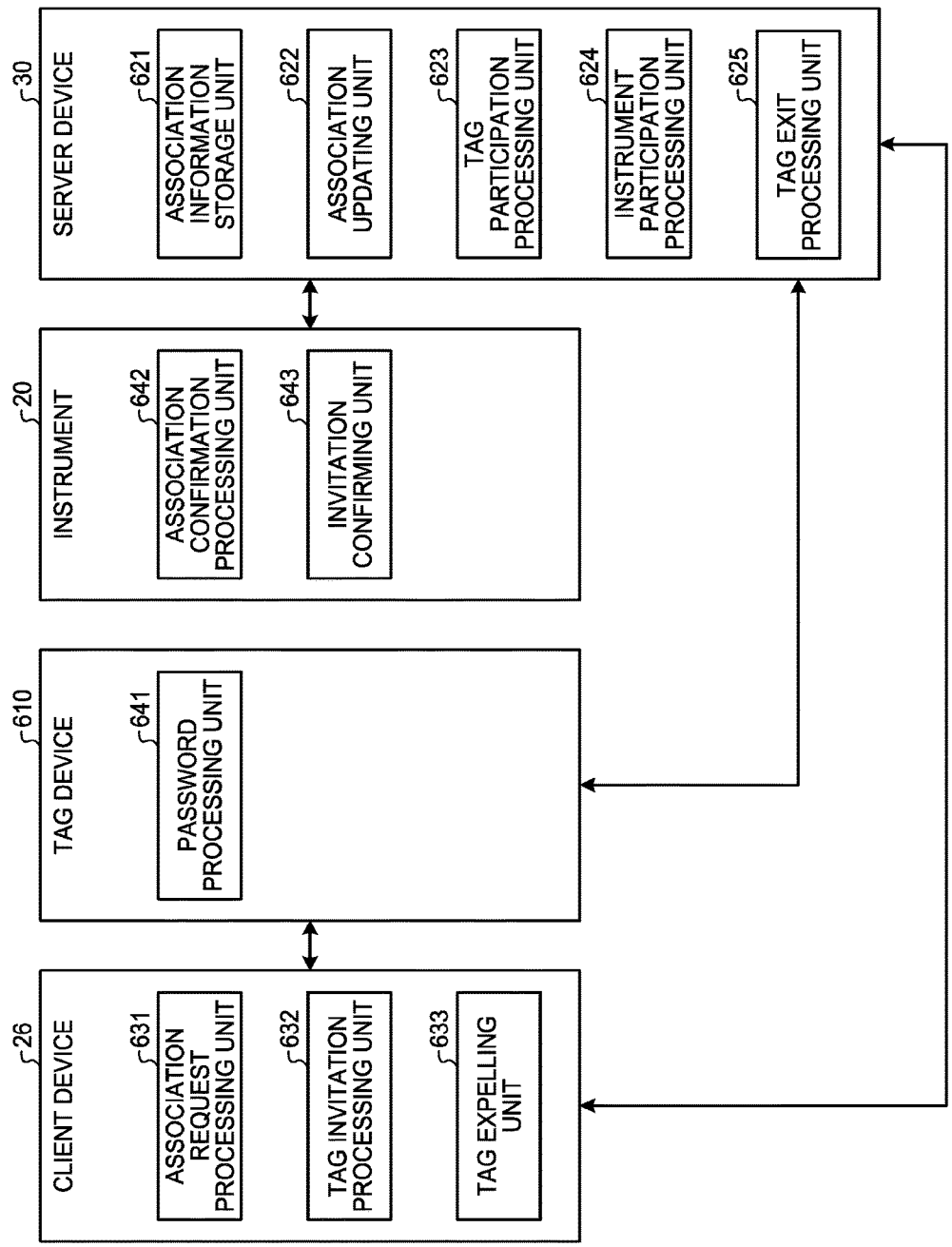
FIG. 44 is a diagram illustrating functional configurations of the client device, the tag device, the instrument, and the server device according to the third embodiment.

FIG. 44 is a diagram illustrating functional configurations of the client device 26, the tag device 610, the instrument 20, and the server device 30 according to the third embodiment.

The client device 26, the instrument 20, and the server device 30 according to the third embodiment have functional configurations illustrated in FIG. 44 in addition to the functional configurations described in the first embodiment or the second embodiment.

The server device 30 additionally includes an association information storage unit 621, an association updating unit 622, a tag participation processing unit 623, an instrument participation processing unit 624, and a tag exit processing unit 625.

The association information storage unit 621 stores therein association information indicating the association relation between the tag device 610 and the instrument 20. For example, the association information is information that associates a tag ID allocated to the tag device 610 and the instrument ID of the instrument 20 associated with the tag device 610.

For example, the association information is a table as illustrated in Table 1 below.

TABLE 1

| Association ID | Tag ID | Instrument ID |
|---|---|---|
| 1 | 0001 | 1001 |
| 2 | 0002 | 1011 |
| 3 | 0002 | 1012 |
| 4 | 0001 | 1002 |
| 5 | 0001 | 1003 |
| 6 | 0003 | 1021 |
| 7 | 0003 | 1022 |

The table illustrated in Table 1 stores, on each row, a unique association ID, the tag ID of the tag device 610, and the instrument ID of the single instrument 20 associated with the tag device 610.

The relation indicated in the above-described Table 1 can be expressed as Table 2 below.

TABLE 2

| Tag ID | Instrument ID |
|---|---|
| 0001 | 1001, 1002, 1003 |
| 0002 | 1011, 1012 |
| 0003 | 1021, 1022 |

In other words, the tag device 610 having a tag ID of "0001" is associated with the instruments 20 having instrument IDs of "1001", "1002", and "1003". The tag device 610 having a tag ID of "0002" is associated with the instruments 20 having instrument IDs of "1011" and "1012". The tag device 610 having a tag ID of "0003" is associated with the instruments 20 having instrument IDs of "1021" and "1022". One instrument 20 may be associated with a plurality of the tag devices 610.

The association updating unit 622 executes processing for updating the association information stored in the association information storage unit 621. More detailed description of the function of the association updating unit 622 will be further given later with reference to FIG. 45.

The tag participation processing unit 623 executes processing for allowing participation of the tag device 610 in a group. More detailed description of the function of the tag participation processing unit 623 will be further given later with reference to FIG. 46.

The instrument participation processing unit 624 executes processing for automatically allowing participation of any instrument 20 associated with the tag device 610 in a group upon participation of the tag device 610 in the group. More detailed description of the function of the instrument participation processing unit 624 will be further given later with reference to FIG. 47.

The tag exit processing unit 625 executes processing for causing the tag device 610 to exit the group. More detailed description of the function of the tag exit processing unit 625 will be further given later with reference to FIG. 48.

The client device 26 additionally includes an association request processing unit 631, a tag invitation processing unit 632, and a tag expelling unit 633.

The association request processing unit 631 executes processing for associating the tag device 610 and the instrument 20. More detailed description of the function of the association request processing unit 631 will be further given later with reference to FIG. 45.

The tag invitation processing unit 632 executes processing for allowing participation of the tag device 610 in a group. More detailed description of the function of the tag invitation processing unit 632 will be further given later with reference to FIG. 46.

The tag expelling unit 633 executes processing for causing the tag device 610 to exit a group. More detailed description of the function of the tag expelling unit 633 will be further given later with reference to FIG. 48.

The tag device 610 includes a password processing unit 641. When allowing participation of the tag device 610 in a group, the password processing unit 641 executes password output processing and password determination processing. More detailed description of the function of the password processing unit 641 will be further given later with reference to FIG. 46.

The instrument 20 additionally includes an association confirmation processing unit 642 and an invitation confirming unit 643.

The association confirmation processing unit 642 executes processing for associating the tag device 610 and the instrument 20. More detailed description of the function of the association confirmation processing unit 642 will be further given later with reference to FIG. 45.

The invitation confirming unit 643 executes processing for automatically allowing participation of the instrument 20 associated with the tag device 610 in a group. More detailed description of the function of the invitation confirming unit 643 will be further given later with reference to FIG. 47.

Figure 45:
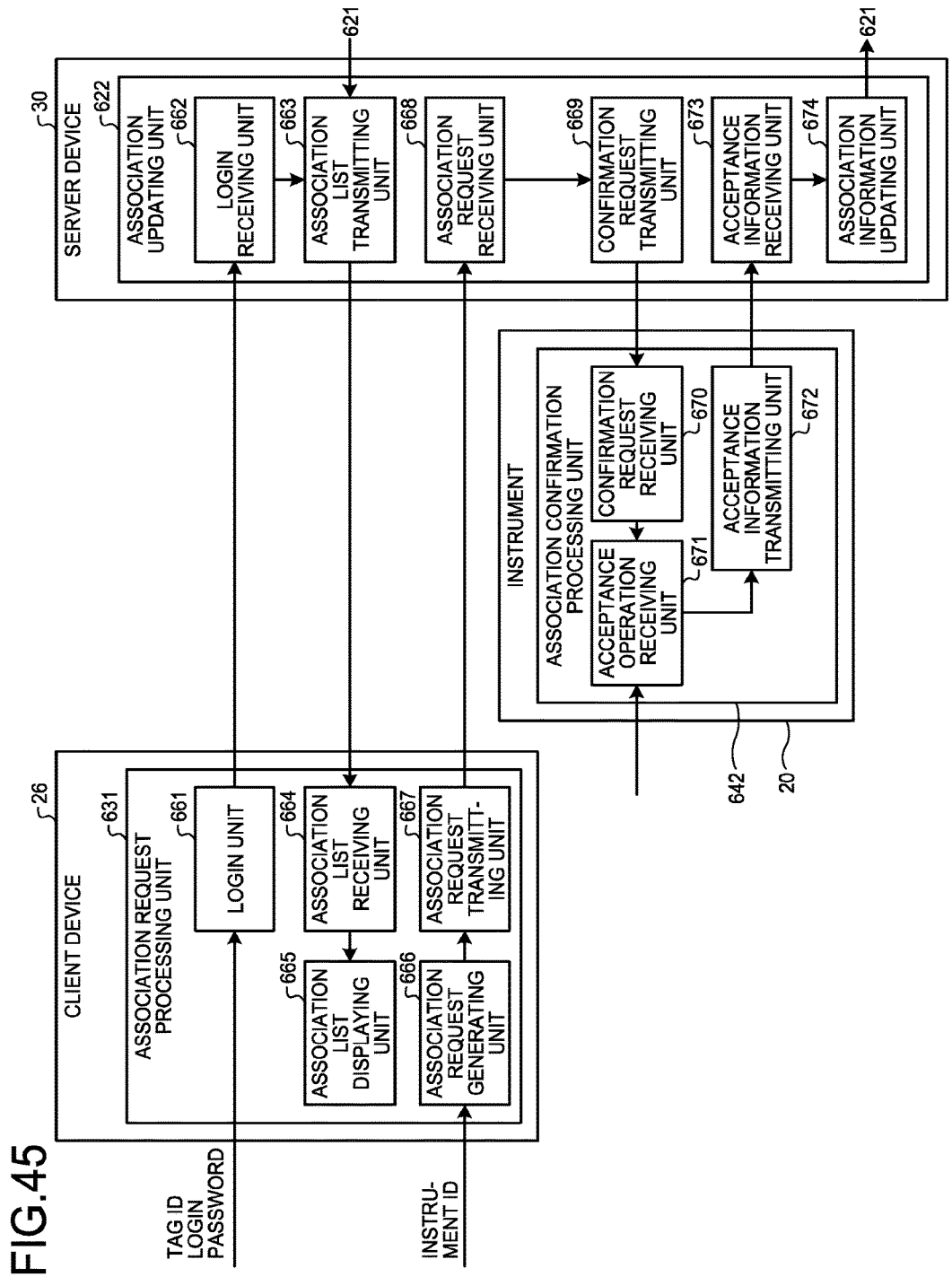
FIG. 45 is a diagram illustrating functional configurations of the client device, the instrument, and the server device according to the third embodiment for executing association information update processing.

FIG. 45 is a diagram illustrating functional configurations of the client device 26, the instrument 20, and the server device 30 according to the third embodiment for executing association information update processing.

The association request processing unit 631 includes a login unit 661, an association list receiving unit 664, an association list displaying unit 665, an association request generating unit 666, and an association request transmitting unit 667. The association updating unit 622 includes a login receiving unit 662, an association list transmitting unit 663, an association request receiving unit 668, a confirmation request transmitting unit 669, an acceptance information receiving unit 673, and an association information updating unit 674. The association confirmation processing unit 642 includes a confirmation request receiving unit 670, an acceptance operation receiving unit 671, and an acceptance information transmitting unit 672.

When the client device 26 has accessed the server device 30 through, for example, a web browser, the login unit 661 displays a screen on which information for logging in to the server device 30 is input. A user recognizes a tag ID and a login password written on, for example, a housing of the tag device 610, and inputs the tag ID and the login password to the client device 26. The login unit 661 transmits, to the server device 30, a login request including the tag ID and the login password input by the user.

The login receiving unit 662 receives the login request from the client device 26. If the tag ID and the login password included in the login request are valid, the login receiving unit 662 permits access from the client device 26.

The association list transmitting unit 663 transmits an association list to the client device 26. The association list includes an instrument ID for identifying the instrument 20 associated with the tag device 610 having the received tag ID.

The association list receiving unit 664 receives the association list from the server device 30. Upon reception of the association list, the association list displaying unit 665 displays the received association list.

Upon an operation performed to newly associate the instrument 20, the association request generating unit 666 displays a screen on which information for requesting association to the server device 30 is input. A user recognizes an instrument ID and the like written on, for example, a housing of the instrument 20 as an association target, and inputs the instrument ID and the like to the client device 26. Upon the inputting of the instrument ID and the like by the user, the association request generating unit 666 generates an association request including an instrument ID for identifying the instrument 20 as an association target.

The association request transmitting unit 667 transmits the association request generated by the association request generating unit 666 to the server device 30. In this manner, the association request transmitting unit 667 can transmit, to the server device 30, an association request for association of the instrument 20 specified by the user with the tag device 610.

The association request receiving unit 668 receives the association request from the client device 26. Upon reception of the association request, the confirmation request transmitting unit 669 transmits a confirmation request to the instrument 20 specified by the association request. Specifically, the confirmation request transmitting unit 669 transmits the confirmation request to the instrument 20 having the instrument ID included in the association request. The confirmation request includes the tag ID (tag ID for identifying the tag device 610 as an association target) input at login.

The confirmation request receiving unit 670 receives the confirmation request from the server device 30. Upon reception of the confirmation request from the server device 30, the acceptance operation receiving unit 671 displays, to the user, a confirmation screen for confirming whether to perform association with the tag device 610 having the tag ID included in the confirmation request. Then, the acceptance operation receiving unit 671 receives an acceptance operation from the user. Upon the acceptance operation performed by the user, the acceptance information transmitting unit 672 transmits acceptance information to the server device 30.

The acceptance information receiving unit 673 receives the acceptance information from the instrument 20. Upon reception of the acceptance information from the instrument 20, the association information updating unit 674 updates the association information stored in the association information storage unit 621 so as to associate the instrument 20 specified by the association request with the tag device 610.

In this manner, the information processing system 600 can associate the instrument 20 with the tag device 610. The information processing system 600 may execute processing that cancels the association relation between the instrument 20 having the instrument ID included in the association list and the tag device 610.

Figure 46:
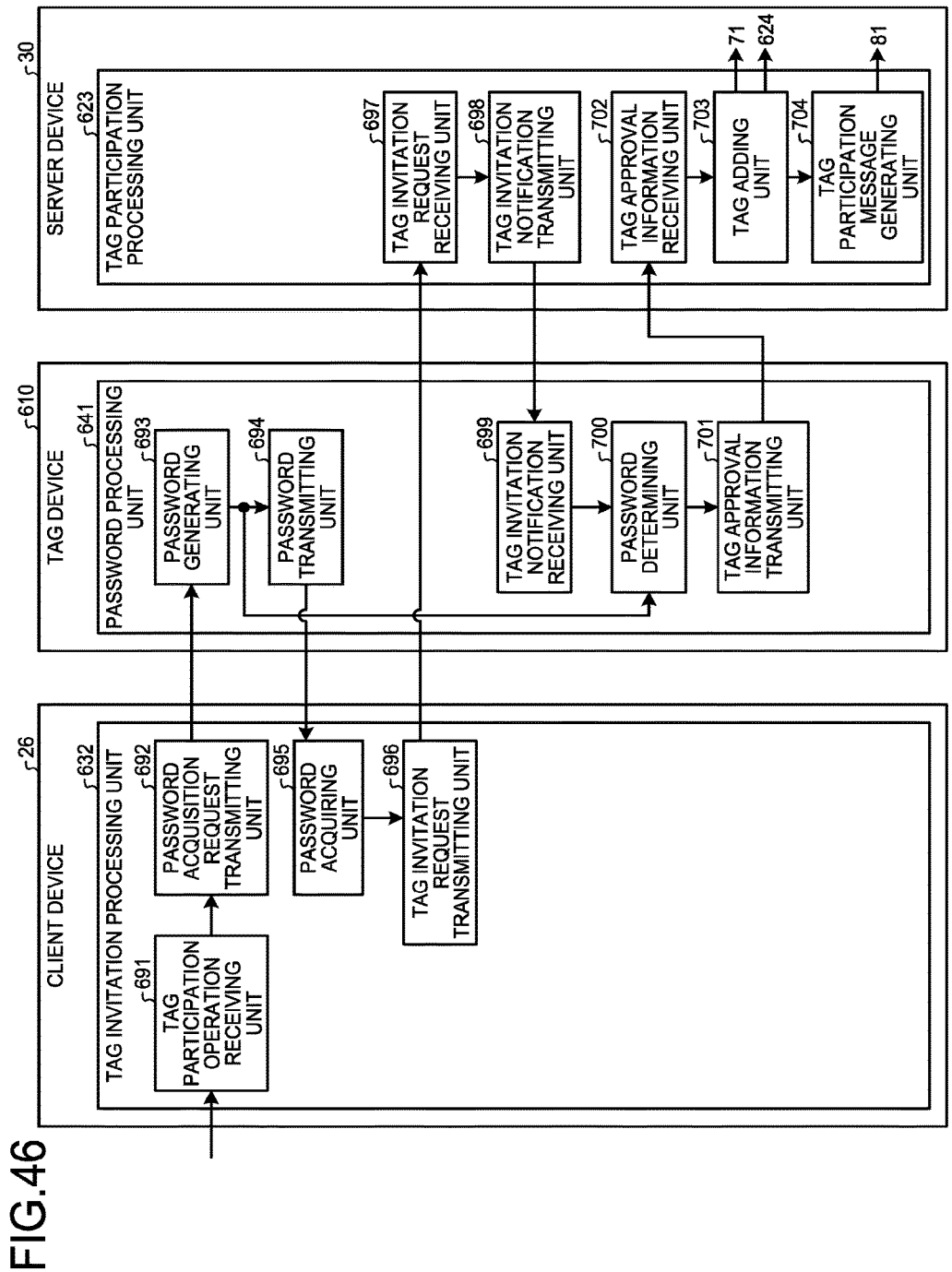
FIG. 46 is a diagram illustrating functional configurations of the client device, the tag device, and the server device according to the third embodiment for executing processing that allows participation of the tag device in a group.

FIG. 46 is a diagram illustrating functional configurations of the client device 26, the tag device 610, and the server device 30 according to the third embodiment for executing processing that allows participation of the tag device 610 in a group.

The tag invitation processing unit 632 includes a tag participation operation receiving unit 691, a password acquisition request transmitting unit 692, a password acquiring unit 695, and a tag invitation request transmitting unit 696. The password processing unit 641 includes a password generating unit 693, a password transmitting unit 694, a tag invitation notification receiving unit 699, a password determining unit 700, and a tag approval information transmitting unit 701. The tag participation processing unit 623 includes a tag invitation request receiving unit 697, a tag invitation notification transmitting unit 698, a tag approval information receiving unit 702, a tag adding unit 703, and a tag participation message generating unit 704.

The tag participation operation receiving unit 691 receives an operation that allows participation of the tag device 610 as a member of a group. The password acquisition request transmitting unit 692 transmits a password acquisition request to the tag device 610 to be allowed to participate as a member of the group. The password acquisition request transmitting unit 692 transmits the password acquisition request to the tag device 610 through the non-contact proximity communication.

Upon reception of the password acquisition request from the client device 26, the password generating unit 693 generates a password. In the present embodiment, the password generating unit 693 generates a one-time password the value of which differs at each generation. The password transmitting unit 694 transmits a tag ID and the generated password to the client device 26 that has transmitted the password acquisition request.

The password acquiring unit 695 acquires the tag ID and the password from the tag device 610. Upon the acquisition of the tag ID and the password from the tag device 610, the tag invitation request transmitting unit 696 transmits a tag invitation request to the server device 30. The tag invitation request includes a group ID for identifying a group the invitation to which is performed, the tag ID acquired from the tag device 610, and the password acquired from the tag device 610.

The tag invitation request receiving unit 697 receives the tag invitation request from the client device 26. Upon reception of the tag invitation request, the tag invitation notification transmitting unit 698 transmits a tag invitation notification that invites participation in the group to the tag device 610 identified by the tag ID included in the tag invitation request. The tag invitation notification includes the password included in the tag invitation request.

The tag invitation notification receiving unit 699 receives the tag invitation notification from the server device 30. The password determining unit 700 determines whether a tag invitation notification including a password most recently generated by the password generating unit 693 has been received from the server device 30. Specifically, the password determining unit 700 determines whether the password included in the tag invitation notification matches the password most recently generated by the password generating unit 693. If the password included in the tag invitation notification matches the password most recently generated by the password generating unit 693, the tag approval information transmitting unit 701 transmits tag approval information to the server device 30.

The tag approval information receiving unit 702 receives the tag approval information from the tag device 610. Upon the reception of the tag approval information, the tag adding unit 703 allows participation of the tag device 610 in the group. Specifically, upon the reception of the tag approval information, the tag adding unit 703 accesses the member list of the group having a group ID included in a tag invitation request stored in the member information storage unit 71. Then, the tag adding unit 703 adds the tag ID included in tag invitation request as a new member of the member list of the group having the group ID included in the tag invitation request. Accordingly, the tag device 610 is participating in the group having the group ID included in the tag invitation request.

Upon participation of the tag device 610 in the group, the tag participation message generating unit 704 generates a participation message indicating the participation of the tag device 610 in the group, and transmits the participation message to the client devices 26 of all members of the group.

Figure 47:
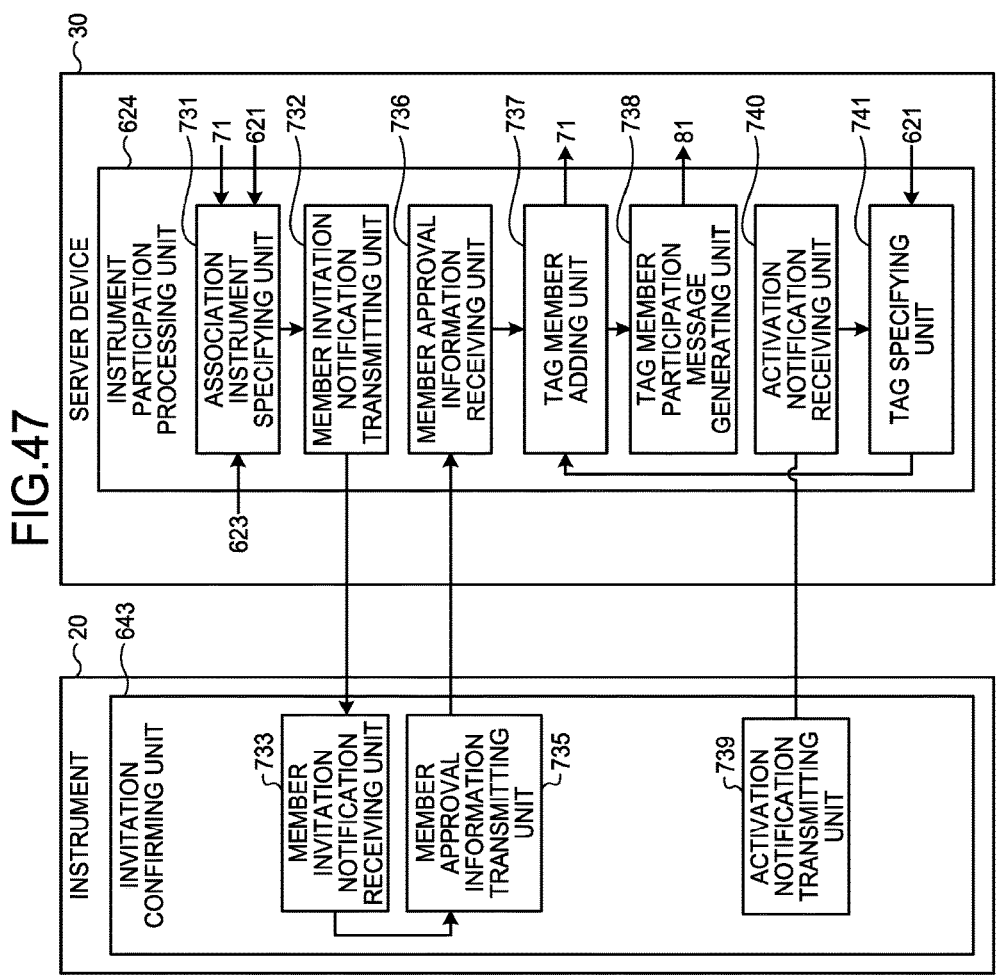
FIG. 47 is a diagram illustrating functional configurations of the instrument and the server device according to the third embodiment for executing processing that allows participation of the instrument associated with the tag device in a group.

FIG. 47 is a diagram illustrating functional configurations of the instrument 20 and the server device 30 according to the third embodiment for executing processing that allows participation of the instrument 20 associated with the tag device 610 in a group.

The instrument participation processing unit 624 includes an association instrument specifying unit 731, a member invitation notification transmitting unit 732, a member approval information receiving unit 736, a tag member adding unit 737, a tag member participation message generating unit 738, an activation notification receiving unit 740, and a tag specifying unit 741. The invitation confirming unit 643 includes a member invitation notification receiving unit 733, a member approval information transmitting unit 735, and an activation notification transmitting unit 739.

Upon participation of the tag device 610 in the group, the association instrument specifying unit 731 specifies the instrument 20 associated with the tag device 610 based on the association information stored in the association information storage unit 621. The member invitation notification transmitting unit 732 transmits a member invitation notification to the specified instrument 20. Specifically, the member invitation notification transmitting unit 732 transmits the member invitation notification to the instrument 20 associated with the tag device 610 participating in the group.

The member invitation notification receiving unit 733 receives the member invitation notification from the server device 30. Upon the reception of the member invitation notification from the server device 30, the member approval information transmitting unit 735 transmits member approval information to the server device 30.

The member approval information receiving unit 736 receives the member approval information from the instrument 20. Upon the reception of the member approval information, the tag member adding unit 737 allows participation of the instrument 20 (specified instrument 20) that has transmitted the member approval information in the group. Specifically, upon the reception of the member approval information, the tag member adding unit 737 accesses the member list of the group in which the tag device 610 is participating, which is stored in the member information storage unit 71. Then, the tag member adding unit 737 adds the instrument ID of the instrument 20 (specified instrument 20) that has transmitted the member approval information as a new member of the member list of the group in which the tag device 610 is participating. Accordingly, the instrument 20 participates in the group in which the tag device 610 is participating.

Upon participation of the instrument 20 in the group, the tag member participation message generating unit 738 generates a participation message indicating participation of the instrument 20 in the group, and transmits the participation message to the client devices 26 of all members of the group.

When the instrument 20 has been turned on to be activated, the activation notification transmitting unit 739 transmits an activation notification indicating the activation to the server device 30. The activation notification receiving unit 740 receives the activation notification from the instrument 20. Upon the reception of the activation notification from the instrument 20, the tag specifying unit 741 refers to the association information stored in the association information storage unit 621 to specify the tag device 610 associated with the instrument 20 that has transmitted the activation notification. In addition, the tag specifying unit 741 determines whether the tag device 610 associated with the instrument 20 is participating in the group. If the tag device 610 associated with the instrument 20 is participating in the group, the tag specifying unit 741 feeds the tag member adding unit 737 with a participation request to allow participation of the instrument 20 in the group.

Upon reception of the participation request from the tag specifying unit 741, the tag member adding unit 737 allows participation of the instrument 20 that has transmitted the activation notification in the group in which the tag device 610 associated with the instrument 20 is participating.

Figure 48:
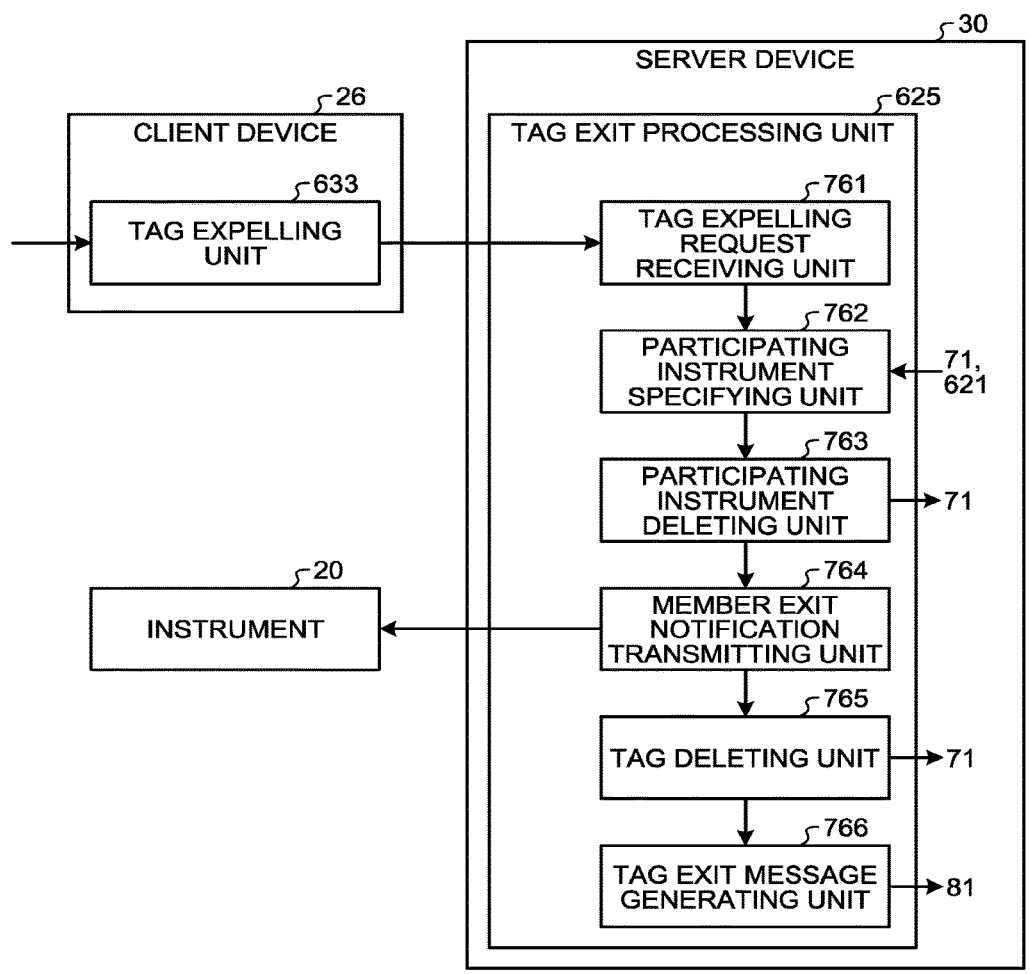
FIG. 48 is a diagram illustrating functional configurations of the client device, the instrument, and the server device according to the third embodiment for executing processing that causes the tag device to exit a group.

FIG. 48 is a diagram illustrating functional configurations of the client device 26, the instrument 20, and the server device 30 according to the third embodiment for executing processing that causes the tag device 610 to exit a group.

The tag exit processing unit 625 includes a tag expelling request receiving unit 761, a participating instrument specifying unit 762, a participating instrument deleting unit 763, a member exit notification transmitting unit 764, a tag deleting unit 765, and a tag exit message generating unit 766.

The tag expelling unit 633 of the client device 26 receives an expelling operation for causing the tag device 610 participating in a group to exit the group. Then, upon the expelling operation performed by a user, the tag expelling unit 633 transmits a tag expelling request that causes the tag device 610 to exit the group to the server device 30. The tag expelling request includes the tag ID of the tag device 610.

The tag expelling request receiving unit 761 receives the tag expelling request from the client device 26. Upon the reception of the tag expelling request, the participating instrument specifying unit 762 extracts the instrument 20 associated with the tag device 610. In addition, the participating instrument specifying unit 762 specifies any instrument 20 participating in the group among the instruments 20 associated with the tag device 610.

Upon reception of the tag expelling request from the client device 26, the participating instrument deleting unit 763 deletes the instrument 20 specified by the participating instrument specifying unit 762 from the group. Specifically, upon the reception of the tag expelling request, the participating instrument deleting unit 763 accesses the member list of a group in which the tag device 610 as a deletion target stored in the member information storage unit 71 is participating. Then, the participating instrument deleting unit 763 deletes the instrument ID of the specified instrument 20 from the member list of the group in which the tag device 610 as a deletion target is participating. Accordingly, the instrument 20 specified by the participating instrument specifying unit 762 exits the group.

The member exit notification transmitting unit 764 transmits, to each instrument 20 having exited the group, an exit notification indicating the exit of the instrument 20 from the group. Upon reception of the exit notification, the instrument 20 ends a session. Accordingly, the instrument 20 can end a television conference or a cooperative operation.

Upon reception of the tag expelling request from the client device 26, the tag deleting unit 765 deletes the tag device 610 having the tag ID included in the tag expelling request from the group. Specifically, upon the reception of tag expelling request, the tag deleting unit 765 accesses the member list of the group in which the tag device 610 as a deletion target is participating, which is stored in the member information storage unit 71. Then, the tag deleting unit 765 deletes the tag ID of the tag device 610 from the member list of the group. Accordingly, the tag device 610 exits the group.

Upon exit of the tag device 610 from the group, the tag exit message generating unit 766 generates an exit message indicating exit of the tag device 610 from the group, and transmits the exit message to the client devices 26 of all members of the group.

Figure 49:
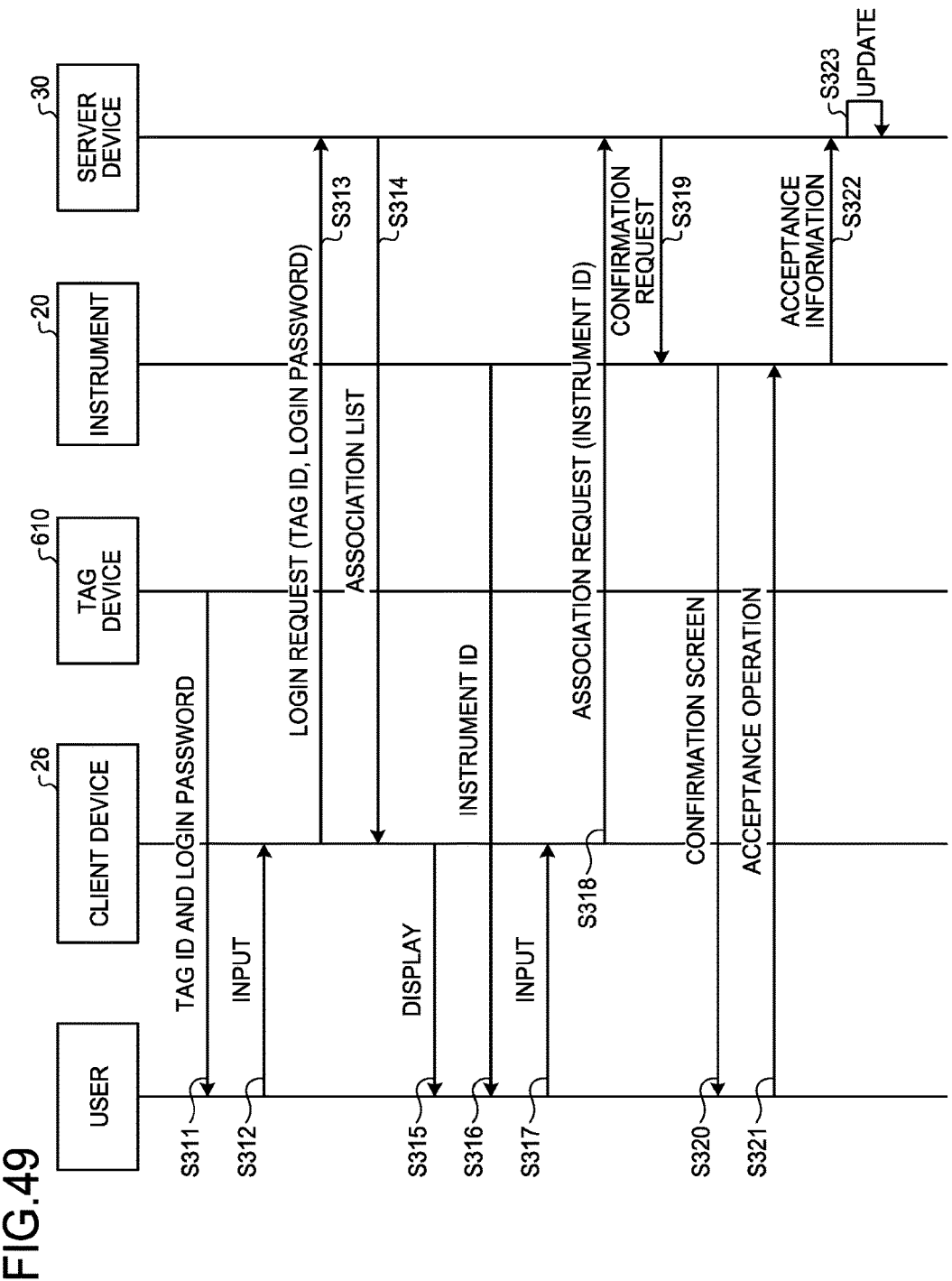
FIG. 49 is a diagram illustrating the sequence of association information update processing.
Figure 50:
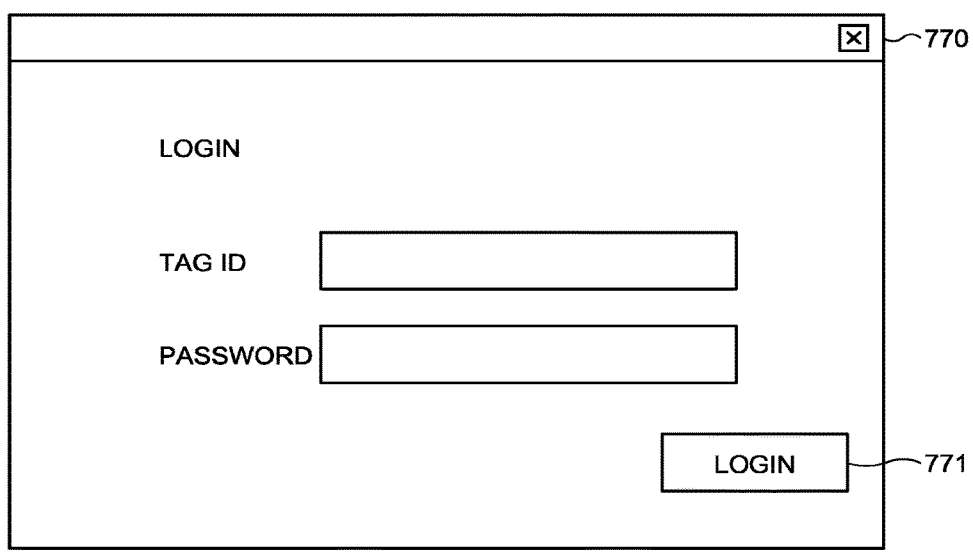
FIG. 50 is a diagram illustrating an exemplary login screen.
Figure 51:
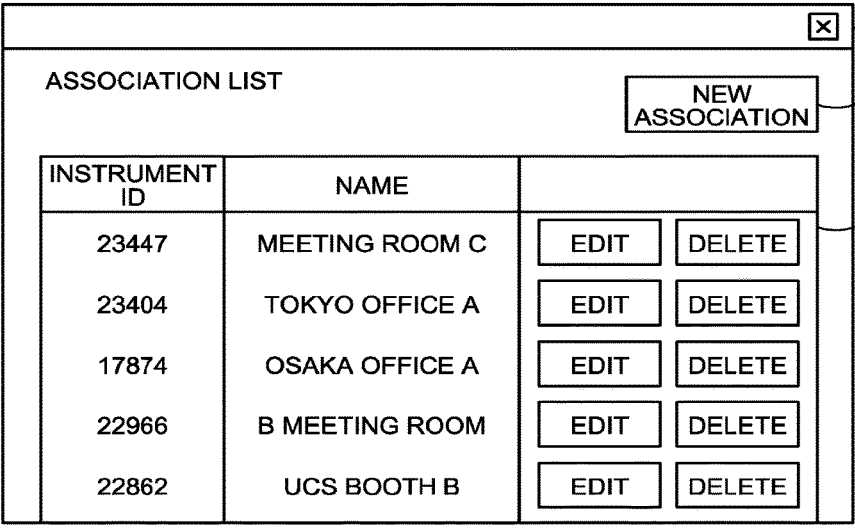
FIG. 51 is a diagram illustrating an exemplary association list screen.
Figure 52:
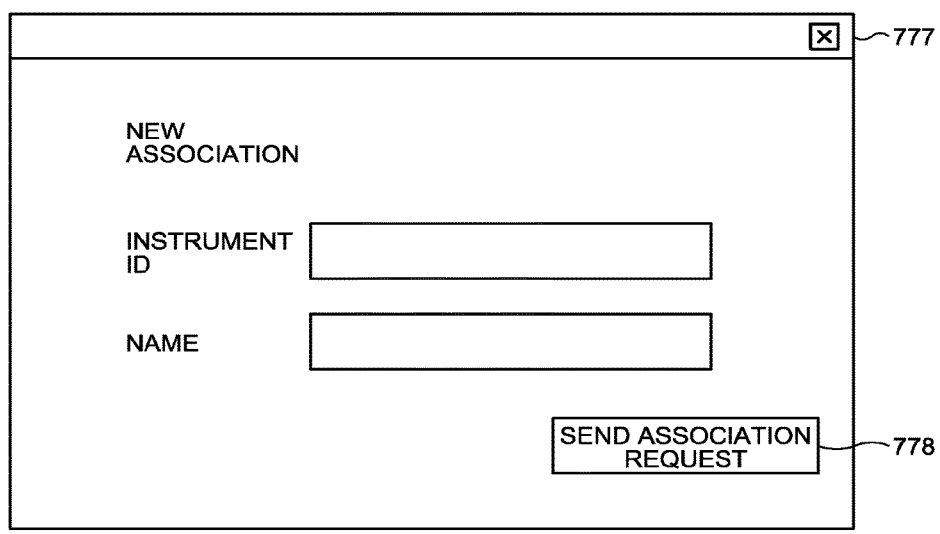
FIG. 52 is a diagram illustrating an exemplary information input screen.
Figure 53:
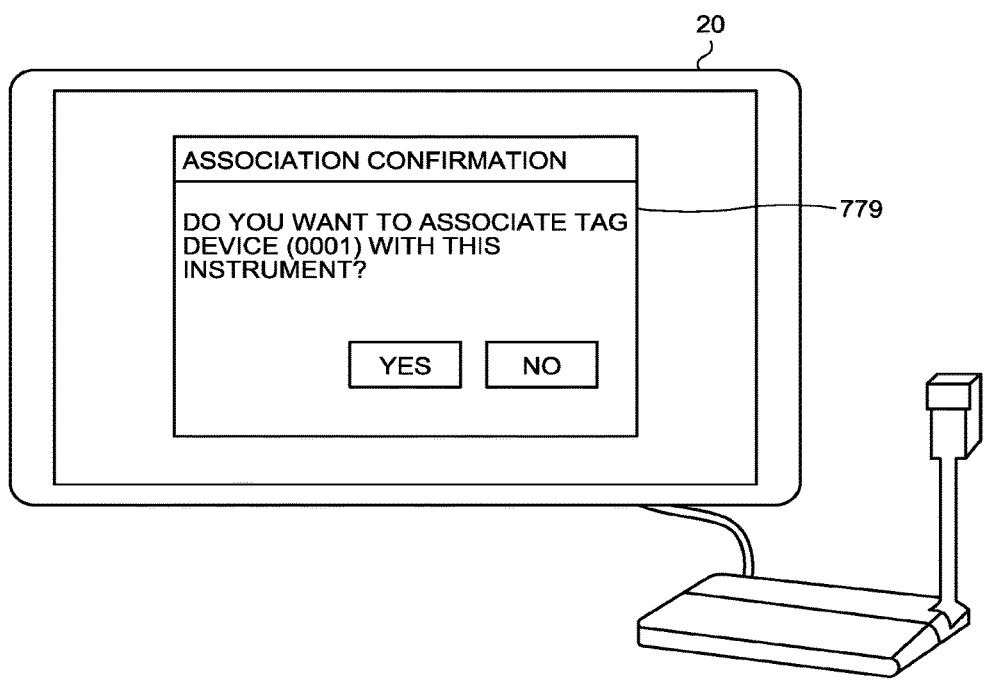
FIG. 53 is a diagram illustrating an exemplary confirmation screen.

FIG. 49 is a diagram illustrating the sequence of association information update processing. FIG. 50 is a diagram illustrating an exemplary login screen 770. FIG. 51 is a diagram illustrating an exemplary association list screen 772. FIG. 52 is a diagram illustrating an exemplary information input screen 777. FIG. 53 is a diagram illustrating an exemplary confirmation screen 779.

When updating association information, the information processing system 600 executes the processing, following the sequence illustrated in FIG. 49.

First, a user recognizes the tag ID and login password of the tag device 610 as an association target (step S311). The tag ID and the login password are written on, for example, a housing of the tag device 610. Subsequently, the user operates the client device 26 to access the server device 30, and displays, for example, the login screen 770 as illustrated in FIG. 50. The user inputs the tag ID and the login password of the tag device 610 as an association target to the login screen 770 (step S312).

Subsequently, in response to, for example, a press on a login button 771 illustrated in FIG. 50 by the user, the client device 26 transmits a login request including the input tag ID and the input login password to the server device 30 (step S313).

Subsequently, the server device 30 receives the login request. Upon the reception of the login request, the server device 30 determines whether the tag ID and the login password are valid. If the tag ID and the login password included in the login request are valid, the server device 30 permits access from the client device 26. Then, upon the access permission, the server device 30 transmits an association list to the client device 26 (step S314).

Subsequently, the client device 26 receives the association list from the server device 30. Upon the reception of the association list, the client device 26 displays the received association list (step S315). For example, the client device 26 displays the association list screen 772 as illustrated in FIG. 51. The association list screen 772 includes a list 773. The list 773 includes an instrument ID for identifying the instrument 20 associated with the tag device 610 having the received tag ID, and the name of the instrument 20. The association list screen 772 also includes a button for editing and deleting the instrument ID, the name, and the like included in the list 773.

Subsequently, the user recognizes, for example, the instrument ID of the instrument 20 as an association target (step S316). The instrument ID is written on, for example, the housing of the instrument 20. Subsequently, the user operates the client device 26 to access the server device 30, and displays a screen for newly associating the instrument 20. For example, the user presses a new association button 774 illustrated in FIG. 51. Upon the press on the new association button 774, the client device 26 displays the information input screen 777 as illustrated in FIG. 52. The user inputs the instrument ID and the name of the instrument 20 as an association target to the information input screen 777 (step S317).

Subsequently, in response to, for example, a press by the user on a transmission button 778 for transmitting the association request illustrated in FIG. 52, the client device 26 transmits an association request including the input instrument ID and the input name to the server device (step S318).

Subsequently, the server device 30 receives the association request from the client device 26. Upon the reception of the association request, the server device 30 transmits a confirmation request to the instrument 20 specified by the association request (step S319). Specifically, the confirmation request transmitting unit 669 transmits the confirmation request to the instrument 20 having an instrument ID included in the association request. The confirmation request includes the tag ID (tag ID of the tag device 610 as an association target) input at login.

Subsequently, the instrument 20 receives the confirmation request from the server device 30. Upon the reception of the confirmation request from the server device 30, the instrument 20 displays, to the user, a confirmation screen for confirming whether to perform association with the tag device 610 having the tag ID included in the confirmation request (step S320). For example, the instrument 20 displays the confirmation screen 779 as illustrated in FIG. 53.

Subsequently, the instrument 20 receives an acceptance operation from the user (step S321). Upon the acceptance operation performed by the user, the instrument 20 transmits acceptance information to the server device 30 (step S322).

Subsequently, the server device 30 receives the acceptance information from the instrument 20. Upon the reception of the acceptance information from the instrument 20, the server device 30 updates the association information stored in the association information storage unit 621 so as to associate the instrument 20 specified by the association request with the tag device 610 (step S323). Through this processing, the information processing system 600 can associate a new instrument 20 with the tag device 610.

Figure 54:
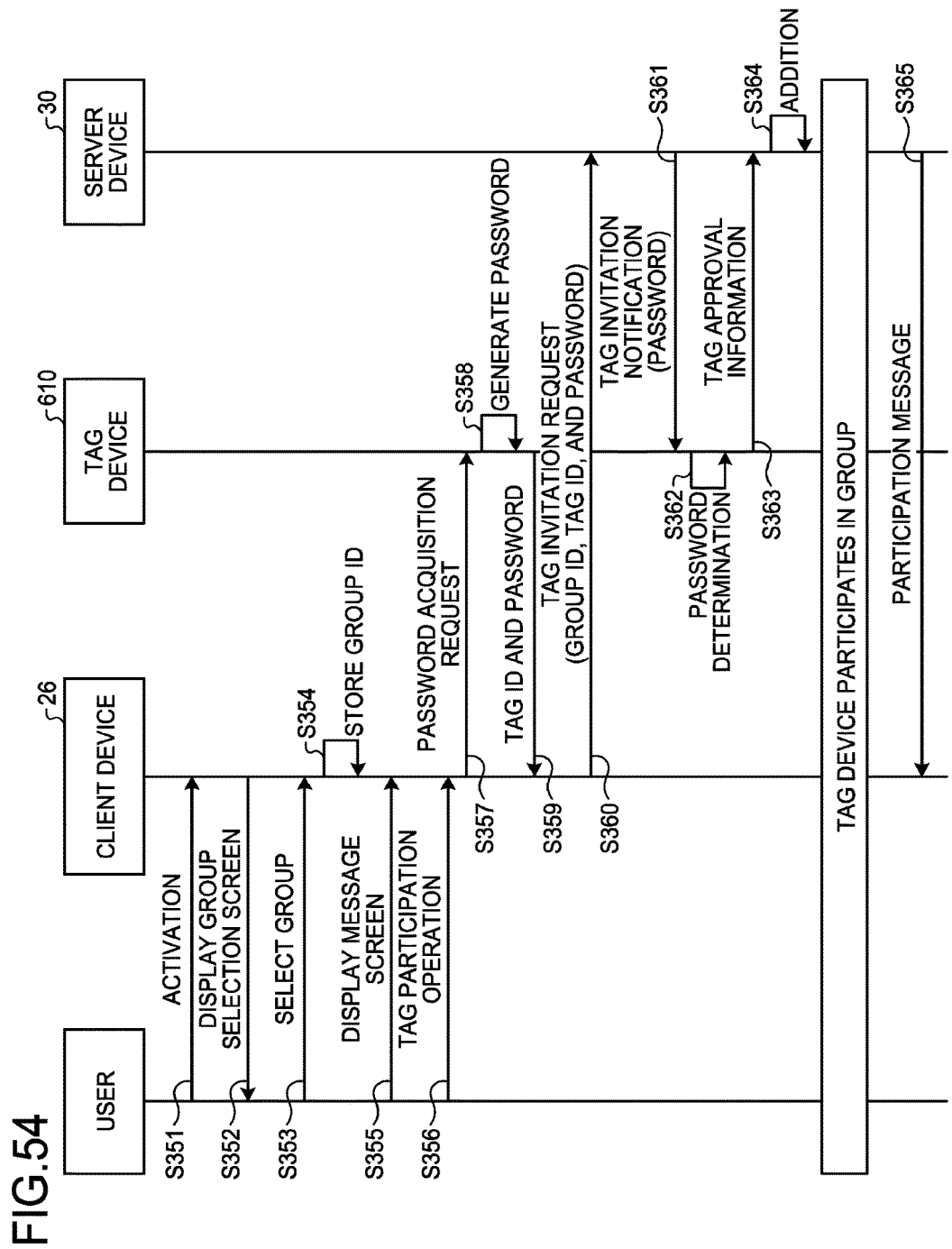
FIG. 54 is a diagram illustrating the sequence of processing that allows participation of the tag device in a group.

FIG. 54 is a diagram illustrating the sequence of processing that allows participation of the tag device 610 in a group. FIG. 55 is a diagram illustrating an exemplary participation instrument list screen upon participation of the tag device 610 in the group.

When allowing participation of the tag device 610 in the group, the information processing system 600 executes the processing, following the sequence illustrated in FIG. 54.

First, a user activates the client device 26 (step S351). For example, the user executes a predetermined computer program on the client device 26. When activated, the client device 26 displays a group selection screen (step S352). The group selection screen includes a group list indicating any group to which the user belongs as a member.

Subsequently, the user operates the group selection screen to select any one group (step S353). Upon selection of the group, the client device 26 stores a group ID for identifying the selected group (step S354). Subsequently, the client device 26 displays a message screen of the selected group (step S355).

The message screen includes a button for executing a function that allows participation of the tag device 610 in the group. Subsequently, the user operates the message screen to press the button for executing the function that allows participation of the tag device 610 in the group (step S356). Upon a press on the button for executing the function that allows participation of the tag device 610 in the group, the client device 26 transmits a password acquisition request to the tag device 610 through the non-contact proximity communication (step S357).

Upon reception of the password acquisition request from the client device 26, the tag device 610 generates a password (step S358). In this example, the tag device 610 generates a one-time password. Subsequently, the tag device 610 transmits the tag ID thereof and the generated password to the client device 26 that has transmitted the password acquisition request (step S359).

Subsequently, the client device 26 receives the tag ID and the password. Subsequently, the client device 26 transmits a tag invitation request to the server device 30 (step S360). The tag invitation request includes a group ID for identifying a group the invitation to which is performed, the tag ID acquired from the tag device 610, and the password acquired from the tag device 610.

Subsequently, the server device 30 receives the tag invitation request from the client device 26. Subsequently, the server device 30 transmits a tag invitation notification that invites participation in the group to the tag device 610 identified by the tag ID included in the tag invitation request (step S361). The tag invitation notification includes the password included in the tag invitation request.

Subsequently, the tag device 610 receives the tag invitation notification from the server device 30. Subsequently, the tag device 610 determines whether the password included in the tag invitation notification matches a most recently generated password (step S362). If the password included in the tag invitation notification matches the most recently generated password, the tag device 610 transmits tag approval information to the server device 30 (step S363).

Subsequently, the server device 30 receives the tag approval information from the tag device 610. Subsequently, the server device 30 adds the tag ID included in the tag invitation request as a new member of the member list of the group having the group ID included in the tag invitation request (step S364). Accordingly, the tag device 610 participates in the group having the group ID included in the tag invitation request.

Subsequently, the server device 30 generates a participation message indicating the participation of the tag device 610 in the group, and transmits the participation message to the client devices 26 of all members of the group (step S365). Through this processing, the information processing system 600 can allow participation of the tag device 610 in the group.

Assume that, after the processing at step S365 has ended, a user performs, on the client device 26, an operation to display a participation instrument list screen. In this case, the client device 26 displays, for example, the participation instrument list screen illustrated in FIG. 55. The participation instrument list screen illustrated in FIG. 55 indicates a state that the tag device 610 is participating in a group, whereas the instruments 20 (an electronic blackboard A, an electronic blackboard B, and a conference terminal device, for example) associated with the tag device 610 are not participating in the group.

Figure 56:
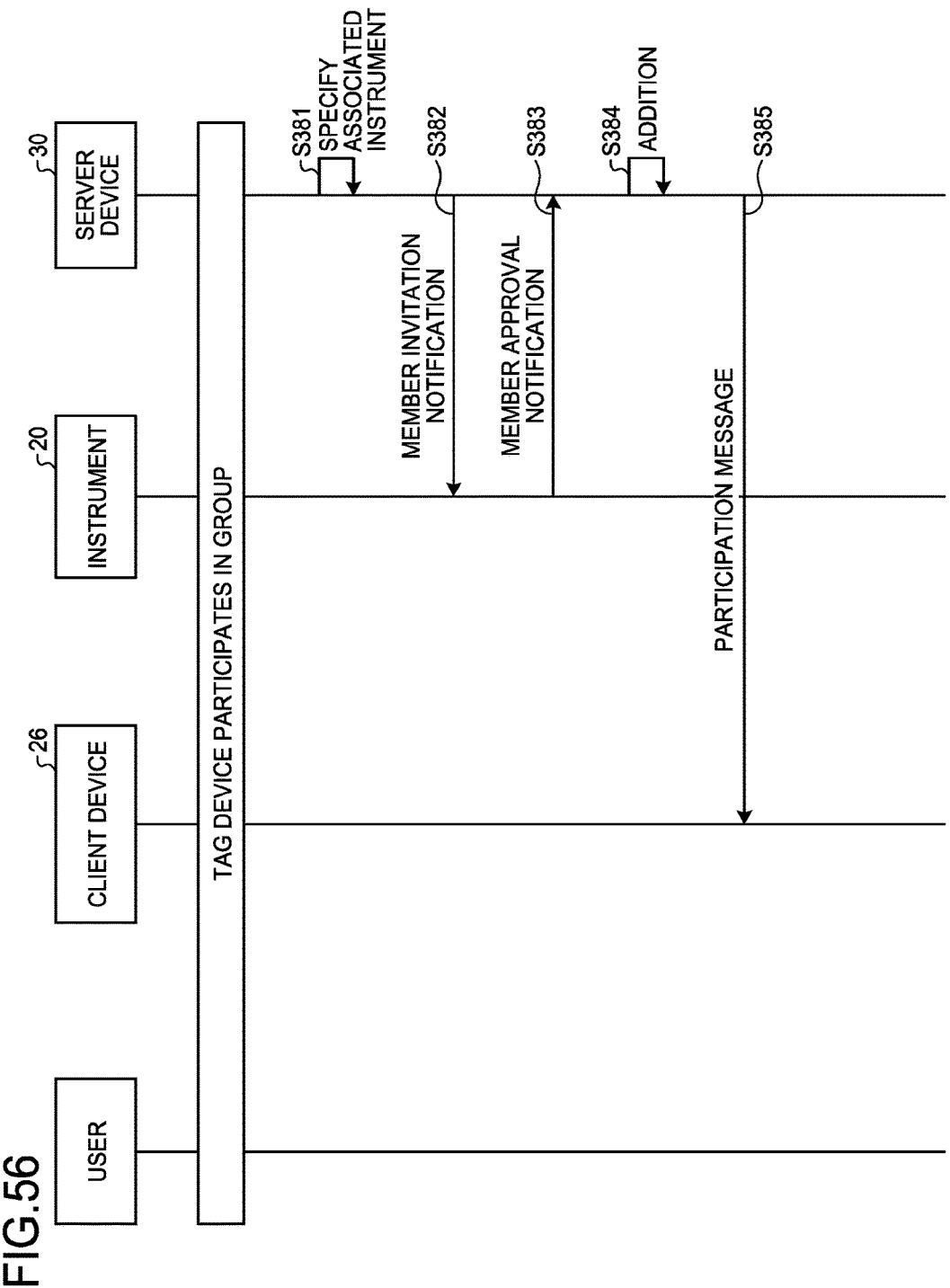
FIG. 56 is a diagram illustrating the sequence of processing that allows participation of the instrument associated with the tag device in a group.

FIG. 56 is a diagram illustrating the sequence of processing that allows participation of each instrument 20 associated with the tag device 610 in the group. FIG. 57 is a diagram illustrating an exemplary participation instrument list screen when the instrument 20 associated with the tag device 610 participates in the group.

When allowing participation of the instrument 20 associated with the tag device 610 in the group, the information processing system 600 executes the processing, following the sequence illustrated in FIG. 56.

Upon participation of the tag device 610 in the group, first, the server device 30 specifies, based on association information, all instruments 20 associated with the tag device 610 participating in the group (step S381). Subsequently, the server device 30 transmits a member invitation notification to each specified instrument 20 (step S382).

Subsequently, the instrument 20 receives the member invitation notification from the server device 30. Upon the reception of the member invitation notification, the instrument 20 transmits member approval information to the server device 30 (step S383). Specifically, upon the reception of the member invitation notification, the instrument 20 automatically transmits the member approval information to the server device 30 without displaying a confirmation screen or the like to the user. This is because the instrument 20 is associated with the tag device 610, and the tag device 610 has participated in the group after authentication with a password, thereby establishing a trusted relation with the server device 30. In addition, when the tag device 610 is participating in the group, it is guaranteed that the user is present near the tag device 610. Thus, the instrument 20 can assume that the user has approved the participation in the group, and automatically transmit the member approval information to the server device 30.

Subsequently, the server device 30 receives the member approval information from the instrument 20. Subsequently, the server device 30 adds the instrument ID of the instrument 20 (specified instrument 20) that has transmitted the member approval information as a new member of the member list of the group in which the tag device 610 is participating (step S384). Accordingly, the instrument 20 participates in the group in which the tag device 610 is participating.

Subsequently, the server device 30 generates a participation message indicating the participation of the instrument 20 in the group, and transmits the participation message to the client devices 26 of all members of the group (step S385). Through this processing, the information processing system 600 can allow participation of the instrument 20 associated with the tag device 610 in the group. When a plurality of the instruments 20 are associated with the tag device 610, the information processing system 600 executes the processing at steps S382 to S385 for each of the instruments 20.

Assume that the user performs, on the client device 26, an operation to display a participation instrument list screen after the processing at step S385 has ended. In this case, the client device 26 displays, for example, the participation instrument list screen illustrated in FIG. 57. The participation instrument list screen illustrated in FIG. 57 indicates a state that the tag device 610 is participating in the group, and among the instruments 20 associated with the tag device 610, the instruments 20 (the electronic blackboard A and the conference terminal device, for example) on which a participation operation has been performed are participating in the group.

Figure 58:
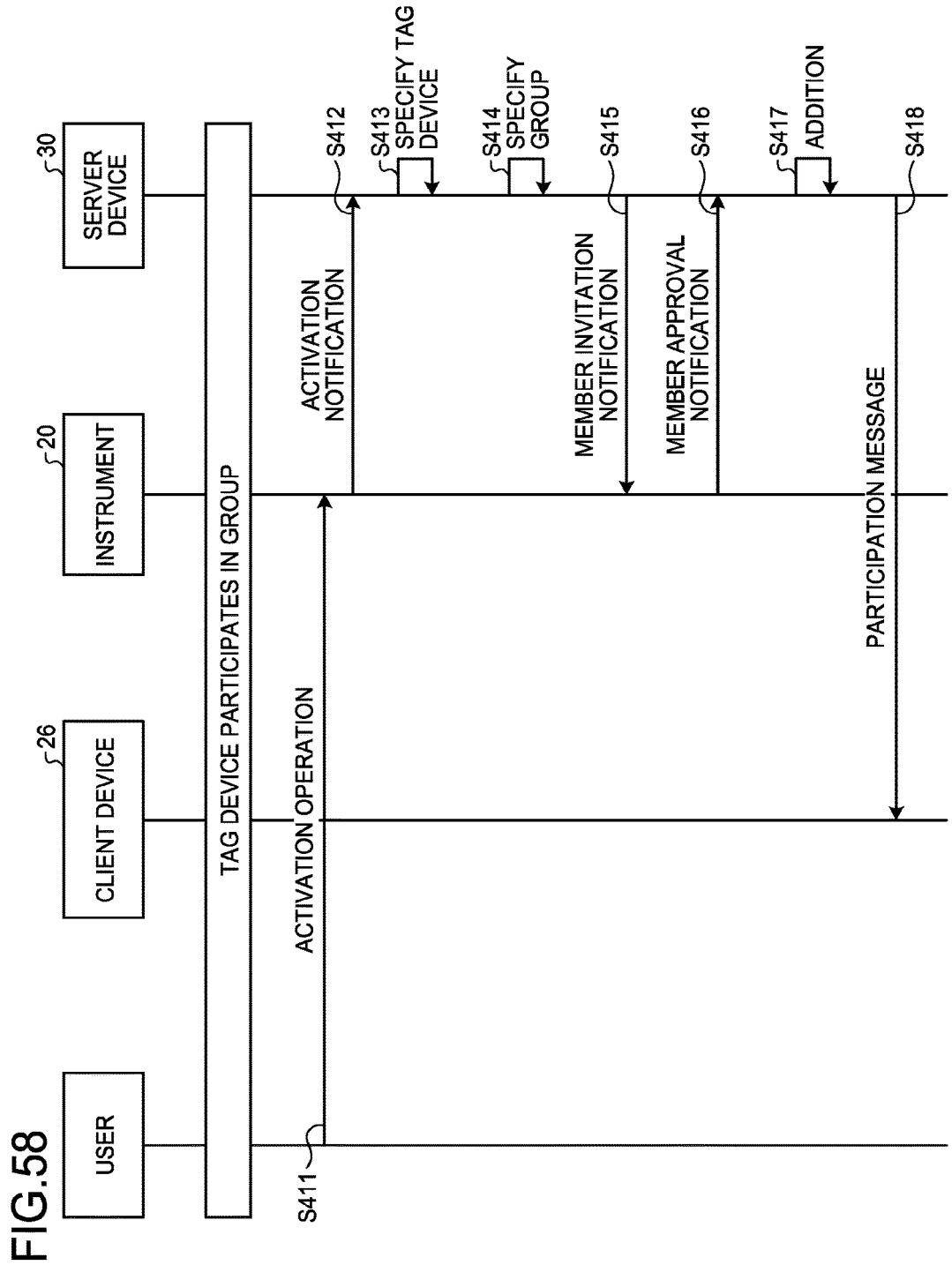
FIG. 58 is a diagram illustrating the sequence of processing performed when the instrument 20 has activated.

FIG. 58 is a diagram illustrating the sequence of processing when the instrument 20 has been activated. Upon the activation of the instrument 20, the information processing system 600 executes the processing, following the sequence illustrated in FIG. 58.

First, a user performs an operation to activate the instrument 20 (step S411). For example, the user turns on the instrument 20. Subsequently, having started the activation, the instrument 20 transmits an activation notification indicating the activation to the server device (step S412).

Subsequently, the server device 30 receives the activation notification from the instrument 20. Subsequently, the server device 30 refers to the association information to specify the tag device 610 associated with the instrument 20 that has transmitted the activation notification (step S413). When the instrument 20 that has transmitted the activation notification is associated with any tag device 610, the server device 30 also specifies a group in which the tag device 610 associated with the instrument 20 is participating (step S414). When the tag device 610 associated with the instrument 20 that has transmitted the activation notification is participating in any group, the server device 30 transmits, to the instrument 20 that has transmitted the activation notification, a member invitation notification that invites participation in the group in which the tag device 610 is participating (step S415).

Subsequently, the instrument 20 receives the member invitation notification from the server device 30. Upon the reception of the member invitation notification, the instrument 20 transmits member approval information to the server device 30 (step S416).

Subsequently, the server device 30 receives the member approval information from the instrument 20. Subsequently, the server device 30 adds the instrument ID of the instrument 20 (specified instrument 20) that has transmitted the member approval information as a new member of the member list of the group in which the tag device 610 is participating (step S417). Accordingly, the instrument 20 is participating in the group in which the tag device 610 is participating. Subsequently, the server device 30 generates a participation message indicating the participation of the instrument 20 in the group, and transmits the participation message to the client devices 26 of all members of the group (step S418). Through this processing, when the instrument 20 associated with the tag device 610 has been activated after the tag device 610 has participated in the group, the information processing system 600 can allow participation of the instrument 20 in the group.

Figure 59:
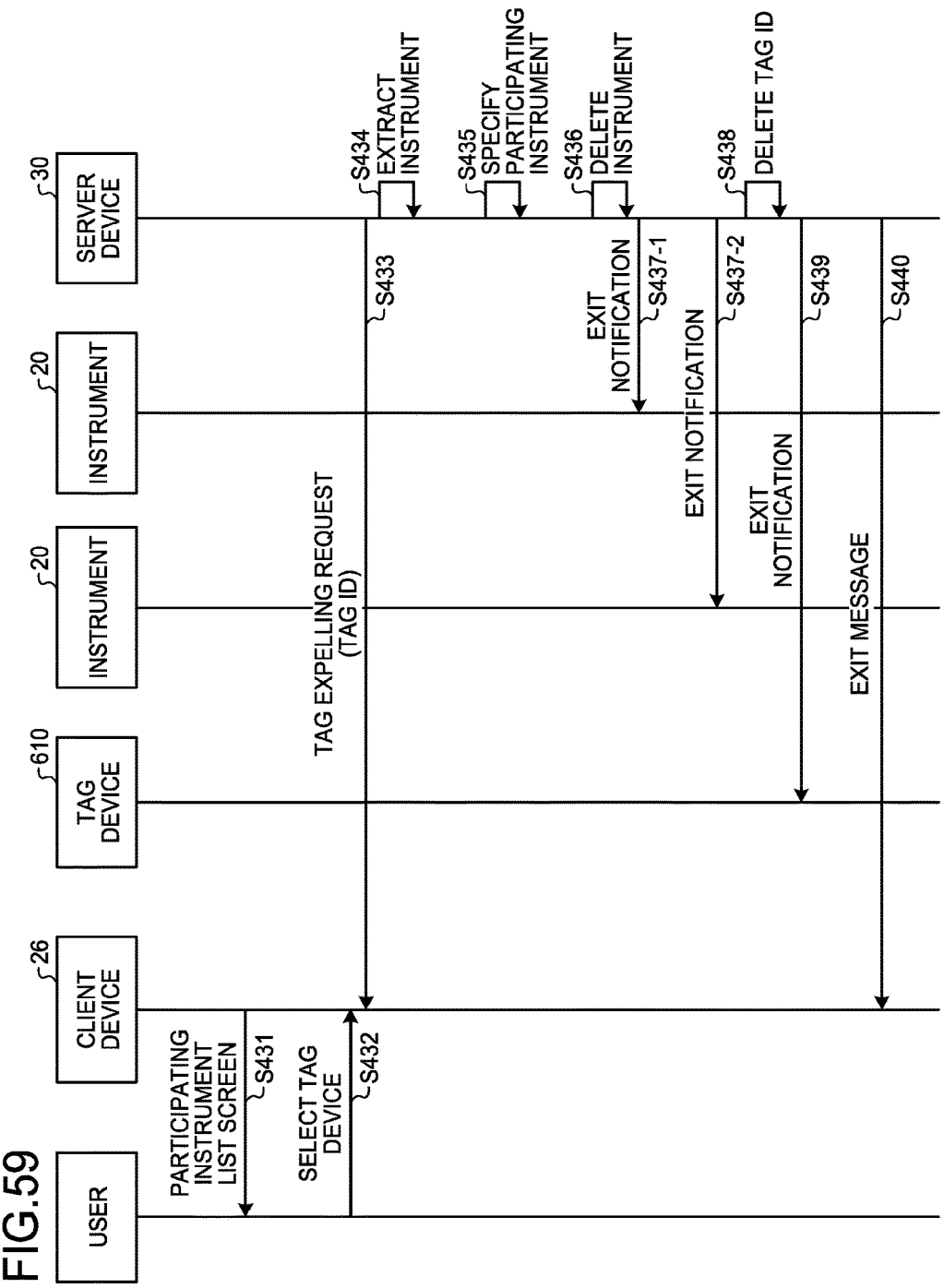
FIG. 59 is a diagram illustrating the sequence of processing that causes the tag device to exit a group.

FIG. 59 is a diagram illustrating the sequence of processing that causes the tag device 610 to exit a group. When causing the tag device 610 to exit the group, the information processing system 600 executes the processing, following the sequence illustrated in FIG. 59.

First, the client device 26 displays a screen indicating a list of any instrument 20 participating in the group (step S431). Subsequently, a user selects the tag device 610 in the participation instrument list screen, and performs an operation that causes the tag device 610 to exit the group (step S432). Subsequently, the client device 26 transmits a tag expelling request that causes the tag device 610 to exit the group to the server device 30 (step S433). The tag expelling request includes the tag ID of the tag device 610.

Subsequently, the server device 30 receives the tag expelling request from the client device 26. Subsequently, the server device 30 extracts any instrument 20 associated with the tag device 610 (the tag device 610 as a deletion target) having the tag ID included in the tag expelling request (step S434). In addition, the server device 30 specifies any instrument 20 participating in the group among the instruments 20 associated with the tag device 610 as a deletion target (step S435).

Subsequently, the server device 30 deletes the instrument ID of the specified instrument 20 from the member list of the group in which the tag device 610 as a deletion target is participating (step S436). Accordingly, the instrument 20 associated with the tag device 610 as a deletion target exits the group.

Subsequently, the server device 30 transmits an exit notification indicating the exit from the group to all instruments 20 that have exited the group (steps S437-1 and S437-2). Upon reception of the exit notification, each instrument 20 ends a session. Accordingly, the instrument 20 can end a television conference or a cooperative operation.

Subsequently, the server device 30 deletes the tag ID of the tag device 610 as a deletion target from the member list of the group in which the tag device 610 as a deletion target is participating (step S438). Accordingly, the tag device 610 exits the group. Subsequently, upon the exit of the tag device 610 from the group, the server device 30 transmits an exit notification indicating the exit from the group to the tag device 610 (step S439). Subsequently, the server device 30 generates an exit message indicating the exit of the tag device 610 from the group, and transmits the exit message to the client devices 26 of all members of the group (step S440). Through this processing, the information processing system 600 can cause the tag device 610 and each instrument 20 associated with the tag device 610 to exit the group.

As described above, the information processing system 600 according to the present embodiment can allow participation of the instrument 20 associated with the tag device 610 in a group by using the tag device 610. Accordingly, the information processing system 600 according to the present embodiment can collectively allow participation of a plurality of the instruments 20 in a group.

Fourth Embodiment

The following describes an information processing system 800 according to a fourth embodiment. The information processing system 800 according to the fourth embodiment has the functions and configurations substantially identical to those of the information processing system 600 according to the third embodiment. Thus, in the description of the information processing system 800 according to the fourth embodiment, any device or unit having the functions and configurations substantially identical to those of the information processing system 600 according to the third embodiment is denoted by an identical reference numeral, and detailed description of any common content will be omitted.

Figure 60:
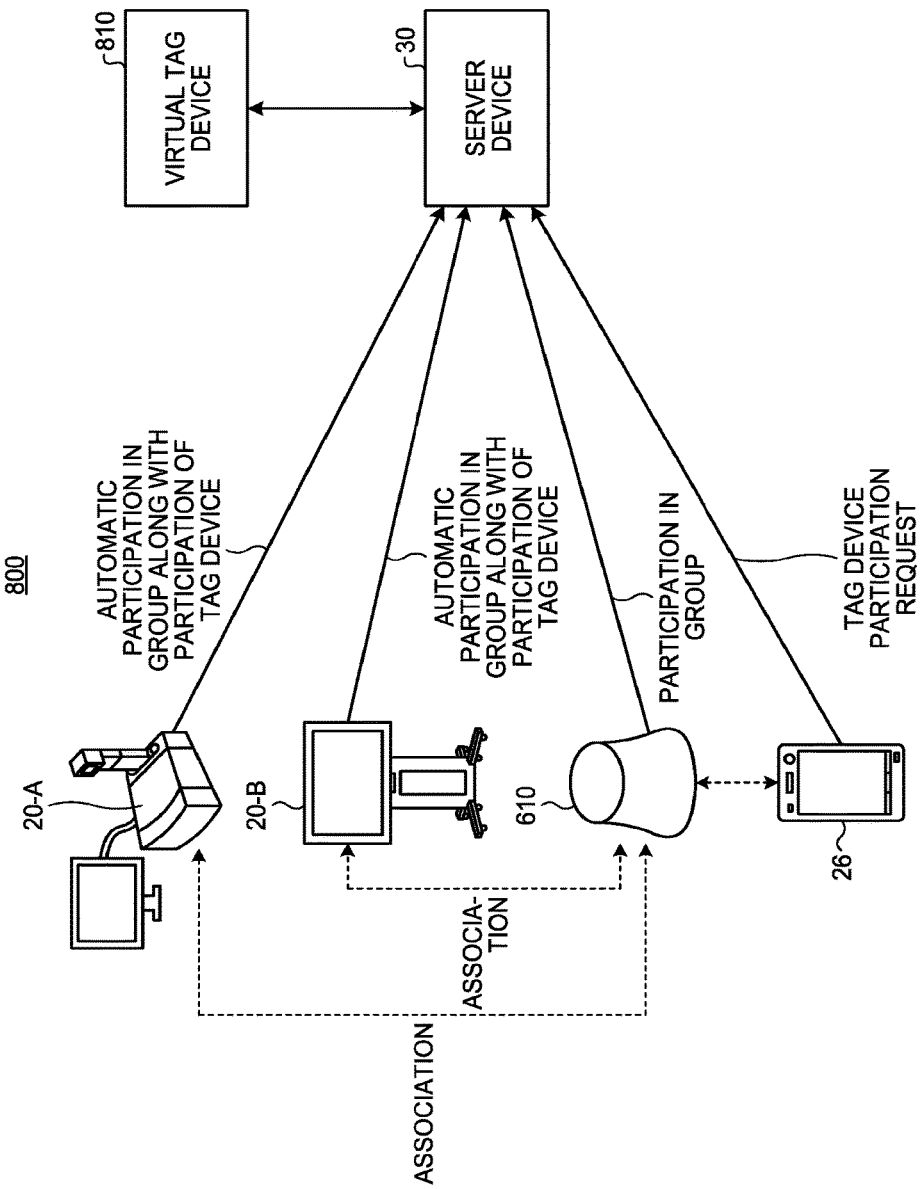
FIG. 60 is a diagram illustrating an information processing system according to a fourth embodiment of the present invention.

FIG. 60 is a diagram illustrating the information processing system 800 according to the fourth embodiment. The information processing system 800 according to the fourth embodiment additionally includes a virtual tag device 810. The virtual tag device 810 is an information processing device provided to the network. The virtual tag device 810 is achieved by, for example, a typical computer.

The virtual tag device 810 is associated with any tag device 610. The virtual tag device 810 can be accessed from the server device 30 by using a tag ID allocated to the tag device 610.

The tag device 610 generates a first password. The first password generated by the tag device 610 is changed, for example, in a certain time period (1 minute, for example). The virtual tag device 810 generates a second password. The second password generated by the virtual tag device 810 is identical to the first password generated by the tag device 610. In other words, the virtual tag device 810 and the tag device 610 generate the identical password in synchronization.

In the fourth embodiment, the tag device 610 does not have a function that communicates information with the server device 30 through the network. In other words, the tag device 610 can communicate information with the client device 26 through, for example, the non-contact proximity communication, but cannot communicate information with the server device 30.

Figure 61:
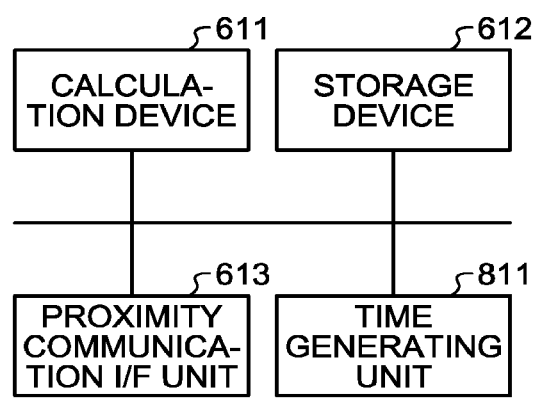
FIG. 61 is a diagram illustrating an exemplary hardware configuration of the tag device according to the fourth embodiment.

FIG. 61 is a diagram illustrating an exemplary hardware configuration of the tag device 610 according to the fourth embodiment. The tag device 610 according to the present embodiment includes the calculation device 611, the storage device 612, the proximity communication I/F unit 613, and a time generating unit 811.

The time generating unit 811 generates an absolute time. The calculation device 611 generates the first password based on the absolute time generated by the time generating unit 811. In this manner, the tag device 610 can generate an identical password in synchronization with the virtual tag device 810.

Figure 62:
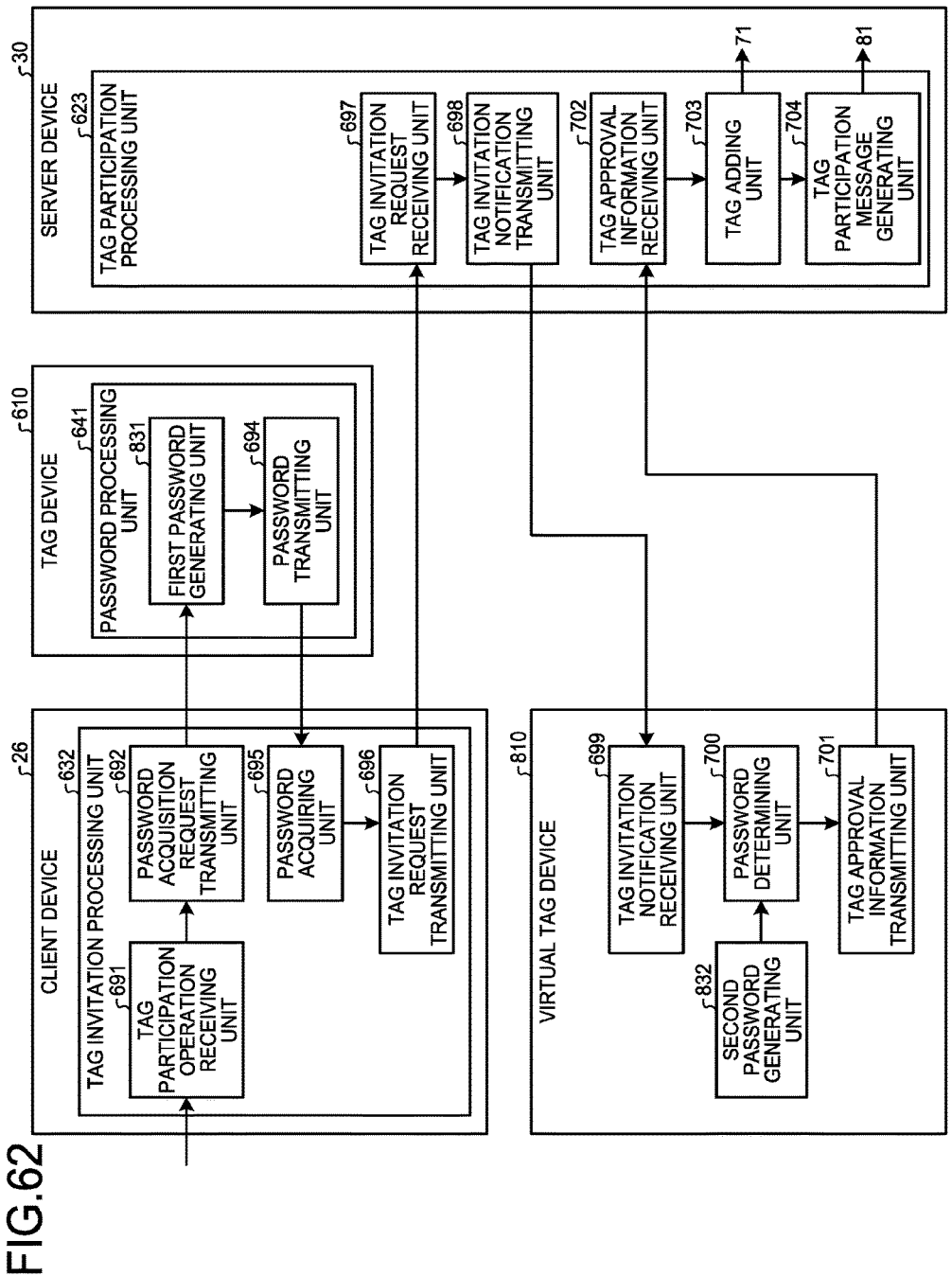
FIG. 62 is a diagram illustrating functional configurations of the client device, the tag device, a virtual tag device, and the server device according to the fourth embodiment for executing processing that allows participation of the tag device in a group.

FIG. 62 is a diagram illustrating functional configurations, the client device 26, the tag device 610, the virtual tag device 810, and the server device 30 according to the fourth embodiment for executing processing that allows participation of the tag device 610 in a group.

The password processing unit 641 of the tag device 610 according to the fourth embodiment includes a first password generating unit 831 and the password transmitting unit 694. The virtual tag device 810 includes a second password generating unit 832, the tag invitation notification receiving unit 699, the password determining unit 700, and the tag approval information transmitting unit 701.

The first password generating unit 831 generates the first password that is identical to the second password generated by the virtual tag device 810 and the value of which is changed simultaneously with the second password. Upon reception of a password acquisition request from the client device 26, the password transmitting unit 694 transmits the tag ID thereof and the generated first password to the client device 26 that has transmitted the password acquisition request.

The password acquiring unit 695 acquires the tag ID and the first password from the tag device 610. Upon acquisition of the tag ID and the first password from the tag device 610, the tag invitation request transmitting unit 696 transmits a tag invitation request to the server device 30. The tag invitation request includes a group ID for identifying a group the invitation to which is performed, the tag ID acquired from the tag device 610, and the first password acquired from the tag device 610.

The tag invitation request receiving unit 697 receives the tag invitation request from the client device 26. Upon the reception of the tag invitation request, the tag invitation notification transmitting unit 698 transmits a tag invitation notification that invites participation in the group to the virtual tag device 810 identified by the tag ID included in the tag invitation request. The tag invitation notification includes the first password included in the tag invitation request.

The tag invitation notification receiving unit 699 receives the tag invitation notification from the server device 30. The second password generating unit 832 generates the second password that is identical to the first password generated by the first password generating unit 831 of the tag device 610 and the value of which is simultaneously changed.

The password determining unit 700 determines whether a tag invitation notification including the first password identical to the second password has been received from the server device 30. Specifically, the password determining unit 700 determines whether the first password included in tag invitation notification matches the second password most recently generated by the second password generating unit 832. If the first password included in tag invitation notification matches the second password most recently generated by the second password generating unit 832, the tag approval information transmitting unit 701 transmits tag approval information to the server device 30.

The tag approval information receiving unit 702 receives the tag approval information from the virtual tag device 810. Upon the reception of the tag approval information, the tag adding unit 703 allows participation of the tag device 610 in the group. Specifically, upon the reception of the tag approval information, the tag adding unit 703 accesses the member list of the group having the group ID included in the tag invitation request, which is stored in the member information storage unit 71. Then, the tag adding unit 703 adds the tag ID included in the tag invitation request as a new member of the member list of the group having the group ID included in the tag invitation request. Accordingly, the tag device 610 participates in the group having the group ID included in the tag invitation request.

Upon participation of the tag device 610 in the group, the tag participation message generating unit 704 generates a participation message indicating the participation of the tag device 610 in the group, and transmits the participation message to the client devices 26 of all members of the group.

Figure 63:
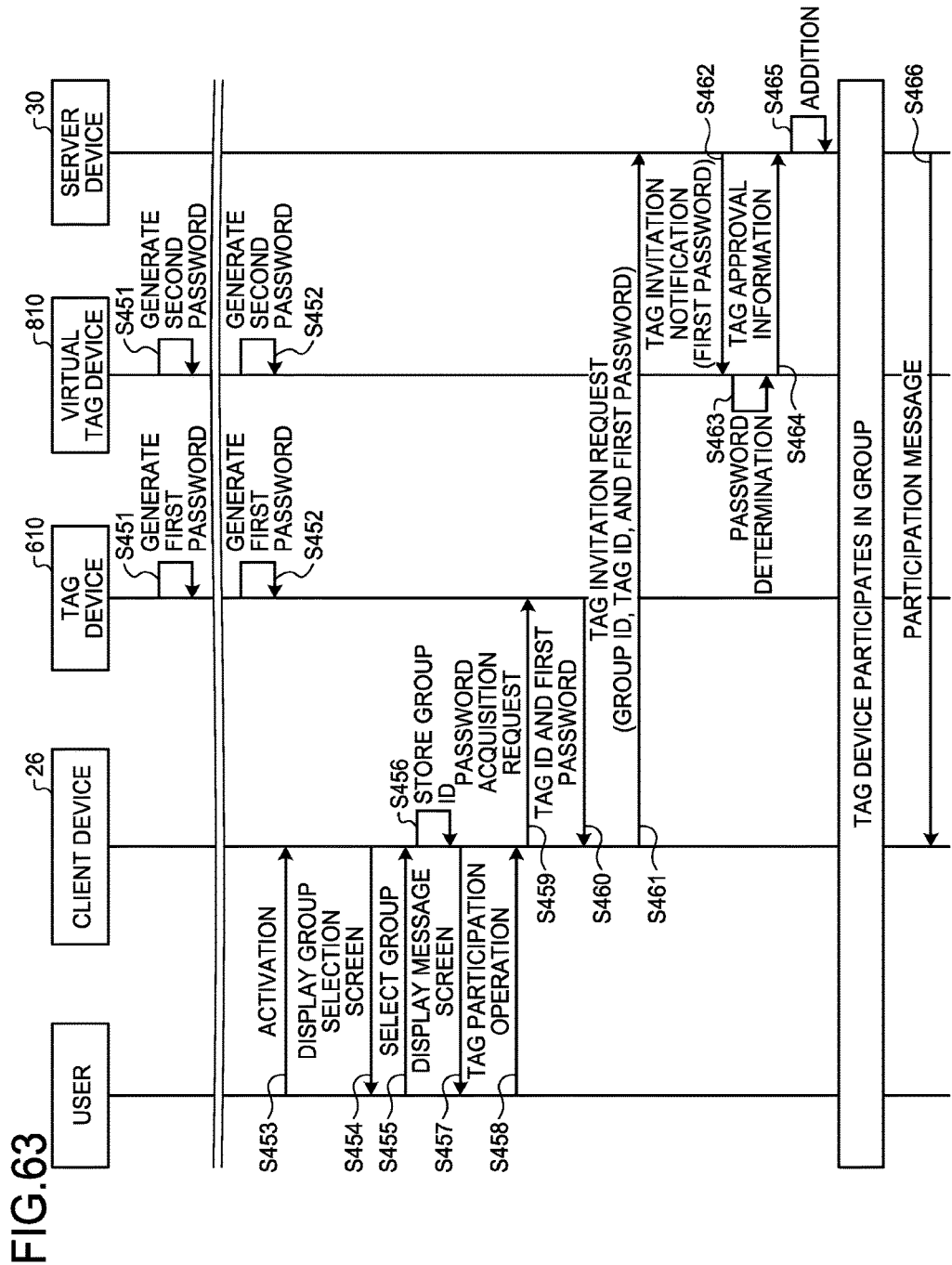
FIG. 63 is a diagram illustrating the sequence of processing that allows participation of the tag device in a group in the fourth embodiment.

FIG. 63 is a diagram illustrating the sequence of processing that allows participation of the tag device 610 in a group in the fourth embodiment. In the fourth embodiment, when allowing participation of the tag device 610 in the group, the information processing system 800 executes the processing, following the sequence illustrated in FIG. 63.

First, the tag device 610 periodically generates the first password (steps S451 and S452). The virtual tag device 810 also generates the second password having a value identical to that of the first password simultaneously with the tag device 610 (steps S451 and S452).

Subsequently, a user activates the client device 26 (step S453). When activated, the client device 26 displays a group selection screen (step S454). Subsequently, the user operates the group selection screen to select any one group (step S455). Upon the selection of the group, the client device 26 stores a group ID for identifying the selected group (step S456). Subsequently, the client device 26 displays a message screen of the selected group (step S457).

Subsequently, the user operates the message screen and presses a button for executing a function that allows participation of the tag device 610 in the group (step S458). Subsequently, the user places the client device 26 close to the tag device 610. Accordingly, the client device 26 transmits a password acquisition request to the tag device 610 through the non-contact proximity communication (step S459).

Upon reception of the password acquisition request from the client device 26, the tag device 610 transmits the tag ID thereof and the first password most recently generated to the client device 26 that has transmitted the password acquisition request (step S460).

Subsequently, the client device 26 receives the tag ID and the first password. Subsequently, the client device 26 transmits a tag invitation request to the server device 30 (step S461). The tag invitation request includes a group ID for identifying the group the invitation to which is performed, the tag ID acquired from the tag device 610, and the first password acquired from the tag device 610.

Subsequently, the server device 30 receives the tag invitation request from the client device 26. Subsequently, the server device 30 transmits a tag invitation notification that invites participation in the group to the virtual tag device 810 identified by the tag ID included in the tag invitation request (step S462). The tag invitation notification includes the first password included in the tag invitation request.

Subsequently, the virtual tag device 810 receives the tag invitation notification from the server device 30. Subsequently, the virtual tag device 810 determines whether the first password included in the tag invitation notification matches the second password most recently generated by the own instrument 20 (step S463). If the first password included in the tag invitation notification matches the most recently generated second password, the virtual tag device 810 transmits tag approval information to the server device 30 (step S464).

Subsequently, the server device 30 receives the tag approval information from the virtual tag device 810. Subsequently, the server device 30 adds the tag ID included in the invitation request as a new member of the member list of the group having the group ID included in the invitation request (step S465). Accordingly, the tag device 610 participates in the group having the group ID included in the tag invitation request. Subsequently, the server device 30 generates a participation message indicating the participation of the tag device 610 in the group, and transmits the participation message to the client devices 26 of all members of the group (step S466).

As described above, the information processing system 800 according to the present embodiment can allow participation of the instrument 20 associated with the tag device 610 in a group by using the tag device 610. Accordingly, the information processing system 800 can collectively allow participation of a plurality of the instruments 20 in a group. In addition, in the information processing system 800 according to the present embodiment, the virtual tag device 810 performs communications of information with the server device 30. Accordingly, in the information processing system 800 according to the present embodiment, the tag device 610 does not need to have a function that performs communication through the network, thereby achieving a simplified configuration.

Fifth Embodiment

The following describes an information processing system 900 according to a fifth embodiment. In the description of the information processing system 900 according to the fifth embodiment, any device or unit having the functions and configurations substantially identical to those of the information processing system 600 according to the third embodiment and the information processing system 800 according to the fourth embodiment is denoted by an identical reference numeral, and detailed description of any common content will be omitted.

Figure 64:
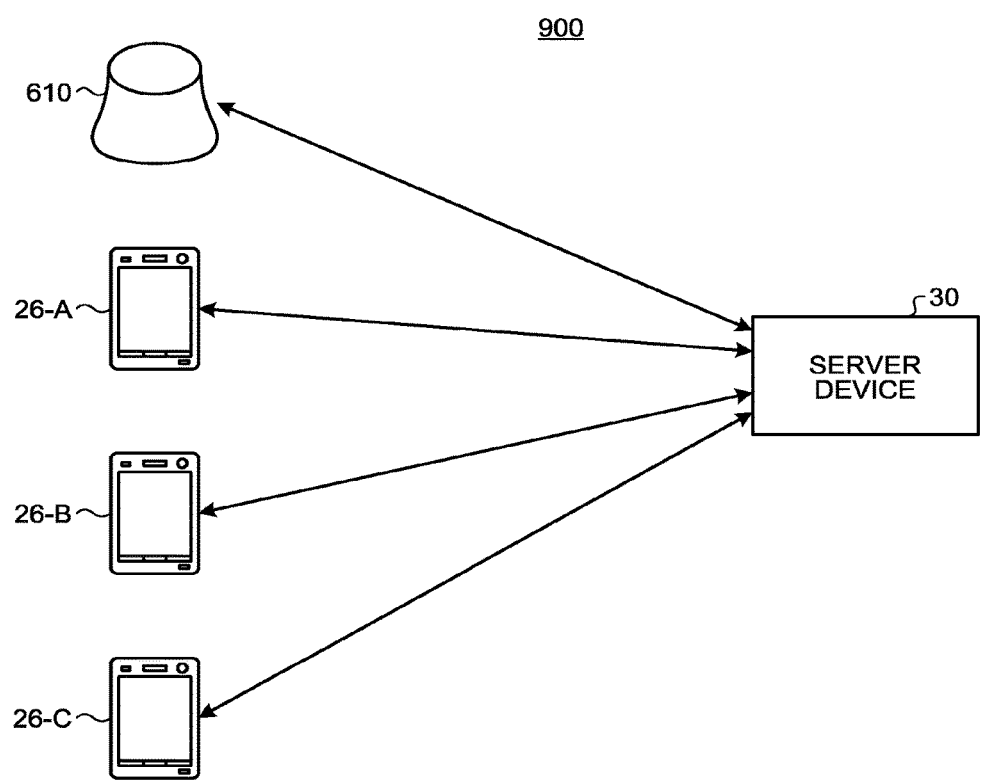
FIG. 64 is a diagram illustrating an information processing system according to a fifth embodiment of the present invention.

FIG. 64 is a diagram illustrating the information processing system 900 according to the fifth embodiment. The information processing system 900 according to the present embodiment includes a plurality of the client devices 26 (26-A, 26-B, and 26-C), the tag device 610, and the server device 30. Although FIG. 64 illustrates the three client devices 26, the information processing system 900 may include any number of the client devices 26. The information processing system 900 may include the tag device 610 and the virtual tag device 810 according to the fourth embodiment.

The client devices 26 are held by different users. The client devices 26 are participating in an identical group through accounts of the respective users.

Figure 65:
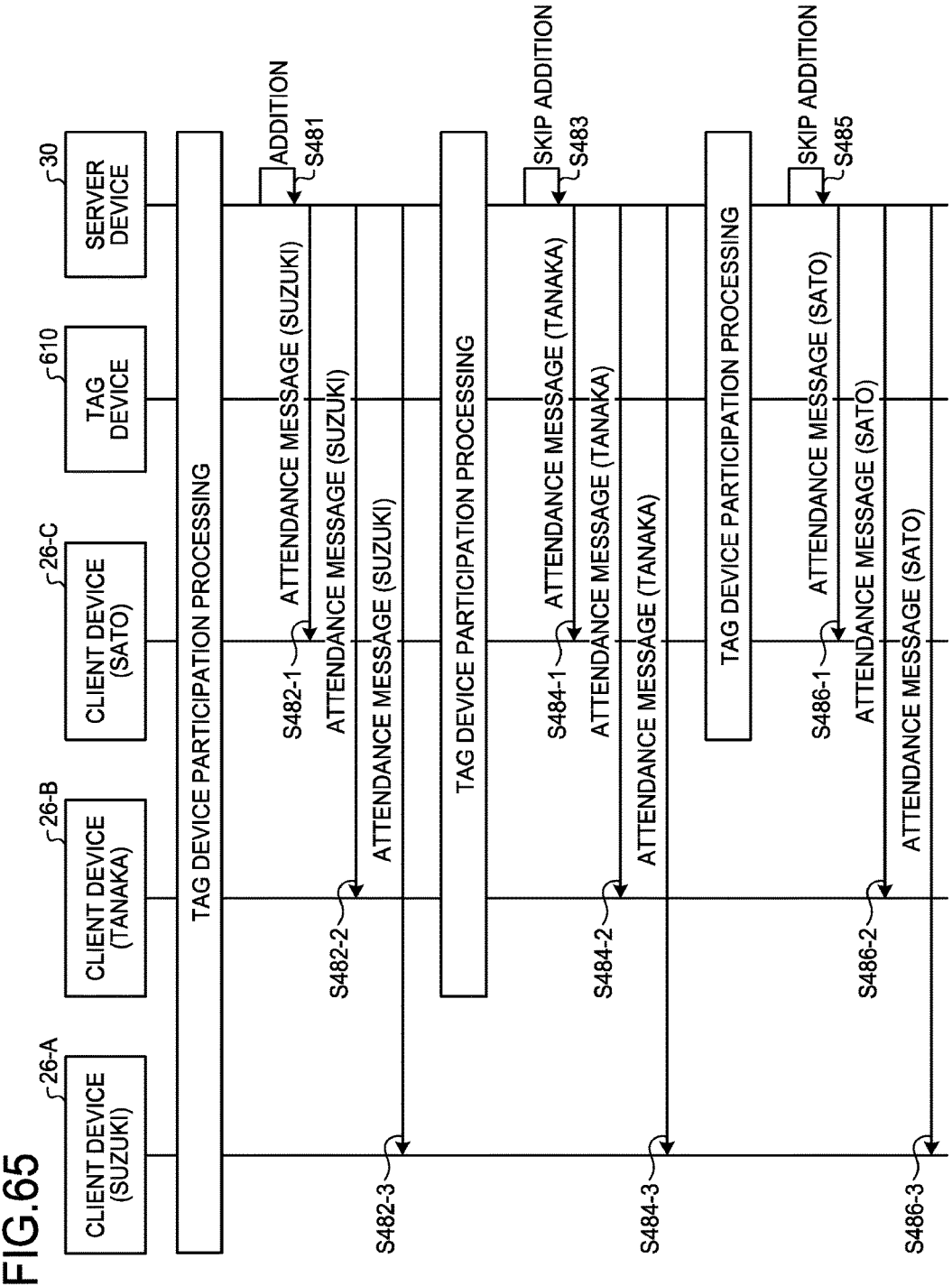
FIG. 65 is a diagram illustrating the sequence of attendance processing at the information processing system according to the fifth embodiment.
Figure 66:
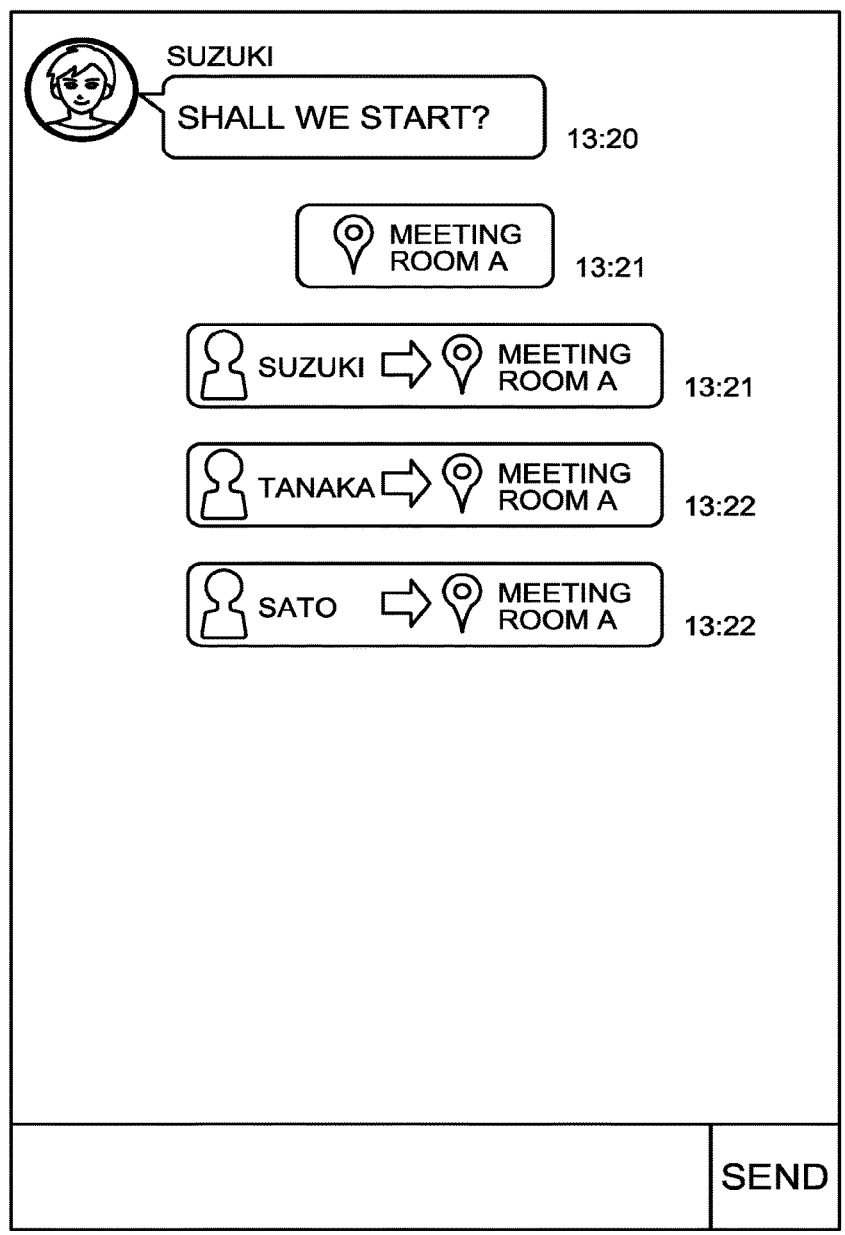
FIG. 66 is a diagram illustrating an exemplary attendance confirmation screen.

FIG. 65 is a diagram illustrating the sequence of attendance processing in the information processing system 900 according to the fifth embodiment. FIG. 66 is a diagram illustrating an exemplary attendance confirmation screen.

In the information processing system 900 according to the present embodiment, the respective users each perform, by using the client device 26 held by the user, processing that allows participation of the tag device 610 in a group. Upon the processing that allows participation of the tag device 610 in a group, the server device 30 transmits an attendance message indicating attendance of a user holding the client device 26 that has performed the processing.

For example, the information processing system 900 executes the processing, following the sequence illustrated in FIG. 65.

First, a first user (Suzuki, for example) performs, by using the first client device 26-A, processing that allows participation of the tag device 610 in a group. Then, the information processing system 900 executes the processing at steps S356 to S363 illustrated in FIG. 54. Subsequently, the server device 30 executes processing that adds the tag device 610 in a group (step S481). Subsequently, the server device 30 generates an attendance message indicating attendance of the first user, and transmits the attendance message to the client devices 26 of all members of the group (steps S482-1, S482-2, and S482-3).

Subsequently, a second user (Tanaka, for example) performs, by using the second client device 26-B, processing that allows participation of the tag device 610 in the group. Then, the information processing system 900 executes the processing at steps S356 to S363 illustrated in FIG. 54. In this case, the tag device 610 is already participating in the group. Thus, the server device 30 skips processing that adds the tag device 610 to the group (step S483). Subsequently, the server device 30 generates an attendance message indicating attendance of the second user, and transmits the attendance message to the client devices 26 of all members of the group (steps S484-1, S484-2, and S484-3).

Subsequently, a third user (Sato, for example) performs, by using the third client device 26-C, processing that allows participation of the tag device 610 in the group. Then, the information processing system 900 executes the processing at steps S356 to S363 illustrated in FIG. 54. In this case, the tag device 610 is already participating in the group. Thus, the server device 30 skips processing that adds the tag device 610 to the group (step S485). Subsequently, the server device 30 generates an attendance message indicating attendance of the third user, and transmits the attendance message to the client devices 26 of all members of the group (steps S486-1, S486-2, and S486-3).

Through execution of the processing described above, each client device 26 displays an attendance confirmation screen as illustrated in FIG. 66. Specifically, the client device 26 displays, on the attendance confirmation screen, any attendance message indicating that the first user (Suzuki, for example), the second user (Tanaka, for example), and the third user (Sato, for example) have sequentially participated in a conference.

As described above, the information processing system 900 according to the present embodiment can provide information on attendance of a user through execution of participation processing on the tag device 610 by the user.

The present invention enables easy start of a session that is processing for communicating information with another instrument.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A system, comprising:
an instrument configured to communicate information with another instrument;
a client device that is an information processing device operated by a user belonging to a group; and
a server device configured to transmit a message to the client device,
the instrument comprising instrument circuitry configured to
receive an invitation notification to the group from the server device configured to transmit a message to a user belonging to the group,
transmit, when the received invitation notification is valid, approval information approving participation in the group to the server device, and
start, upon the participation in the group, a session that is processing for communications of information with another instrument participating in the group,
wherein the system further comprises a tag device configured to communicate information with the client device and the server device,
the tag device includes tag circuitry configured to generate a password,
the client device comprises client circuitry configured to acquire the password from the tag device, and transmit a tag invitation request including the password acquired from the tag device to the server device,
the server device comprises server circuitry configured to transmit, upon reception of the tag invitation request from the client device, a tag invitation notification including the password included in the tag invitation request to the tag device,
the tag circuitry is further configured to receive the tag invitation notification from the server device, and transmit tag approval information to the server device when the password included in the received tag invitation notification matches the password most recently generated by the tag circuitry, and
the server circuitry is further configured to allow participation of the tag device in the group upon reception of the tag approval information.

2. The system according to claim 1, wherein the server device further comprises an association information memory to store therein association information indicating the instrument associated with the tag device, and
the server circuitry is further configured to specify, upon participation of the tag device in the group, the instrument associated with the tag device based on the association information, and allow participation of the specified instrument in the group.

3. The system according to claim 2, wherein
the server circuitry is further configured to transmit a member invitation notification to the instrument associated with the tag device participating in the group,
the instrument circuitry is further configured to transmit, upon reception of the member invitation notification from the server device, member approval information to the server device, and
the server circuitry is further configured to allow participation of the specified instrument in the group upon reception of the member approval information from the specified instrument.

4. The system according to claim 3, wherein
the client circuitry is further configured to transmit, to the server device, an association request for association of the instrument specified by a user with the tag device,
the server circuitry is further configured to transmit, upon reception of the association request, a confirmation request to the instrument specified by the association request, the instrument circuitry is further configured to
  receive an acceptance operation from a user upon reception of the confirmation request from the server device, and
  transmit acceptance information to the server device upon the acceptance operation by a user, and
the server circuitry is further configured to update, upon reception of the acceptance information, the association information so as to associate the instrument specified by the association request with the tag device.

5. The system according to claim 3, wherein
the client circuitry is further configured to transmit a tag expelling request that causes the tag device to exit the group to the server device when a user has performed an expelling operation to cause the tag device participating in the group to exit the group, and
the server circuitry is further configured to
  extract, upon reception of the tag expelling request, the instrument associated with the tag device, and specify the instrument participating in the group among the instruments associated with the tag device,
  delete, from the group, the specified instrument, and
  delete the tag device from the group upon reception of the tag expelling request.

6. The system according to claim 1, wherein
the tag device is portable with a user and configured to communicate information with the client device through non-contact proximity communication.

7. A system, comprising:
an instrument configured to communicate information with another instrument;
a client device that is an information processing device operated by a user belonging to a group; and
a server device configured to transmit a message to the client device,
the instrument comprising instrument circuitry configured to
  receive an invitation notification to the group from the server device configured to transmit a message to a user belonging to the group,
  transmit, when the received invitation notification is valid, approval information approving participation in the group to the server device, and
  start, upon the participation in the group, a session that is processing for communications of information with another instrument participating in the group,
wherein the system further comprises a tag device configured to communicate information with the client device, and a virtual tag device configured to communicate information with the server device,
the tag device comprises tag circuitry configured to generate a first password,
the client device comprises client circuitry configured to acquire the first password from the tag device, and transmit a tag invitation request including the first password acquired from the tag device to the server device,
the server device comprises server circuitry configured to transmit, upon reception of the tag invitation request from the client device, a tag invitation notification including the first password included in the tag invitation request to the virtual tag device,
the virtual tag device comprises virtual tag circuitry configured to
  generate a second password identical to the first password generated by the tag device,
  receive the tag invitation notification from the server device, and
  transmit tag approval information to the server device when the first password included in the tag invitation notification matches the second password most recently generated by the virtual tag circuitry, and
the server circuitry is further configured to allow participation of the tag device in the group upon reception of the tag approval information.

8. The system according to claim 7, wherein the server device further comprises an association information memory to store therein association information indicating the instrument associated with the tag device, and
the server circuitry is further configured to specify, upon participation of the tag device in the group, the instrument associated with the tag device based on the association information, and allow participation of the specified instrument in the group.

9. The system according to claim 8, wherein
the server circuitry is further configured to transmit a member invitation notification to the instrument associated with the tag device participating in the group,
the instrument circuitry is further configured to transmit, upon reception of the member invitation notification from the server device, member approval information to the server device, and
the server circuitry is further configured to allow participation of the specified instrument in the group upon reception of the member approval information from the specified instrument.

10. The system according to claim 9, wherein
the client circuitry is further configured to transmit, to the server device, an association request for association of the instrument specified by a user with the tag device,
the server circuitry is further configured to transmit, upon reception of the association request, a confirmation request to the instrument specified by the association request,
the instrument circuitry is further configured to
  receive an acceptance operation from a user upon reception of the confirmation request from the server device, and
  transmit acceptance information to the server device upon the acceptance operation by a user, and
the server circuitry is further configured to update, upon reception of the acceptance information, the association information so as to associate the instrument specified by the association request with the tag device.

11. The system according to claim 9, wherein
the client circuitry is further configured to transmit a tag expelling request that causes the tag device to exit the group to the server device when a user has performed an expelling operation to cause the tag device participating in the group to exit the group, and
the server circuitry is further configured to
  extract, upon reception of the tag expelling request, the instrument associated with the tag device, and specify the instrument participating in the group among the instruments associated with the tag device,
  delete, from the group, the specified instrument, and
  delete the tag device from the group upon reception of the tag expelling request.

12. The system according to claim 7, wherein
the tag device is portable with a user and configured to communicate information with the client device through non-contact proximity communication.

\* \* \* \* \*